(12) United States Patent
Ueno et al.

(10) Patent No.: US 6,989,742 B2
(45) Date of Patent: Jan. 24, 2006

(54) DEVICE AND SYSTEM FOR DETECTING ABNORMALITY

(75) Inventors: Reiko Ueno, Takarazuka (JP); Noriko Kaneda, Kobe (JP); Takashi Omori, Sapporo (JP); Kousuke Hara, Hachioji (JP); Hiroshi Yamamoto, Shijonawate (JP); Shigeyuki Inoue, Kyotanabe (JP); Shinji Tanaka, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 226 days.

(21) Appl. No.: 10/326,447

(22) Filed: Dec. 23, 2002

(65) Prior Publication Data

US 2003/0117279 A1 Jun. 26, 2003

(30) Foreign Application Priority Data

Dec. 25, 2001 (JP) .................................. 2001-392921
Apr. 12, 2002 (JP) .................................. 2002-111292

(51) Int. Cl.
*G08B 29/00* (2006.01)

(52) U.S. Cl. ............. 340/511; 340/539.14; 340/539.25; 348/153; 348/154; 348/155; 348/159

(58) Field of Classification Search ................ 340/511, 340/539.14, 539.25; 348/155, 153, 154, 159
See application file for complete search history.

(56) References Cited

U.S. PATENT DOCUMENTS

| | | | | |
|---|---|---|---|---|
| 4,737,847 A | * | 4/1988 | Araki et al. ................. | 348/161 |
| 5,289,562 A | * | 2/1994 | Mizuta et al. ............... | 704/200 |
| 5,396,437 A | * | 3/1995 | Takahashi ................... | 382/309 |
| 5,737,486 A | * | 4/1998 | Iso .............................. | 704/232 |
| 5,789,925 A | * | 8/1998 | Yokotani et al. ............ | 324/500 |
| 5,841,946 A | * | 11/1998 | Naito et al. .................. | 706/62 |
| 6,002,994 A | | 12/1999 | Lane et al. | |
| 6,028,626 A | * | 2/2000 | Aviv ........................... | 348/152 |
| 6,396,535 B1 | * | 5/2002 | Waters ........................ | 348/159 |
| 6,625,383 B1 | * | 9/2003 | Wakimoto et al. ........... | 386/46 |
| 6,816,186 B2 | * | 11/2004 | Luke et al. .................. | 348/159 |
| 2002/0171551 A1 | * | 11/2002 | Eshelman et al. ....... | 340/573.1 |
| 2003/0058111 A1 | * | 3/2003 | Lee et al. ................ | 340/573.1 |
| 2003/0065409 A1 | * | 4/2003 | Raeth et al. .................. | 700/31 |

FOREIGN PATENT DOCUMENTS

| | | |
|---|---|---|
| EP | 1 071 055 | 1/2001 |
| EP | 1071055 A1 * | 1/2001 |
| JP | 2001-067576 | 3/2001 |

* cited by examiner

*Primary Examiner*—Daniel Wu
*Assistant Examiner*—Samuel J. Walk
(74) *Attorney, Agent, or Firm*—Wenderoth, Lind & Ponack, L.L.P.

(57) ABSTRACT

An abnormality detection device includes small motion sensors that detect small motions of a person in a house; a data collecting unit that collects and stores sensor signals from the small motion sensors as sensor patterns, and a Markov chain operating unit 33 that transforms the sensor patterns into a cluster sequence by vector-quantizing input patterns which are obtained by averaging and normalizing the sensor patterns, and calculates a transition number matrix and a duration time distribution of a Markov and so on using a Markov chain model. The abnormality detection device also includes a comparing unit that calculates a characteristic amount (Euclid distance and average log likelihood in an appearance frequency of a Markov chain and an average log likelihood to the duration time distribution of a Markov chain) of a sample activity as against a daily activity based on the obtained transition number matrix and the duration time distribution and so on.

43 Claims, 46 Drawing Sheets

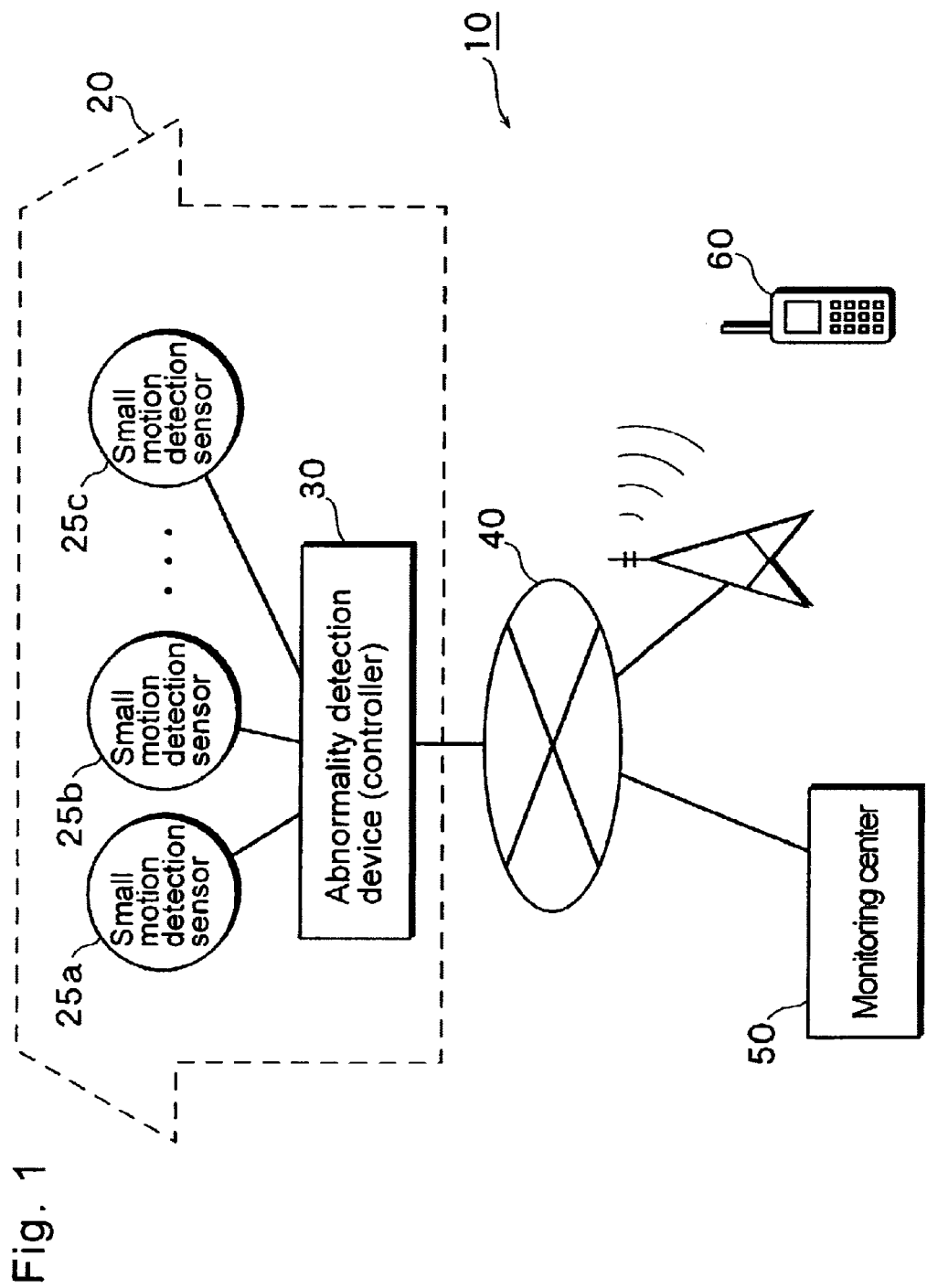

Fig. 4

|  | Sensor ID | | | | | | | | | | | | |
|---|---|---|---|---|---|---|---|---|---|---|---|---|---|
| Time | 1 | 2 | 3 | 4 | 5 | ·· | 8 | 9 | 16 | 17 | 18 | 19 | 20 |
| 19 : 56 : 35 | 0 | 0 | 0 | 0 | 0 | ·· | 0 | 0 | 1 | 1 | 1 | 0 | 0 |
| 19 : 56 : 41 | 0 | 0 | 0 | 0 | 0 | ·· | 0 | 0 | 1 | 1 | 0 | 0 | 0 |
| 19 : 56 : 41 | 0 | 0 | 0 | 0 | 0 | ·· | 0 | 0 | 1 | 1 | 1 | 0 | 0 |
| 19 : 56 : 42 | 0 | 0 | 0 | 0 | 0 | ·· | 0 | 0 | 1 | 1 | 0 | 0 | 0 |
| ... | ·· | ·· | ·· | ·· | ·· | ·· | ·· | ·· | ·· | ·· | ·· | ·· | ·· |

Fig. 28

| Sleep | July 22 | 0 : 13 | July 22 | 5 : 21 |
|---|---|---|---|---|
| Restroom | July 22 | 5 : 21 | July 22 | 5 : 22 |
| Sleep | July 22 | 5 : 22 | July 22 | 7 : 51 |
| Restroom | July 22 | 7 : 51 | July 22 | 7 : 54 |
| Sleep | July 22 | 7 : 54 | July 22 | 15 : 31 |
| Restroom | July 22 | 15 : 31 | July 22 | 15 : 32 |
| Sleep | July 22 | 15 : 32 | July 22 | 16 : 31 |
| Restroom | July 22 | 17 : 36 | July 22 | 17 : 37 |
| Dinner | July 22 | 18 : 28 | July 22 | 18 : 49 |
| Restroom | July 22 | 20 : 50 | July 22 | 20 : 52 |
| Restroom | July 22 | 22 : 59 | July 22 | 23 : 01 |
| Sleep | July 22 | 23 : 03 | July 23 | 5 : 15 |

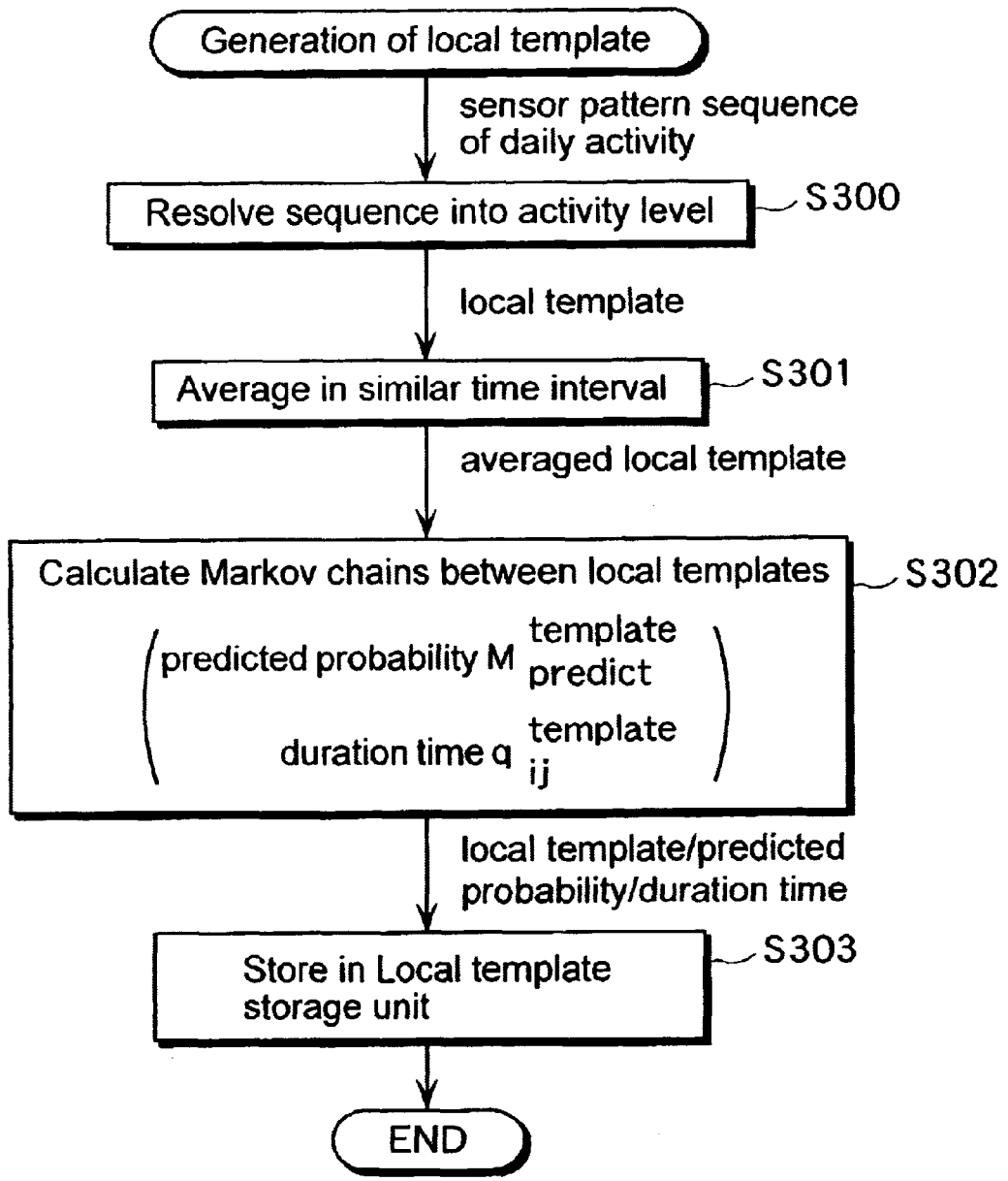

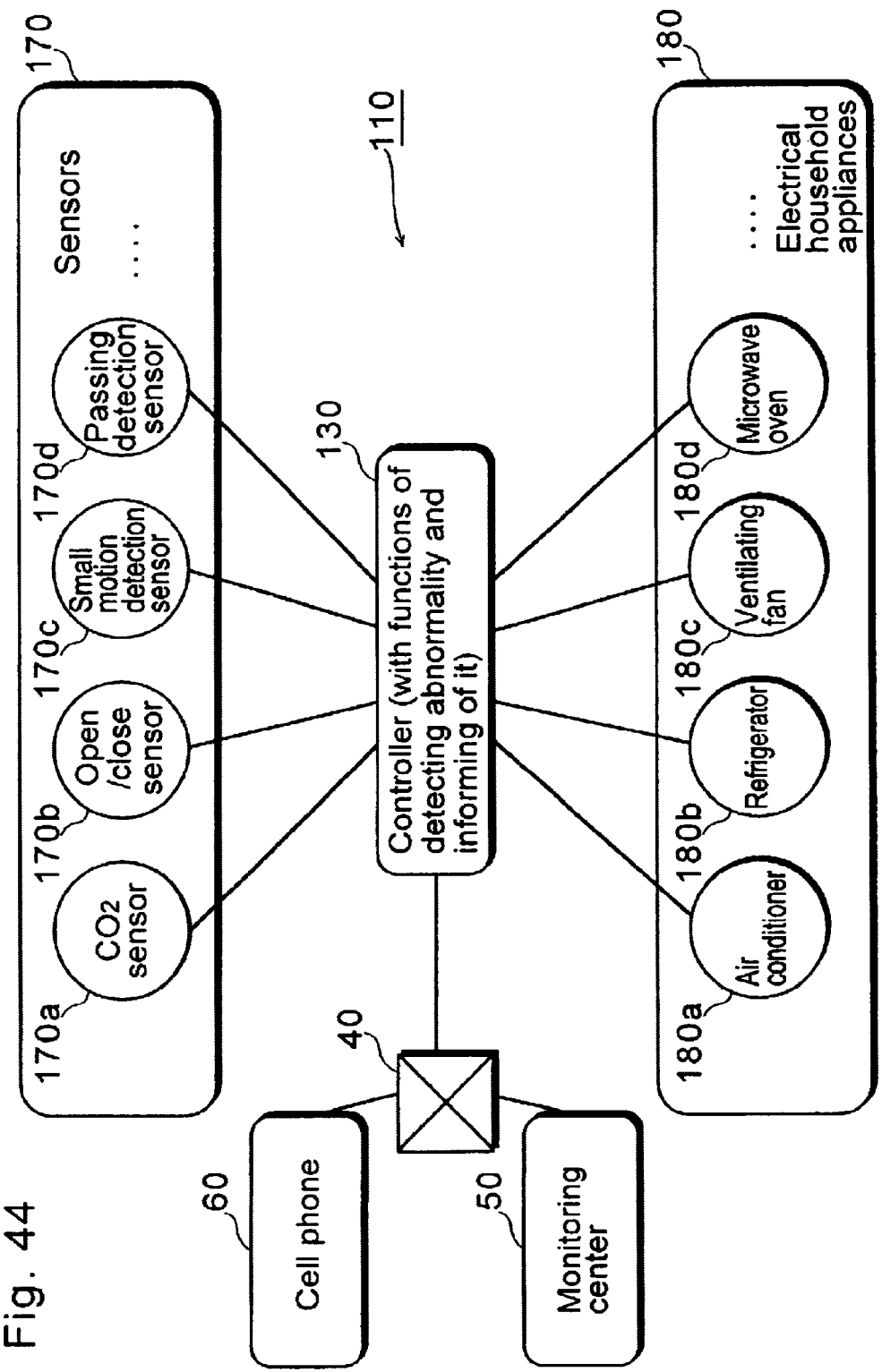

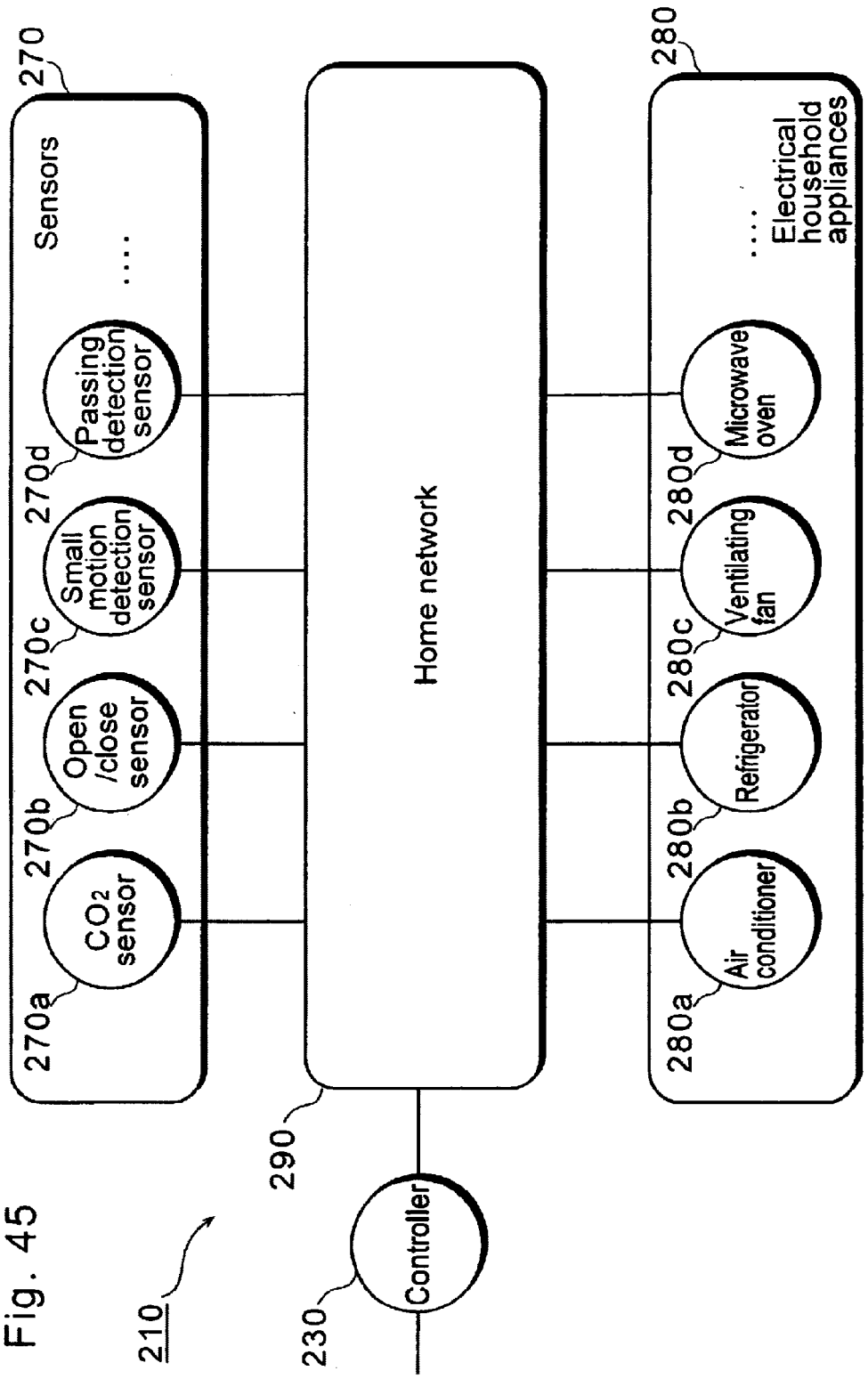

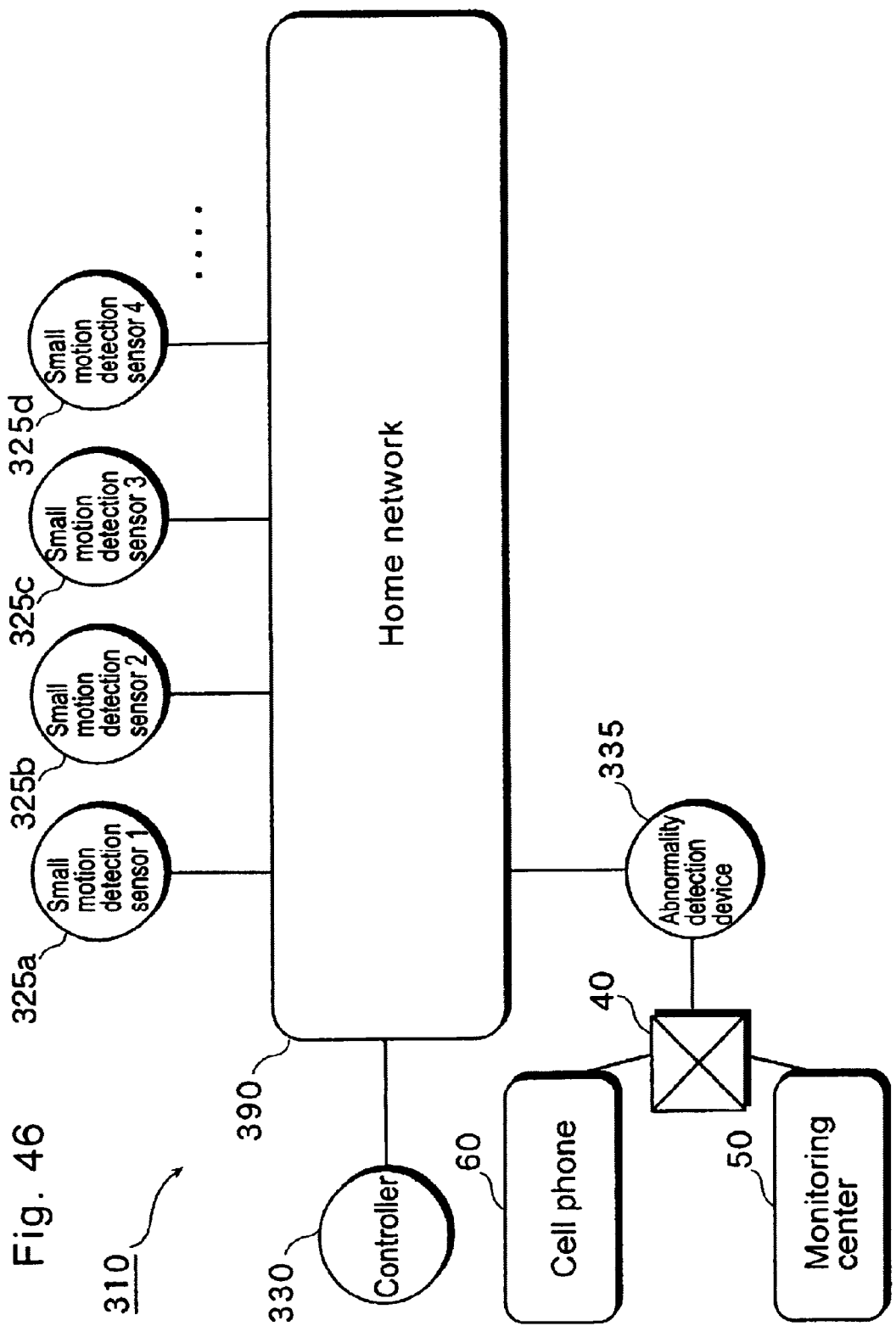

DEVICE AND SYSTEM FOR DETECTING ABNORMALITY

BACKGROUND OF THE INVENTION (1) Field of the Invention

The present invention relates to an abnormality detection device, and more particularly to a device, method, system and executable program which are suitable for detecting an abnormality such as an unusual human activity which has occurred in an elderly person who lives alone in a house.

(2) Description of the Related Art

Various attempts have been made for detecting an abnormality which has occurred in an event such as the operation of a machine and human behavior. For example, it is an important technology, particularly in rapidly aging Japan, to monitor the activities of an elderly person who lives alone and to detect any occurrence of his unusual activity. One of such conventional technologies is "Abnormality Report System" which is disclosed in the Japanese Laid-Open Patent Application No. 2001-67576.

This conventional system includes, for monitoring the daily life of an elderly person or a sick person who lives alone, (a) a sensor unit which is placed in the restroom in the house of the person that is subject to monitoring and which outputs a predetermined signal when detecting the use of the restroom, (b) a first communication means (a wireless terminal device) which is placed in the restroom and which outputs a predetermined signal when receiving the signal from the sensor unit, and (c) a second communication means (a main device) which includes a monitoring timer that starts clocking when the signal is received from the first communication means and which reports the occurrence of an abnormality to the monitoring center when the signal from the first communication means is interrupted for a predetermined time period or more. When the elderly person faints due to a disease or the like and cannot move at all, he does not use the restroom for the predetermined time period or more, and thereby, it is detected that something abnormal has occurred in him.

However, the above-cited conventional system is based on his behavior characteristic that he always goes to the restroom within the predetermined time period. Therefore, steps are required to eliminate an exceptional case when the elderly person does not go to the restroom for the predetermined time period or more even in normal situations, such as when he goes out and he does his needs with a chamber pot.

Furthermore, since this conventional system only detects unusual human activities in a building with a restroom, there is a problem in that the uses and available opportunities thereof are extremely limited. In other words, the conventional system can detect neither unusual human activities in a place without a restroom or in a time period when the restroom is not used, nor abnormal motions of animals such as a pet or machines which do not use a restroom.

SUMMARY OF THE INVENTION

In order to solve the aforesaid problem, the object of the present invention is to provide an abnormality detection device, method, system and executable program with a variety of applications that can detect an occurrence of the abnormality of objects and events under observation, independently of the types and numbers thereof and the space (such as a place and a time zone) where they are observed.

In order to achieve the stated object, the abnormality detection device according to the present invention is a device that detects the occurrence of an abnormality in an event under observation. The abnormality detection device comprises: an input unit operable to acquire a sequence of an input pattern that is data which depends upon the event; a transition analyzing unit operable to analyze a characteristic of a transition in the acquired sequence of the input pattern; a comparing unit operable to compare the analyzed characteristic of the transition with a predetermined reference value, and judge that an abnormality has occurred in the event when the characteristic and the reference value are not approximate to each other within a predetermined range; and an output unit operable to output the occurrence of an abnormality when the comparing unit judges that an abnormality has occurred.

In other words, the occurrence of an abnormality is detected by acquiring a sequence (time series) of input patterns that are the data depending upon changes of an event such as a motion of a person or a thing to be observed, focusing on the transition of the patterns in the sequence, sampling the characteristic amount in the transition and comparing the characteristic amount with that of the normal case. Here, the "event" means an event that can be represented as data which can be processed by a computer based on a signal from an equipment sensor, a report (data entry) by a person, and others, and is typically a "human activity" in a house.

When an abnormality is detected based on the human activities in the house, the following approach is taken in the present invention.

A description of a personal daily life and the detection of unusual events in his life are made by using sensor information that is obtained in a house (an intelligent house) where small motion sensors are placed in a plurality of predetermined places. The objective here is that a computer understands the daily life which is individually customized because human behavior varies greatly from person to person.

On the other hand, there is symbol processing where discretized environments are used for prediction. It is necessary for us to predict events in an outside world for our lives, and such an intellectual function may be used for modeling and information processing in the equipment which matches with human beings and supports them.

The intelligent house which is equipped with sensors that detect human presence and activities is considered to be something that is equipped with human outward sensory organs inwardly, and shows effectiveness as a place where the intellectual information processing for supporting human activities is applied. Therefore, based on the data which is actually measured in the intelligent house, unusual behavior is detected by using the likelihood of the activity sequence as an information processing model similar to that of human beings.

More specifically, discretization of continuous sensory data that is a basis of symbol processing in human brains is performed, an environmental model is constructed based on the transition between the discrete states, and then, the likelihood of the actual activity is predicted based on that model. Accordingly, an abnormal activity (an activity with a low likelihood) can be found based on the comparison with the learned personal data, and therefore, an abnormal activity may be detected without disturbing his daily life. It is preferable to use vector quantization for discretization and a Markov process model for the environmental model.

Furthermore, based on the assumption that a human life is made up of a plurality of daily activities and they are triggered according to the situation, the sensor sequence is discretized into a reproducible time interval and a local daily activity template in that time interval is generated. Since an image processing method is applied to automatic sampling of time intervals, highly correlative time intervals are sampled by template matching using a time window. As a result, daily life representation with a hierarchy in the time domain can be constructed.

As a verification of the daily activity template, unusual activities were detected. The unusual activities were detected by detecting the differences between the daily activity template and the actual activities. More specifically, methods such as (i) a comparison between the probability distribution based on the daily activity template and the likelihood of the actual activities and (ii) a measurement of the difference between the daily activity template that is calculated in the local time interval and the global daily activity template using the probability distribution distance are used so as to evaluate them.

The present invention is not only realized by dedicated hardware such as the above-mentioned abnormality detection device, but is also realized as an abnormality detection method including steps of the characteristic constituent elements, or as a program that causes a general-purpose computer to execute these steps, or as an abnormality detection system including the abnormality detection device and the receiver of the abnormality report.

FURTHER INFORMATION ABOUT THE TECHNICAL BACKGROUND OF THE INVENTION

The following applications are incorporated by reference:

Japanese Patent Application Ser. No. 2001-392921 filed Dec. 25, 2001;

Japanese Patent Application Ser. No. 2001-111292 filed Apr. 12, 2002.

BRIEF DESCRIPTION OF THE DRAWINGS

These and other objects, advantages and features of the present invention will become more apparent from the following description when taken in conjunction with the accompanying drawings which illustrate a specific embodiment of the invention.

FIG. 1 is a block diagram showing an overall structure of the abnormality detection system according to the embodiment of the present invention.

FIG. 4 shows values of sensor signals from the small motion detection sensors (sequences of sensor patterns).

FIG. 28 is a diagram showing the activities of the subject person based on his self record in Experiment 5.

FIG. 31 is a flowchart showing the operation of a local template generating unit of the abnormality detection system shown in FIG. 30.

FIGS. 34A–J are diagrams showing examples of the binarization and labeling of the correlation shown in FIGS. 33A–J and the sampling of each time period thereof.

FIG. 44 is a diagram showing the configuration of the abnormality detection system according to a modification of the present embodiment that detects the occurrence of an abnormality in human activities by using various sensor signals.

FIG. 45 is a diagram showing the configuration of the abnormality detection system according to another modification of the present embodiment that performs decentralized processing in which the intelligent house collects data and the monitoring center or the like analyzes and judges the occurrence of an abnormality.

FIG. 46 is a diagram showing the configuration of the abnormality detection system according to still another modification of the present embodiment including the abnormality report device that collects the sensor signals via the home network.

DETAILED DESCRIPTION OF THE PREFERRED EMBODIMENTS

Figure 2A:
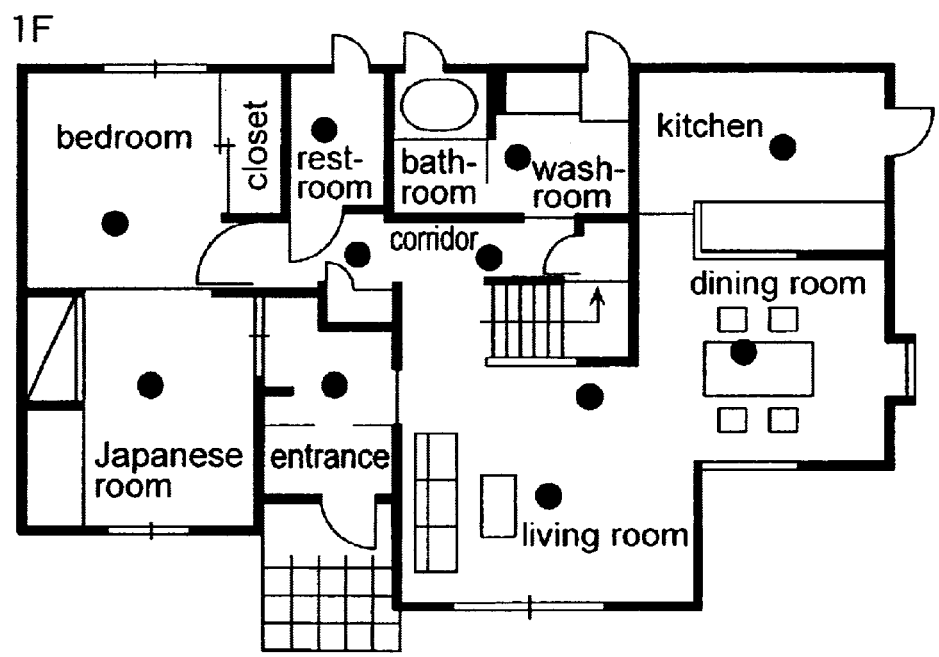
FIG. 2 is a plan view of an intelligent house showing locations of small motion detection sensors.

The embodiment of the present invention will now be explained in detail with reference to the drawings.

FIG. 1 is a block diagram showing an overall structure of the abnormality detection system according to the embodiment of the present invention. The abnormality detection system 10 is a system that detects the occurrence of an abnormality, that is, unusual human activities, in a house and reports the detected abnormality to a specific contact station. The abnormality detection system 10 is characterized by detecting unusual activities without limiting the places in the house or the time of day, and includes an intelligent house 20, a monitoring center 50 and a cell phone 60 which are connected to each other via a communication network 40.

Figure 2B:
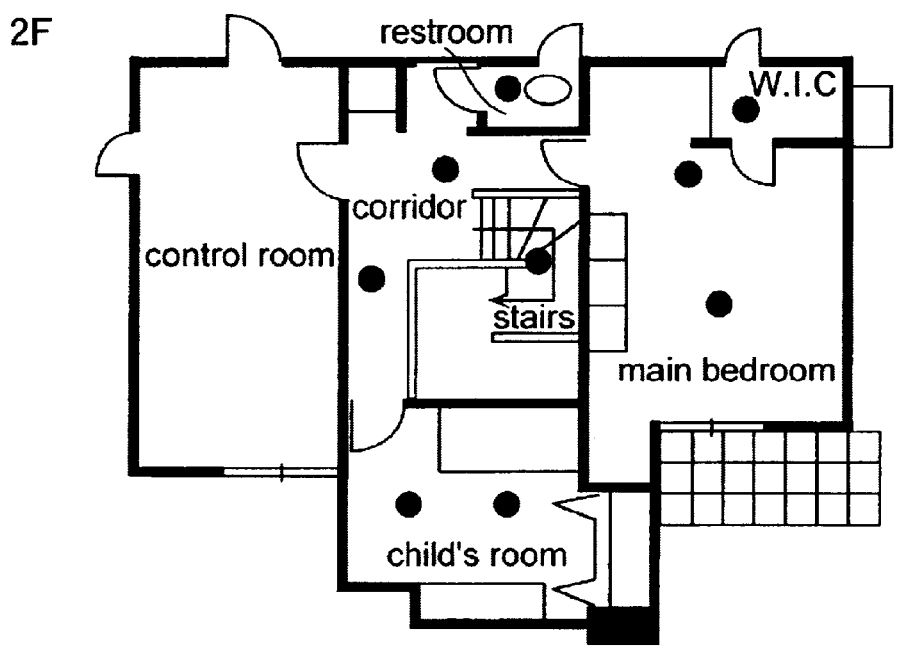

The intelligent house 20 is a two-story house shown in a plan view of FIG. 2. The intelligent house 20 includes small motion detection sensors 25a–25c that are placed at predetermined locations (20 locations indicated by black circles in the example of FIG. 2) in the house, and an abnormality detection device 30 that detects unusual human activities in the house by monitoring sensor signals which are outputted from the small motion detection sensors 25a–25c and reports its detection results to the monitoring center 50 and a predetermined contact station (the cell phone 60 in this case) via the communication network 40. The small motion detection sensors 25a–25c are infrared sensors that detect infrared rays emanating from the human body, for instance, and when there exists a person in the detection space (in the restroom, for instance) as determined by the orientation of each sensor and they detect the motion of the person, the small motion detection output sensor signals indicating the detection to the abnormality detection device 30.

The monitoring center 50 is a nursing-care center or the like that keeps centralized monitoring on the occurrence of unusual activities in a plurality of the target intelligent house 20, and includes a device that outputs, to an alarm or a display device, its receipt of the report from the abnormality detection device 30 via the communication network 40. The cell phone 60 is one of the contact stations that is registered in the abnormality detection device 30, and receives the report that is sent from the abnormality detection device 30 (such as an e-mail indicating that unusual activity has occurred in the intelligent house 20).

Figure 3:
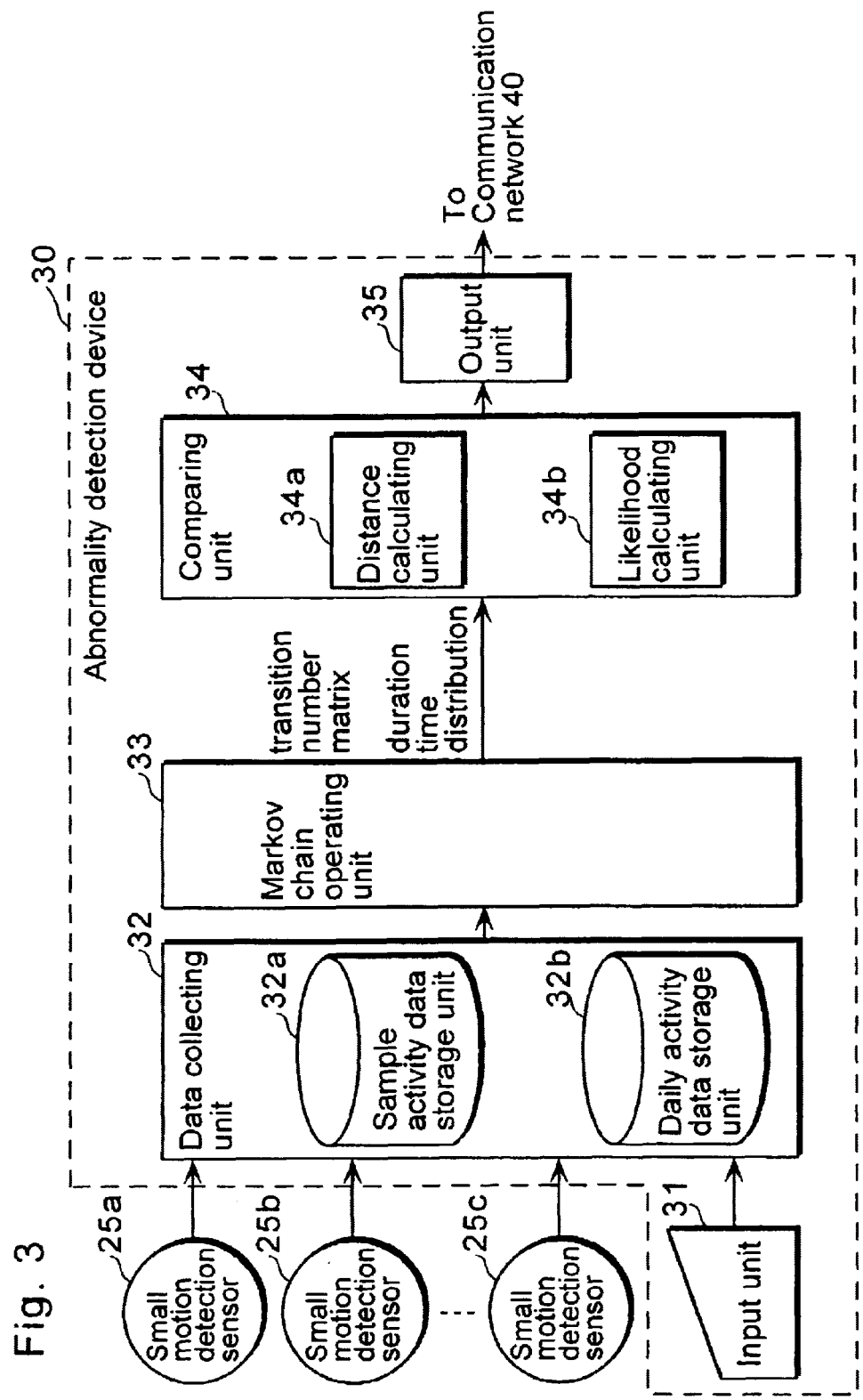
FIG. 3 is a functional block diagram showing a structure of the abnormality detection device according to the present invention.

FIG. 3 is a functional block diagram showing the structure of the abnormality detection device 30 shown in FIG. 1. The abnormality detection device 30 is a controller which is connected to the small motion detection sensors 25a–25c in the house and the communication network 40, and includes an input unit 31, a data collecting unit 32, a Markov chain operating unit 33, a comparing unit 34 and an output unit 35.

The input unit 31 is an input device such as an operation panel, and is used by the operator for giving the data to the abnormality detection device 30 instead of the small motion detection sensors 25a–25c, or for setting various parameters for the abnormality detection device 30.

The data collecting unit 32 is comprised of a data logger or a hard disk that receives and records the sensor signals that are outputted from the small motion detection sensors 25a–25c. The data collecting unit 32 includes a sample activity data storage unit 32a a that stores the sensor signals that are outputted from the small motion detection sensors 25a–25c and the input data that is outputted from the input unit 31 as the data of sample activities according to predetermined conditions, and a daily activity data storage unit 32b that stores them as the data of daily activities.

Here, the "sample activity" means an activity that is to be a target of monitoring the occurrence of an abnormality, and the "daily activity" means an activity under the normal condition (the activity that is the measure (reference or standard) for judging whether or not unusual activity has occurred).

The Markov chain operating unit 33 is a processing unit which is realized by a CPU, a memory or the like that executes data processing based on the control program, and calculates the transition number matrix and the duration time distribution of a Markov chain in the daily activities as a characteristic amount by performing operations (which will be described later) on the sensor patterns that are stored in the daily activity data storage unit 32b prior to monitoring the occurrence of an unusual activity (in the mode of creating the reference data). In the mode of monitoring the occurrence of an unusual activity (monitoring mode), the Markov chain operating unit 33 performs the same operation on the sequence (time series) of the sensor patterns that are stored in the sample activity data storage unit 32a, or directly on the sensor patterns which are inputted by the small motion detection sensors 25a–25c, so as to calculate the sequence of clusters, the transition number matrix of the Markov chain and so on as the characteristic amount in the sample activities. The obtained results are respectively outputted to the comparing unit 34.

"Markov chain" means the sequence of the events when the nth event is determined in relation to the previous events in the sequence of the events, and in the present embodiment, it corresponds to the sequence of the sensor pattern indicating the human activities (such as places where he moves) in the house (including the input pattern and the sequence of clusters which are obtained by performing a predetermined operation on that sequence). The "transition number matrix" of a Markov chain is a matrix indicating the number of transitions from the past events to that event. The "duration time distribution" of a Markov chain is a histogram of the duration time of each element (state transition) of the transition number matrix in the subject sequence. The "input pattern" is a pattern that is obtained by averaging and normalizing the sensor pattern (which will be described later). Further, the "cluster" is a specific number of patterns which are representative of all the input patterns, and are used for mapping an enormous types of input patterns into a specific number (30 in the present embodiment) of the representative patterns.

The abnormality detection device 30 does not always require the distinction of whether the subject event belongs to the daily activity or the sample activity, and may process the stored and averaged data as the data in the daily activity. In other words, the data collecting unit 32 may store the collected data regardless of whether the collected data is the data of the sample activity or the daily activity, and the Markov chain operating unit 33 may calculate the above-mentioned characteristics by regarding the data that is stored for a fixed time period and averaged as the data in the daily activity and the individual (daily) data as the data in the sample activity.

The comparing unit 34 is a processing unit which is realized by a CPU or a memory that executes the data processing based on the control program. The comparing unit 34 has a function of comparing the daily activity and the sample activity, that is, the characteristics pertaining to the appearance frequency and the duration time of the state transition in the Markov chain thereof, judging that an unusual activity has occurred when the difference between them exceeds a predetermined threshold (or the similarity thereof is a predetermined threshold or less), and notifying the output unit 35 of the result. The comparing unit 34 includes a distance calculating unit 34a and a likelihood calculating unit 34b.

The distance calculating unit 34a calculates the distance in the appearance frequency of the Markov chain based on the two transition number matrixes that are outputted from the Markov chain operating unit 33, that is, the transition number matrix of the Markov chain that is obtained in the daily activity and the transition number matrix of Markov chain obtained in the sample activity. On the other hand, the likelihood calculating unit 34b calculates the likelihood in the appearance frequency of the Markov chain based on the transition number matrix of the Markov chain that is obtained in the daily activity which is outputted from the Markov chain operating unit 33 and the cluster sequence that is obtained in the sample activity, or the likelihood calculating unit 34b calculates the likelihood in the duration time distribution of the Markov chain based on the duration time distribution of the Markov chain that is obtained in the daily activity which is outputted from the Markov chain operating unit 33 and the cluster sequence that is obtained in the sample activity.

The output unit 35 is a CPU, a modem or the like that executes communication control based on the control program. Upon receipt of the notice from the distance calculating unit 34a and the likelihood calculating unit 34b in the comparing unit 34, that is, the notice of the occurrence of an unusual activity, the output unit 35 reports the received notice to the pre-registered contact station (such as the monitoring center 50 and the cell phone 60) by using the input unit 31 or the like via the communication network 40. For example, the output unit 35 makes a call by using a cell phone, and sends a message indicating the occurrence of an unusual activity to a pre-registered e-mail address.

The output unit 35 has option functions of, according to the prior setting by the input unit 31, (1) outputting not only the message indicating the occurrence of unusual activity but also the information indicating what type of unusual activity has occurred (such as the information indicating where the unusual activity has occurred, in appearance frequency and/or duration time distribution, or distance and/or likelihood, the value and the occurrence time thereof), (2) alarming or displaying the occurrence of an unusual activity by an alarm bell or a display board which is mounted on the abnormality detection device 30, and (3) repeating the report until receiving the receipt data from the contact station.

The operation of the abnormality detection system 10 configured as described above will now be explained in detail.

FIG. 4 shows values of sensor signals that are outputted from the small motion detection sensors 25a–25c (a sequence of a sensor pattern) and collected by the data collecting unit 32. More specifically, FIG. 4 shows sensor signals ("1" is indicated when a person exists and he is in small motion) that are outputted from the twenty small motion detection sensors 25a–25c which are placed in the intelligent house 20, and the times when the sensor signals are changed. As individual sensor pattern consists of twenty-dimensional elements ("1" or "0"), and every time one element changes, a new sensor pattern is stored and accumulated in the sample activity data storage unit 32a or the daily activity data storage unit 32b.

These sensor patterns do not include the information on the arrangement of the sensors. "1" is indicated while each of the small motion detection sensors 25a–25c is in the state of detecting a small motion until not detecting any motion, and "0" is indicated while each of the small motion detection sensors 25a–25c is in the state of not detecting anything. These binary information indicating whether or not the sensor (whose location is unknown) detects a small motion and the information of the time when the event has occurred are the raw data that is inputted to the abnormality detection device 30.

Figure 5:
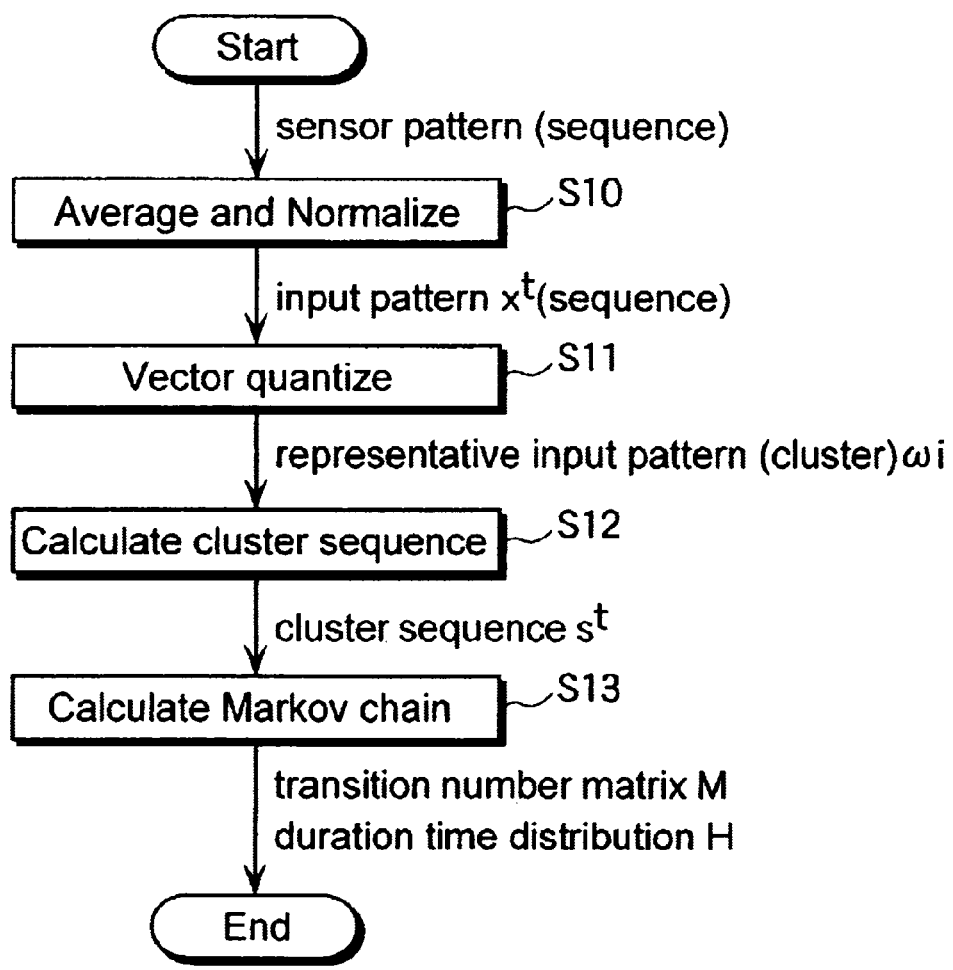
FIG. 5 is a flowchart showing the operation of a Markov chain operating unit.

FIG. 5 is a flowchart showing the operations of the Markov chain operating unit 33. FIG. 5 shows an overall operation procedure of calculating the transition number matrix of a Markov chain and the duration time distribution of the Markov chain for the sequence of the sensor pattern shown in FIG. 4. Each step of this procedure will be explained in detail in the order of steps.

The Markov chain operating unit 33 first reads out the sequence of the sensor pattern from the sample activity data storage unit 32a or the daily activity data storage unit 32b depending upon the operation mode (monitoring mode and/or reference data creating mode), averages and normalizes the read sensor pattern, and then transforms the sensor pattern into an input pattern.

More specifically, the sensor pattern $b^t$ which is to be processed includes N steps ($b^t$ is a sequence of b when t=1, . . . N). Since the information from the small motion detection sensors 25a–25c sometimes occurs at intervals of several seconds, it is highly possible that appropriate weights cannot be assigned to human activities if such information is used as an input event as it is. Therefore, the obtained sensor pattern $b^t$ is averaged in the time domain. Specifically, as shown in the following expression 1, the sensor pattern is divided into time windows, weighted addition is respectively performed according to a Gaussian function, and then the sensor pattern normalized.

sensor pattern: $b^t$ (J-dimensional vector, t=1, . . . ,N)
averaged pattern: $x^t$ (J-dimensional vector, t=1, . . . ,N)
variance: $\sigma$
data size: N
time window size: K $$\chi''^t := \sum_{k=0}^{K-1} \left( \frac{1}{\sqrt{2\pi}\,\sigma} e^{-\frac{k^2}{2\sigma^2}} \right) \cdot b^{t-k}$$

$$\chi^t := \frac{\chi''^t}{\|\chi''^t\|}$$

Figure 6:
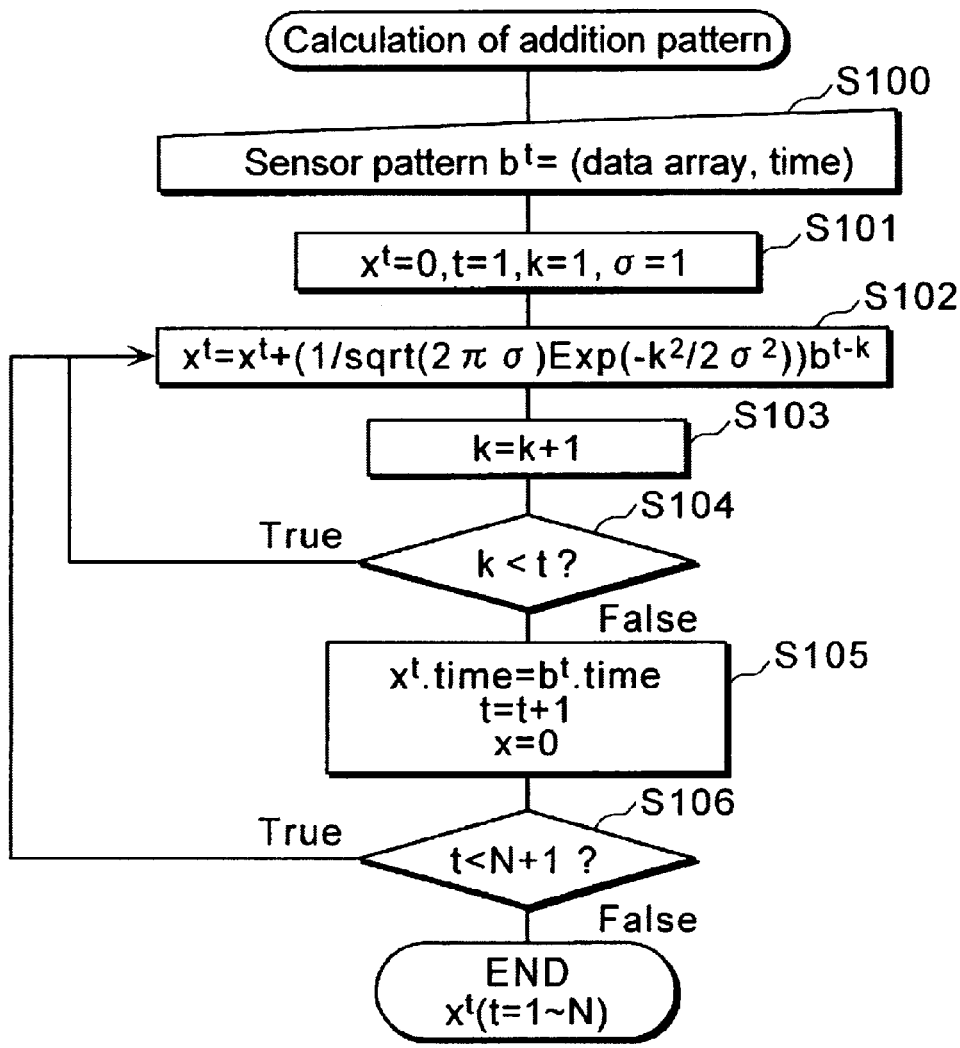
FIG. 6 is a flowchart showing a detailed calculation procedure for averaging sensor patterns.
Figure 7:
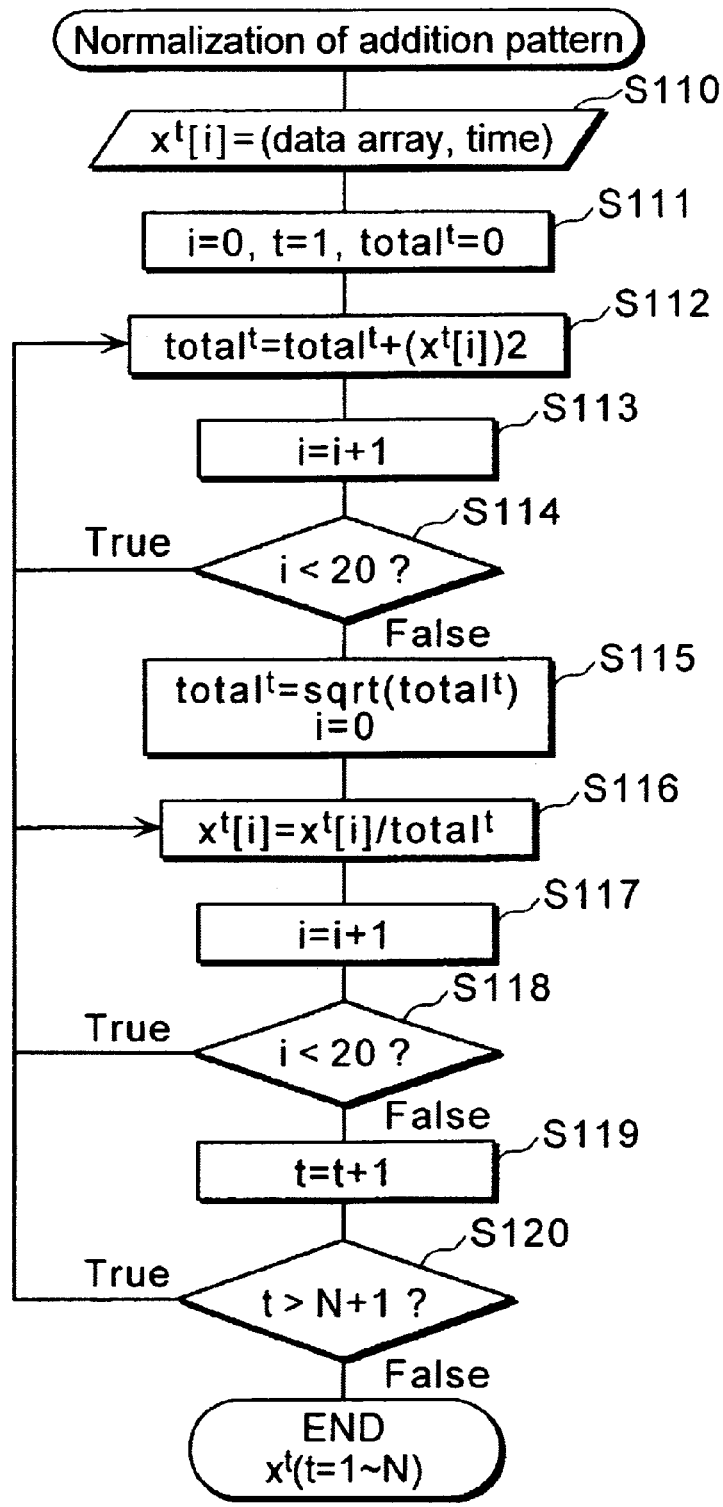
FIG. 7 is a flowchart showing a detailed calculation procedure for normalizing the averaged sensor pattern.

The detailed calculation procedure for averaging as shown in the first equation of the above expression is shown in the flowchart in FIG. 6, and the detailed calculation procedure for normalizing as shown in the second equation of the expression is shown in the flowchart in FIG. 7. In these figures, $b^t$ and $X^t$ are the data having twenty-dimensional array elements and the duration time of the patterns thereof ($b^t$.time, $X^t$.time).

Next, the Markov chain operating unit 33 vector-quantizes the obtained input pattern $X^t$ so as to specify the representative input pattern (I pieces of clusters wi) as shown in the following expression.

cluster: $w_i$ (J-dimensional vector, i=1, . . . ,I)
number of clusters: I
number of learnings: L[epoch]

$c:=\arg\max_i (w_i \cdot x^t)\ w_c^{l+1}:=w_c^l+\epsilon(x^t-w_c^l)$

Figure 8:
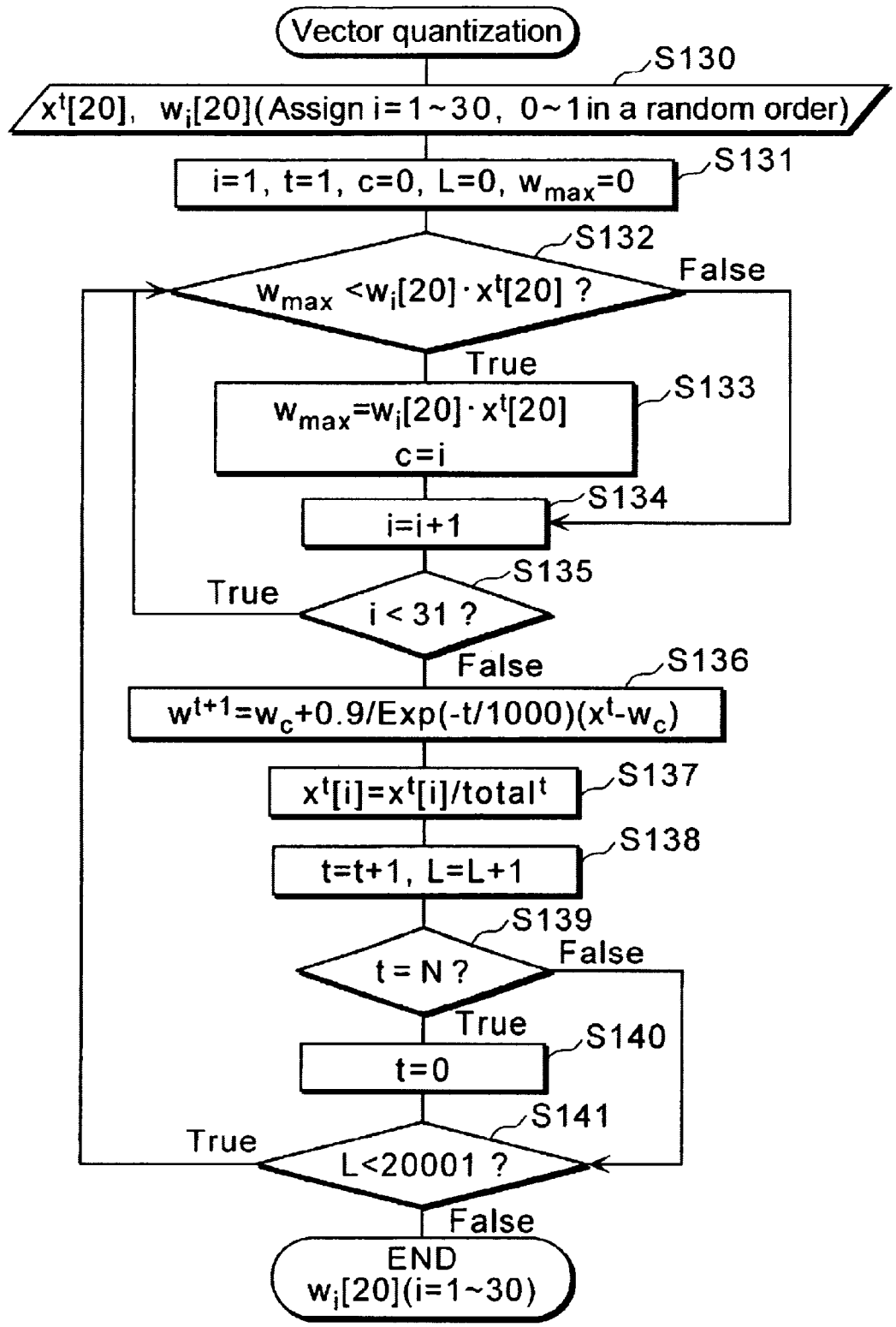
FIG. 8 is a flowchart showing a detailed calculation procedure for vector quantizing input patterns.

In the above expression, $c:=\arg\max(w_i \cdot X^t)$ means that the vector that is the most approximate to the vector $X^t$ among the vectors $w_i$(l=1, . . . ,I) (the vector that has the largest cosine of the angle between both vectors) is to be wc. The detailed calculation procedure for vector-quantization as shown in the above expression is shown in the flowchart in FIG. 8. Here, the number of clusters I is 30 and the number of learnings L is 20,000.

Figure 9A:
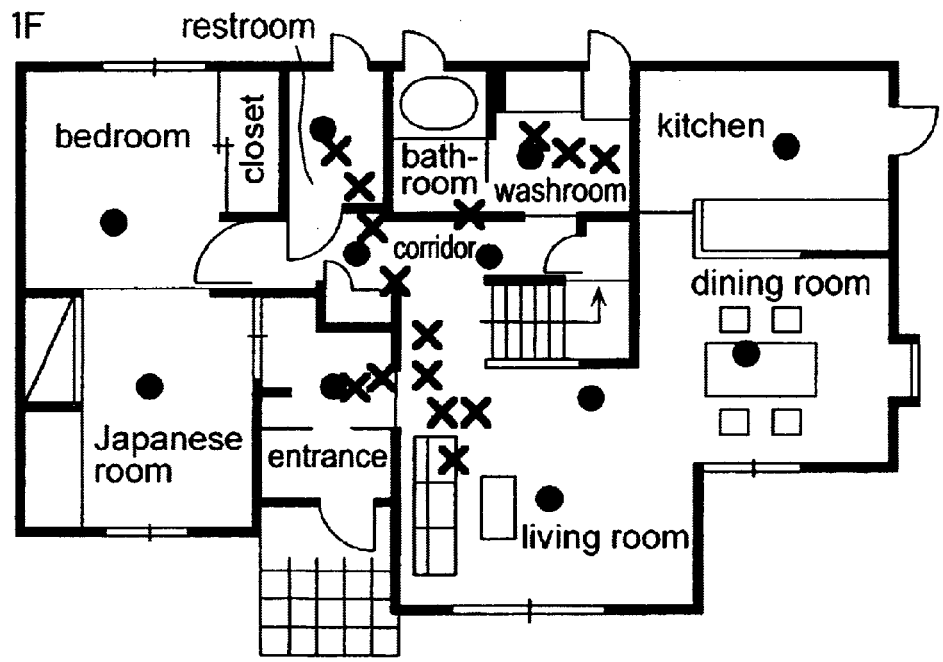
FIG. 9 is a plan view of the intelligent house showing locations of clusters.
Figure 9B:
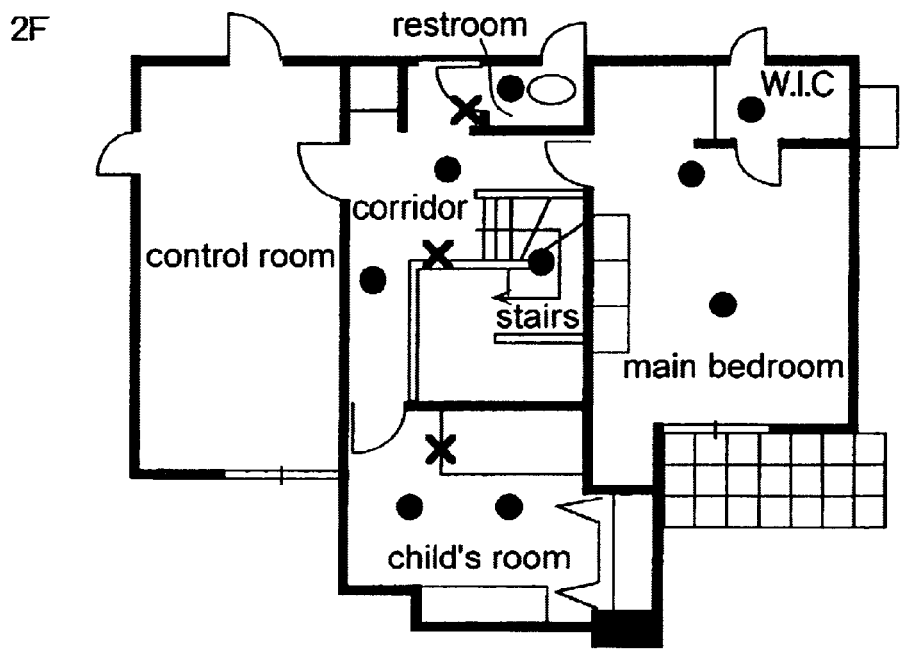

As a result of the learning, the vector which is approximate to I pieces of clusters is calculated from the data space of the sensor patterns. The samples (clusters) as a result of the calculation are shown as "x" marks in the plan view of the house in FIG. 9. Here, each cluster is represented as a center of gravity for the location of the small motion detection sensors 25a–25c.

Figure 10:
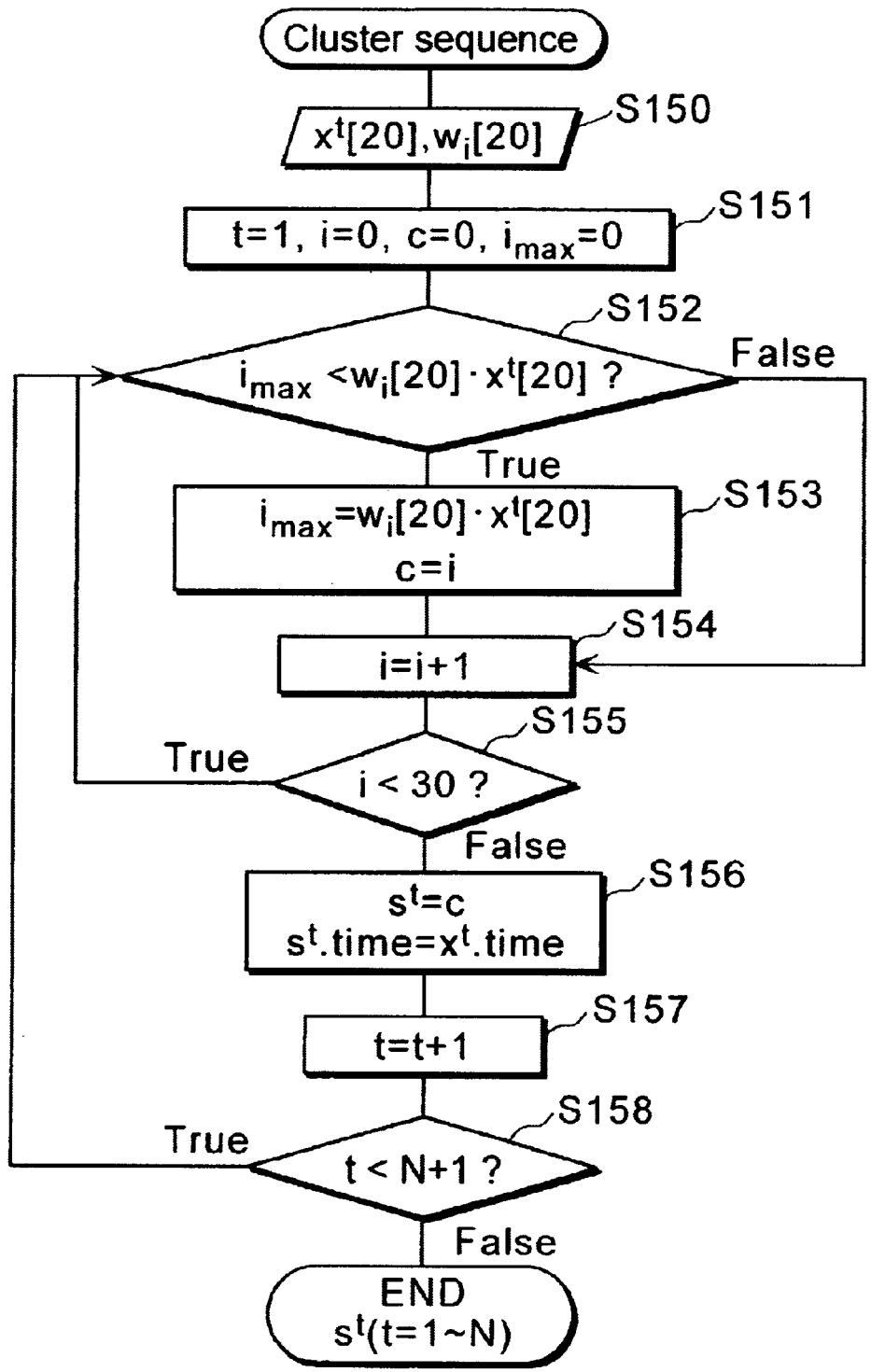
FIG. 10 is a flowchart showing a calculation procedure of a cluster sequence.

Next, as shown in the following expression, the Markov chain operating unit 33 obtains cluster sequence $S^t$ corresponding to the input patterns $X^t$ by inputting the input patterns $X^t$ that are obtained in Step S10 into the clusters that are obtained in Step S11 so as to classify them. In other words, the Markov chain operating unit 33 converts the sequence of the input pattern into the sequence by using specific pieces of clusters.

cluster sequence: $s^t(s^t\{1, \ldots ,I\}, t32\ 1, \ldots ,N)$ $S^t := \arg\max_i(w_i \cdot x^t)$ The calculation procedure of the cluster sequence as shown in the above expression is shown in the flowchart in FIG. 10.

Next, the Markov chain operating unit 33 calculates a D-dimensional Markov chain for the obtained cluster sequence $S^t$. More specifically, the Markov chain operating unit 33 calculates the transition number matrix of the Markov chain and the duration time distribution of the Markov chain according to the following expression.

Calculation of transition number matrix
dimension of the Markov chain: D
transition number matrix: $M = \lfloor m_{i^0, \ldots, i^{D-1}, i^D} \rfloor$ $m_{i^0, \ldots, i^{D-1}, i^D}$ is the number of transitions from the state $(i^0, \ldots, i^{D-1})$ which appeared in $s^t$ to the state $i^D$.

Figure 11:
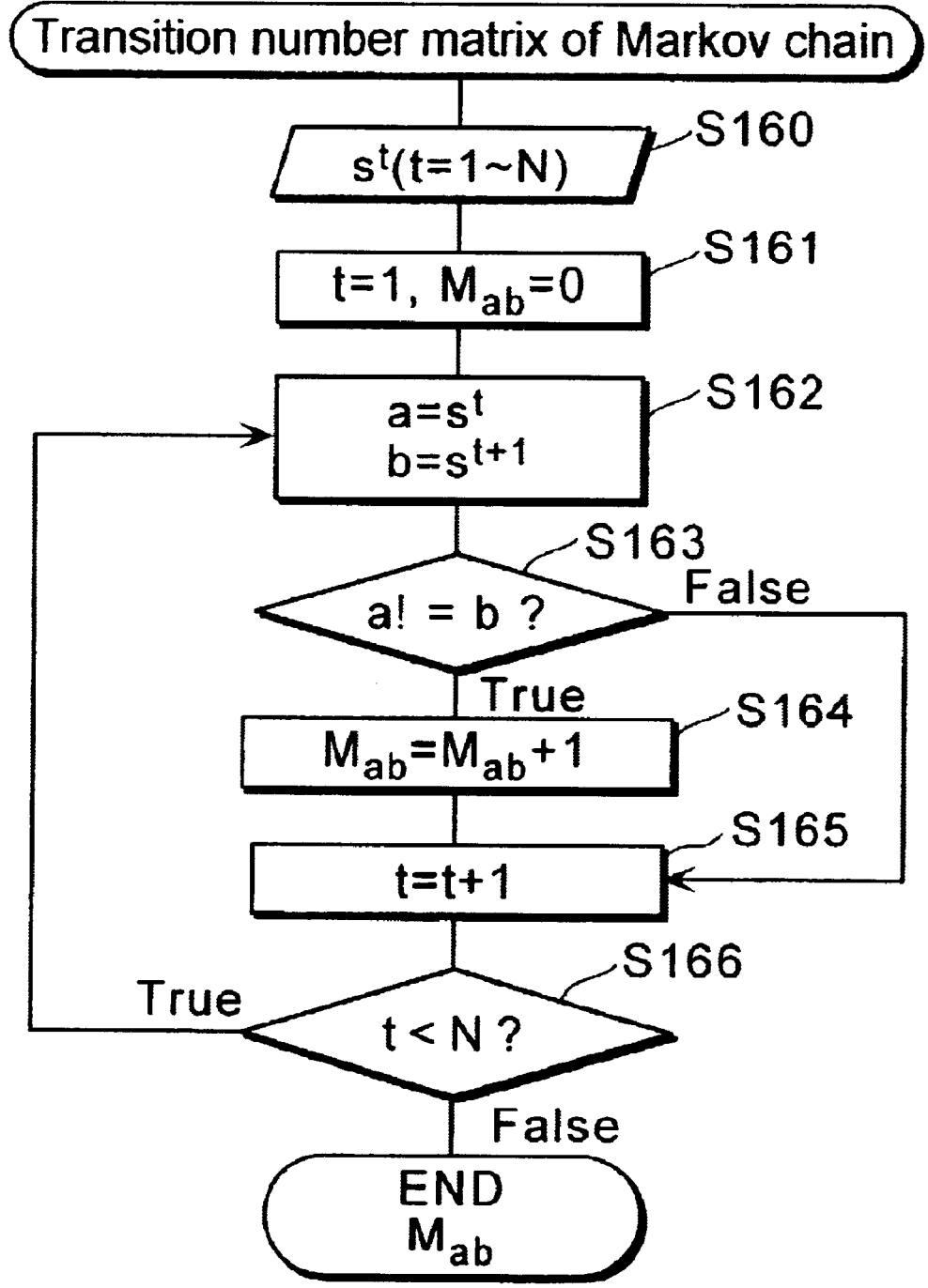
FIG. 11 is a flowchart showing a calculation procedure of a transition number matrix in an appearance frequency of a Markov chain.

The calculation procedure of the transition number matrix shown in the above expression is shown in the flowchart in FIG. 11. If it is not regarded as a transition when the clusters which are adjacent to each other in the cluster sequence are the same, the processing for not counting such a case as a number of transitions is performed (Step S163).

Calculation of duration time distribution
Next, as for
$m_{i^0, \ldots, i^{D-1}, i^D}$
the histogram that is obtained by dividing the time between the maximum value and the minimum value into L pieces as the duration time distribution indicating how long the state transition which appeared in the cluster sequences $S^t$ continued $H_{i^0, \ldots, i^{D-1}, i^D}$
is generated.

number of divisions of histogram for duration time distribution: L duration time distribution: $H_{i^0, \ldots, i^{D-1}, i^D} = \lfloor (h'_{i^0, \ldots, i^{D-1}, i^D}\rfloor$
(l=1, . . . , L)

$h'_{i^0, \ldots, i^{D-1}, i^D}$ is the lth element of the histogram for the duration time of transition from the state $(i^0, \ldots, i^{D-1})$ which appeared in $s^t$ to the state $i^D$, where the time between the maximum value and the minimum value is divided into L pieces.

Figure 12:
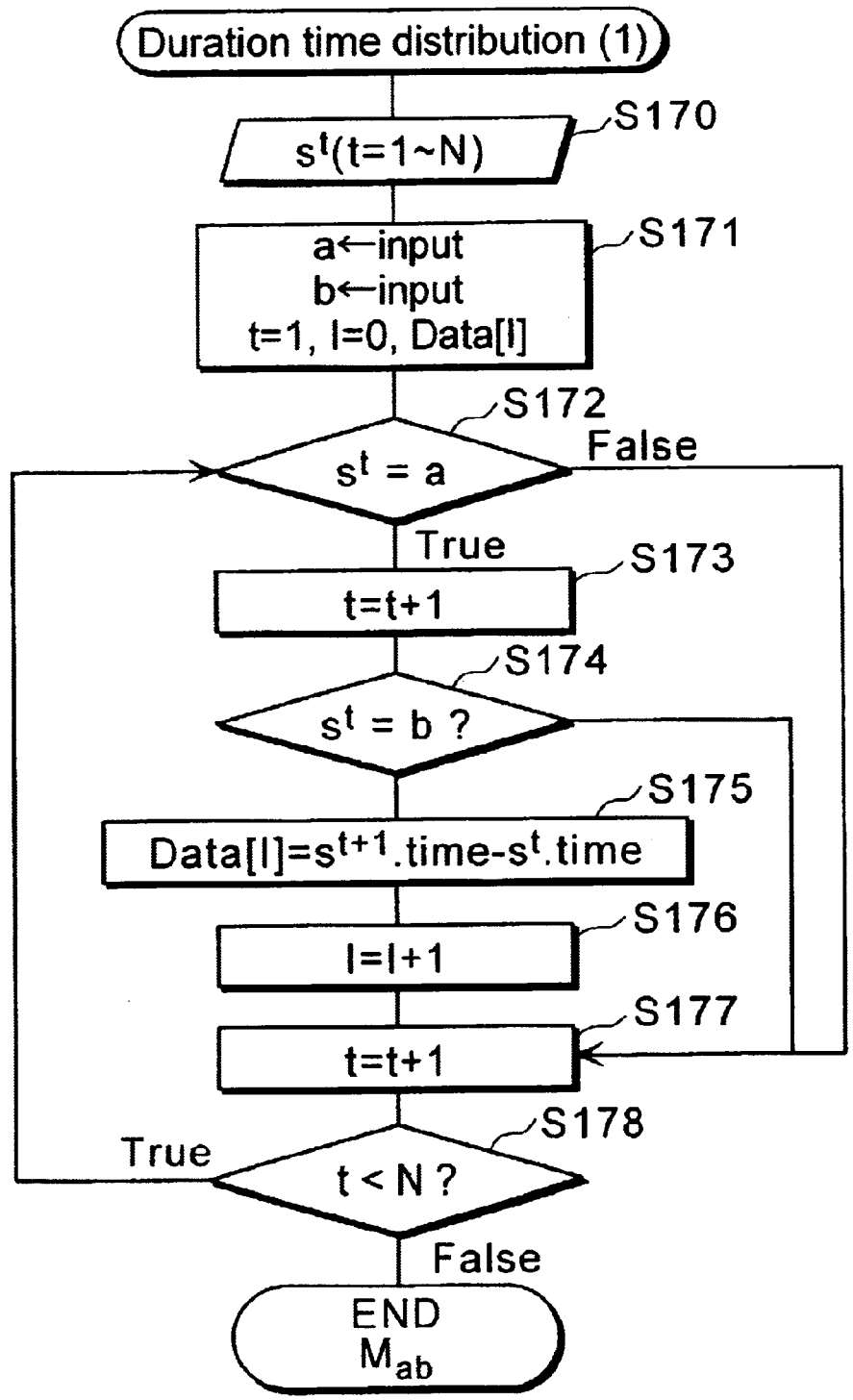
FIG. 12 is a flowchart showing a first half of a calculation procedure of duration time distribution of a Markov chain.
Figure 13:
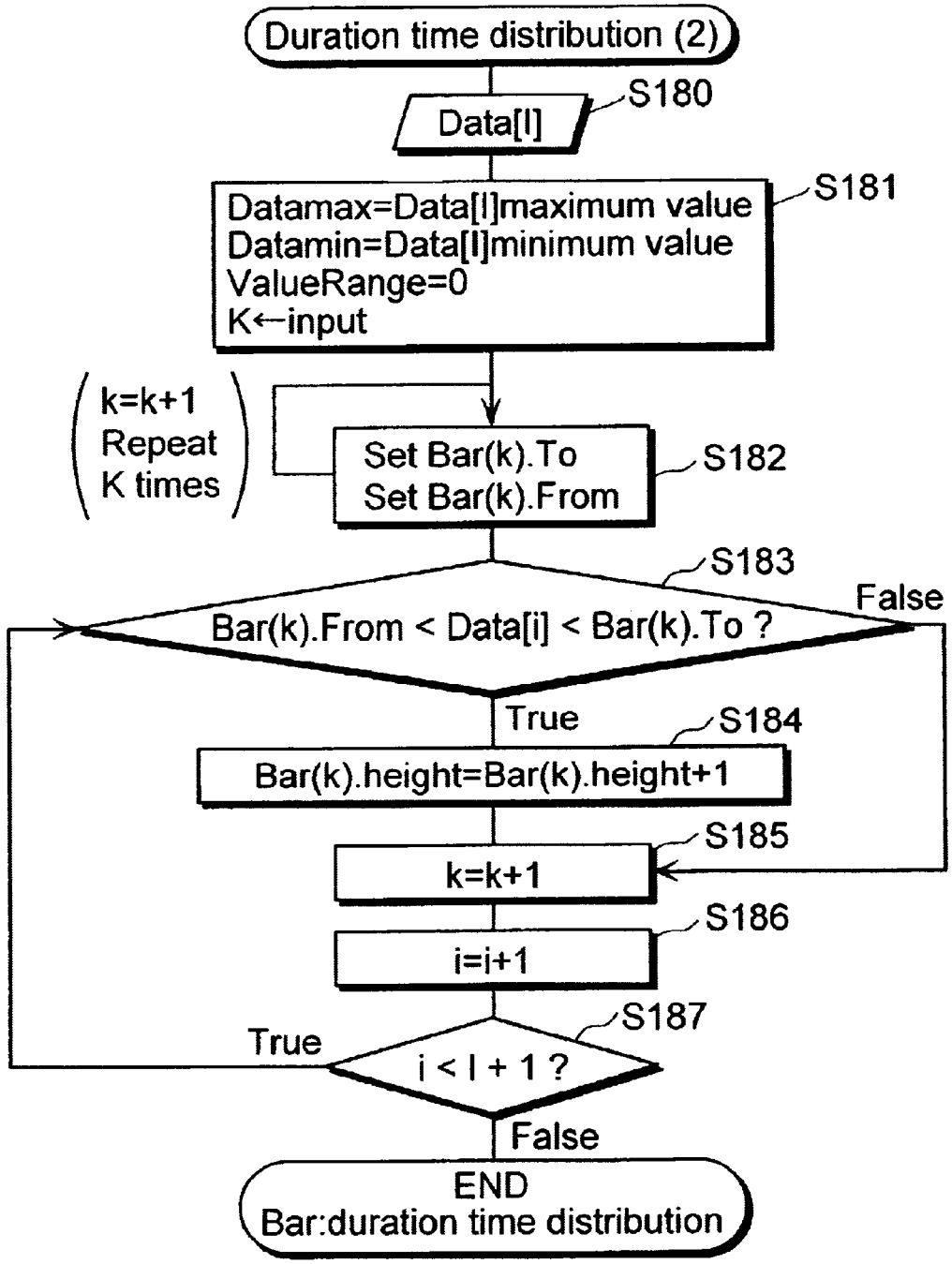
FIG. 13 is a flowchart showing the second half of the calculation procedure of the duration time distribution of the Markov chain.

The calculation procedure of the duration time distribution is shown in the flowcharts illustrated in FIG. 12 and FIG. 13. Here, after calculating the time which is required for each state transition (Steps S170–S178 in FIG. 12), the total number of events belonging to each time interval which is obtained by dividing the time between the maximum time and the minimum time into K pieces is calculated (Steps S180–S187 in FIG. 13). In FIG. 13, Bar(k).To and Bar(k).From show a range of each time interval, and Bar(k).height shows the total number of events belonging to the time interval.

The transition number matrix and the duration time distribution for the daily activities which are obtained by the above-described procedure are used for judging the occurrence of an unusual activity in the comparing unit 34 as the daily activity template (reference data).

Figure 14:
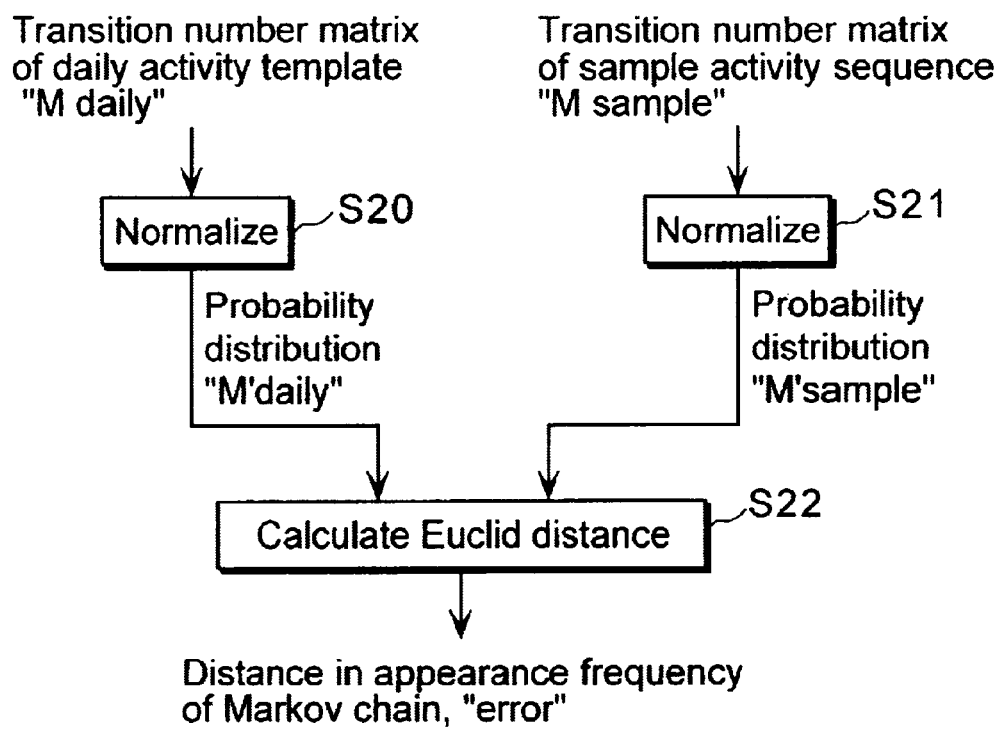
FIG. 14 is a data flow diagram showing a calculation procedure of distance in the appearance frequency of the Markov chain that is performed by the distance calculating unit of the comparing unit.

FIG. 14 is a data flow diagram showing a calculation procedure of distance in the appearance frequency of the Markov chain performed by the distance calculating unit 34a of the comparing unit 34.

First, the distance calculating unit 34a calculates the probability matrix M'$_{daily}$ by normalizing the transition number matrix M$_{daily}$ that is calculated as the daily activity template (Step S20), and calculates the probability matrix M'$_{sample}$ by normalizing the transition number matrix M$_{sample}$ that is calculated from the sample activity sequence (Step S21). This probability distribution represents the appearance frequency of the Markov chain.

Next, the distance calculating unit 34a calculates the distance between these two probability distributions (Euclid distance in the present embodiment) according to the following equation (Step S22).

$$\text{error} + D(M'^I_{daily}, M'_{sample})$$

Figure 15:
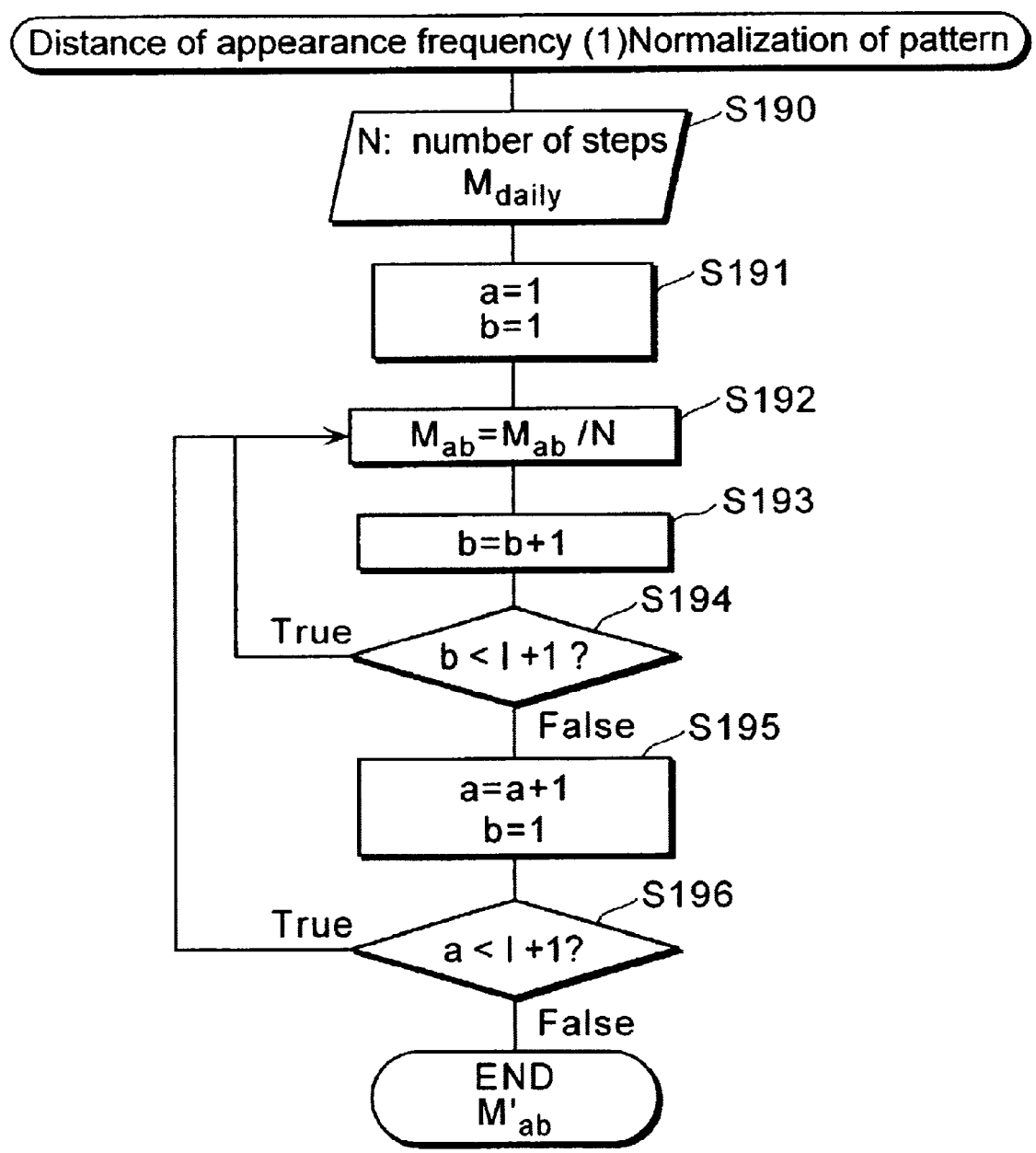
FIG. 15 is a flowchart showing a detailed calculation procedure for normalization in the above distance calculation.
Figure 16:
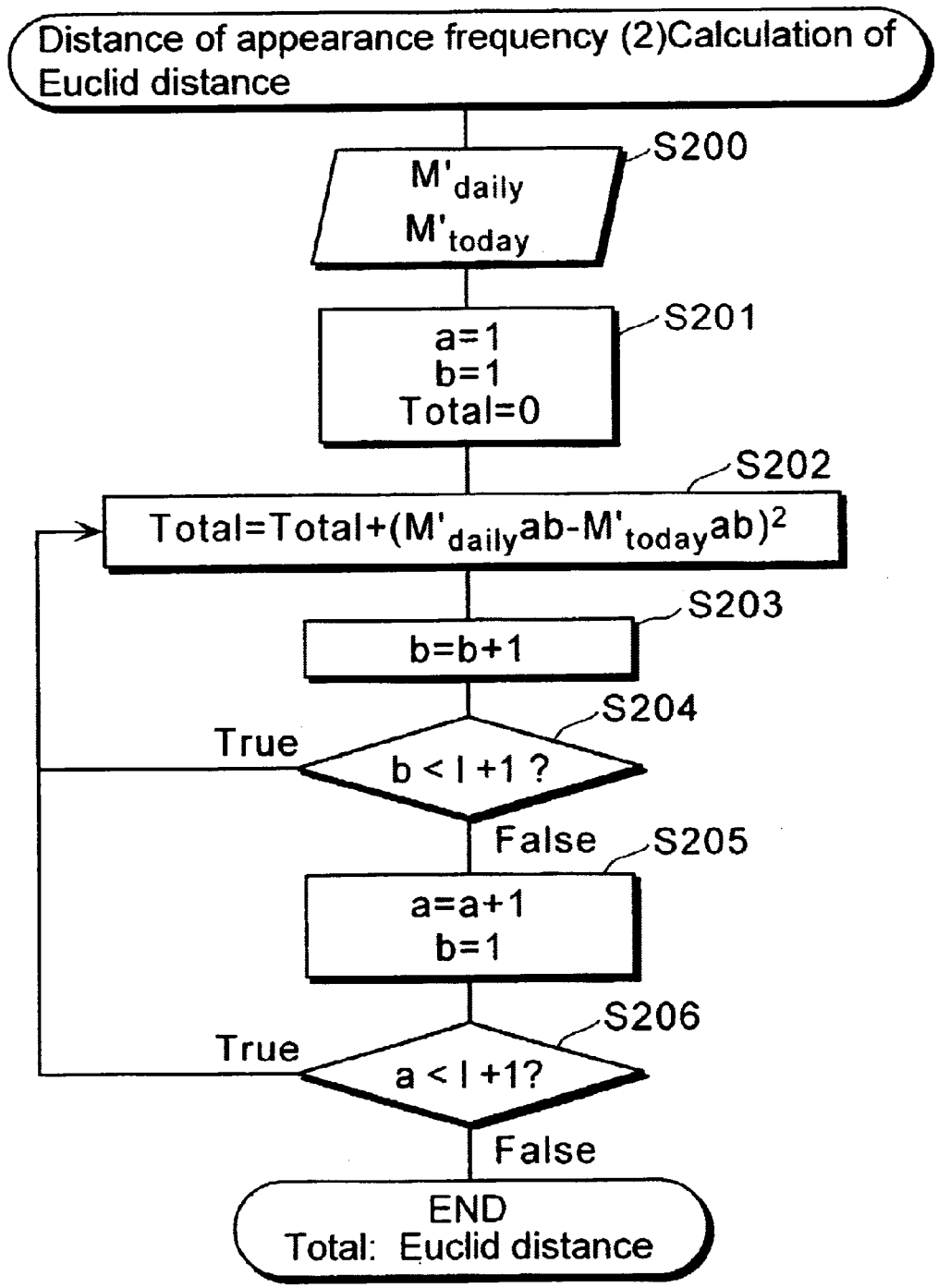
FIG. 16 is a flowchart showing a detailed calculation procedure for calculating a Euclid distance in the above distance calculation.

The detailed calculation procedure for normalization in Steps S20 and S21 is shown in the flowchart illustrated shown in FIG. 15, and the calculation procedure of the Euclid distance in Step S22 is shown in the flowchart illustrated in FIG. 16.

The larger the value of the distance "error" which is calculated above is, the farther from the daily activity the person's activity is. Therefore, the comparing unit 34 judges whether or not this value of "error" exceeds a predetermined threshold, and when the value-of "error" exceeds the predetermined threshold, the comparing unit notifies the output unit 35 that the value of "error" exceeds the predetermined threshold.

In this comparison using the distance of the appearance frequency, the ratios of the numbers of activities are compared, and therefore, it is useful as a rough observation of living activities. For example, if a person who has a meal after he gets home on a daily basis does not have the meal, the sequence where the activity of having meals is described drops out. This difference emerges noticeably in the transition number matrix, and the distances of the probability distributions that are the normalized transition number matrixes can be compared. However, since the time period dependence (the time range to be chosen) in calculating the transition number matrix is significant, the abnormality detection device 30 calculates the transition number matrix according to the time range which is specified by the operator who is designated via the input unit 31.

Figure 17:
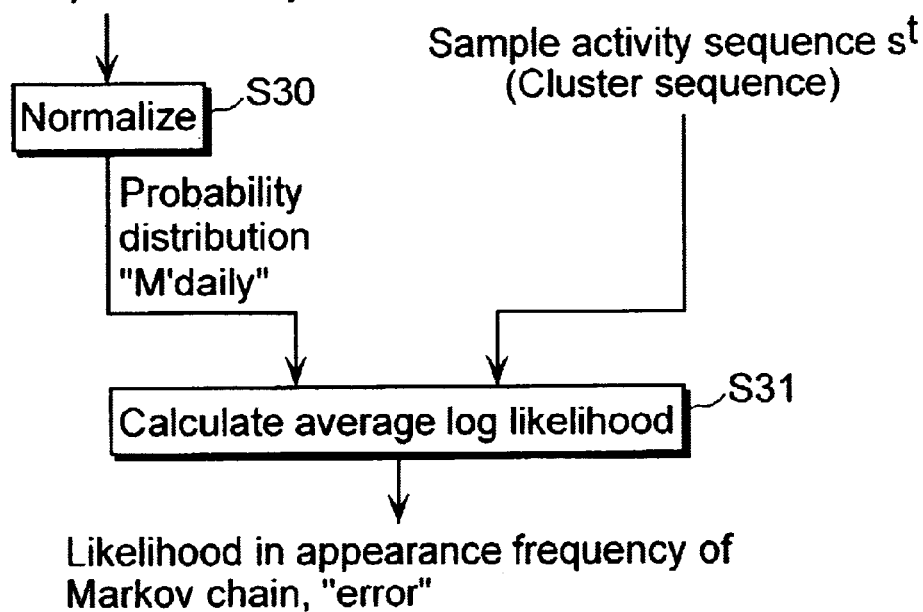
FIG. 17 is a data flow diagram showing a calculation procedure of likelihood in the appearance frequency of the Markov chain that is performed by the likelihood calculating unit of the comparing unit.

FIG. 17 is a data flow diagram showing a calculation procedure of the likelihood in the appearance frequency of Markov chain performed by the likelihood calculating unit 34b of the comparing unit 34.

First, the likelihood calculating unit 34b calculates the probability distribution M'$_{daily}$ $$M'_{daily} = [m'_{i^0, \ldots, i^{D-1}, i^D}]$$

by normalizing the transition number matrix M$_{daily}$ that is calculated as the daily activity template (Step S30).

Next, the likelihood calculating unit 34b obtains the average log likelihood of the sample activity sequence (cluster sequence) sI, . . . ,sN to be compared with the above probability distribution as shown in the following expression so as to make the log likelihood a characteristic for abnormality detection (Step S31).

$$\text{error} = \frac{1}{N-D} \sum_{t=1}^{N-D} \log(m'_{s^t, \ldots, s^{t+D-1}, s^{t+D}})$$

Figure 18:
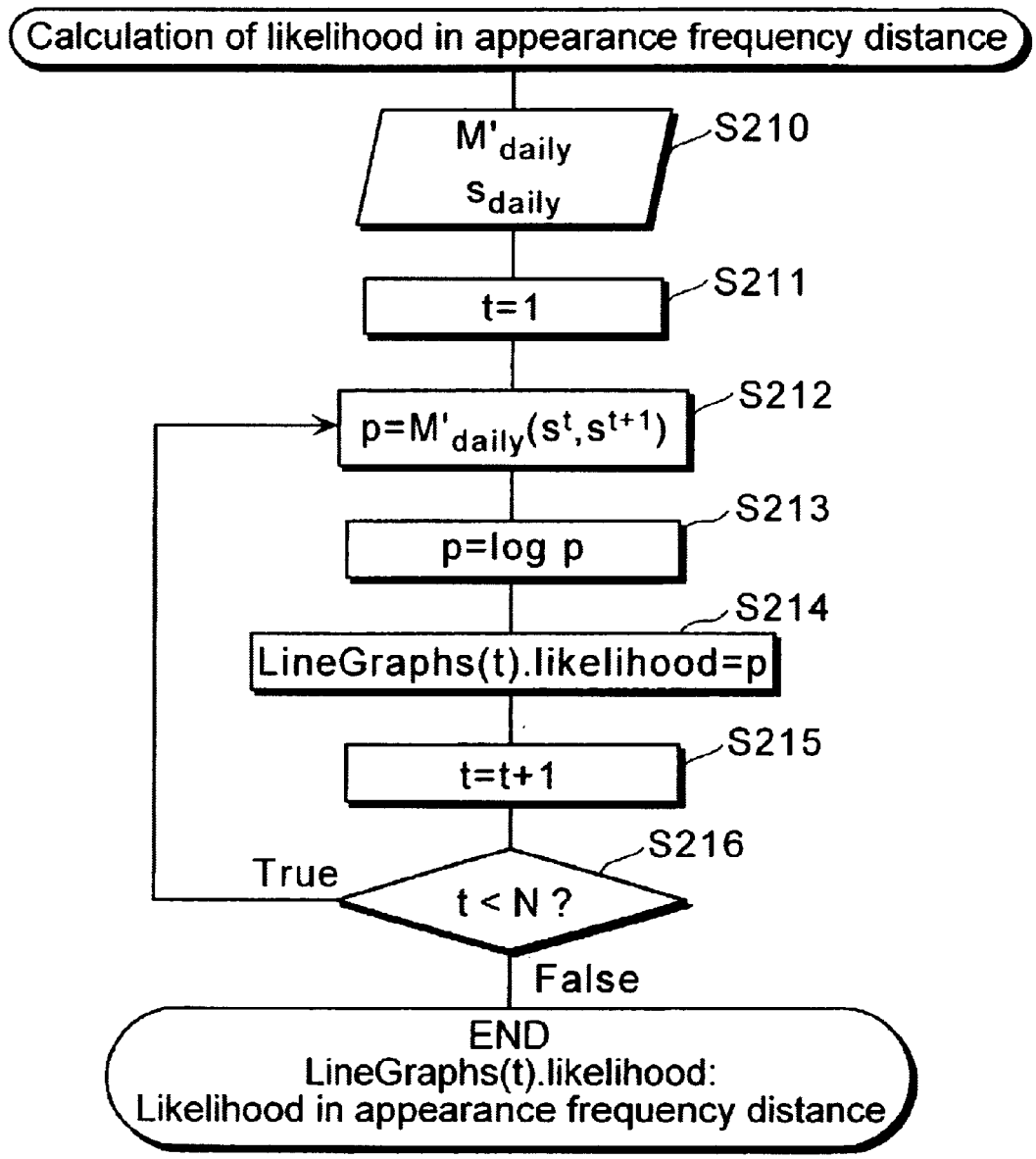
FIG. 18 is a flowchart showing a detailed calculation procedure in the above likelihood calculation.

The calculation procedure of the likelihood in the above Step 31 is shown in the flowchart in FIG. 18. In FIG. 18, the calculation procedure of the log likelihood "LineGraphs(t).likelihood" for the cluster sequence to be compared therewith is shown. By calculating the average of the log likelihoods, the average log likelihood "error" is calculated as shown in the expression 9.

The lower the value of the likelihood as calculated above is, the activity that is indicated by the activity sequence to be compared will be farther from the daily activity. Therefore, the comparing unit 34 judges whether or not this likelihood "error" is a predetermined threshold or less, and when the likelihood is the threshold or less, the comparing unit 34 notifies the output unit 35 of the likelihood being less than the threshold.

This comparison using the likelihood of the appearance frequency comes into play for detecting an abnormal condition where an unusual activity occurs over and over. For example, if a person who does not cook on a daily basis appears in the kitchen many times, it is detected as an unusual activity.

Figure 19:
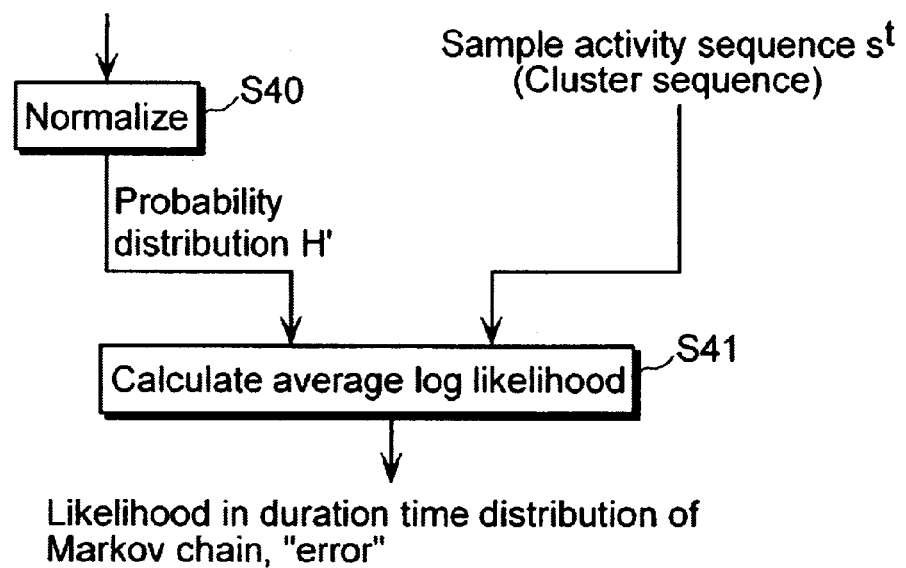
FIG. 19 is a data flow diagram showing a calculation procedure of likelihood for the duration time distribution of the Markov chain that is performed by the likelihood calculating unit of the comparing unit.

FIG. 19 is a data flow diagram showing a calculation procedure of the likelihood for the duration time distribution of the Markov chain which is performed by the likelihood calculating unit 34b of the comparing unit 34.

First, for the duration time distribution of the Markov chain of the daily activity template, $$H_{i^0, \ldots, i^{D-1}, i^D}$$

the likelihood calculating unit 34b obtains the probability distribution which is obtained by normalizing the above duration time distribution probability distribution H'$_{i^0, \ldots, i^{D-1}, i^D}$=[h'$_{i^0, \ldots, i^{D-1}, i^D}$](Step S40). The likelihood calculating unit 34b obtains the average log likelihood of the activity sequence (cluster sequence) s1, . . . , sN to be compared with this probability distribution as shown in the following expression, and makes the average log likelihood a characteristic for detecting an abnormality (Step S41).

$$\text{error} = \frac{1}{N-D} \sum_{t=1}^{N-D} \log(h'^I_{s^t, \ldots, s^{t+D-1}, s^{t+D}})$$

Figure 20:
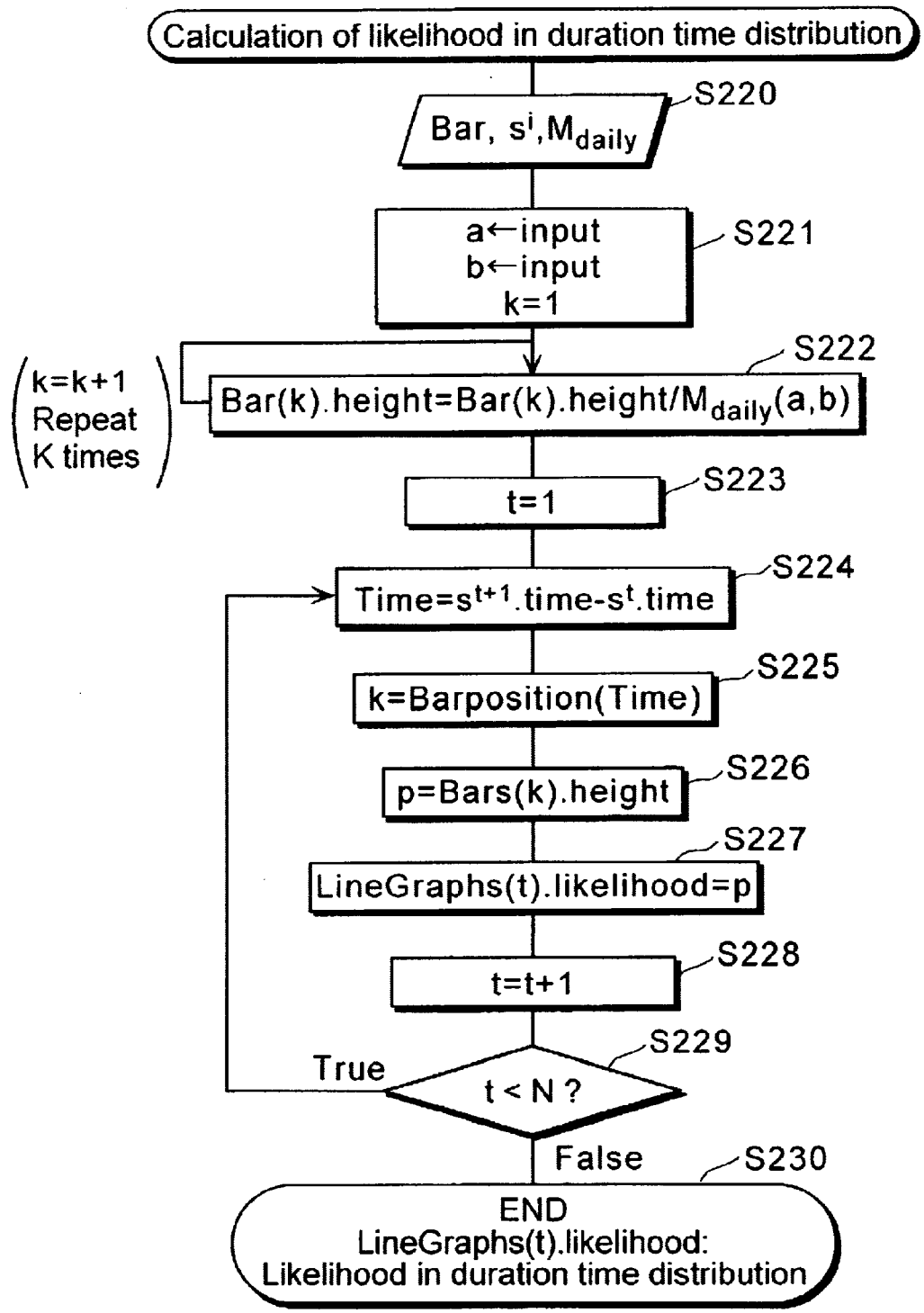
FIG. 20 is a flowchart showing a detailed calculation procedure in the above likelihood calculation.

The calculation procedure of likelihood in the above Step 31 is shown in the flowchart shown in FIG. 20. In FIG. 20, "Barposition(Time)" in Step S225 is a function for checking what number the time "Time" is in the "Barso" array. FIG. 20 shows the calculation procedure of the log likelihood "LineGraphs(t).likelihood" for the cluster sequence to be compared therewith. By calculating these log likelihoods, the average log likelihood "error" is calculated as shown in the expression 12.

The lower the value of the likelihood as calculated above is, the activity that is indicated by the activity sequence to be compared will be farther from the daily activity. Therefore, the comparing unit 34 judges whether or not this likelihood "error" is a predetermined threshold or less, and when the likelihood "error" is the threshold or less, the comparing unit 34 notifies the output unit 35 of the likelihood "error" being less than the threshold.

In this comparison method using the likelihood for the duration time distribution, a characteristic indicating how long each activity takes on a daily basis is seen. For example, the activity of "passing by the stairs" continues only a few seconds on a daily basis and the duration time distributes around values of a few seconds. If there is no movement for a few minutes (the Markov chain does not continue), it is detected as an unusual activity.

The calculation of the daily activity template as well as the details and results of five experiments for unusual activity detection using the template will now be explained below.

Experiment 1; Morning scenario

Figure 21A:
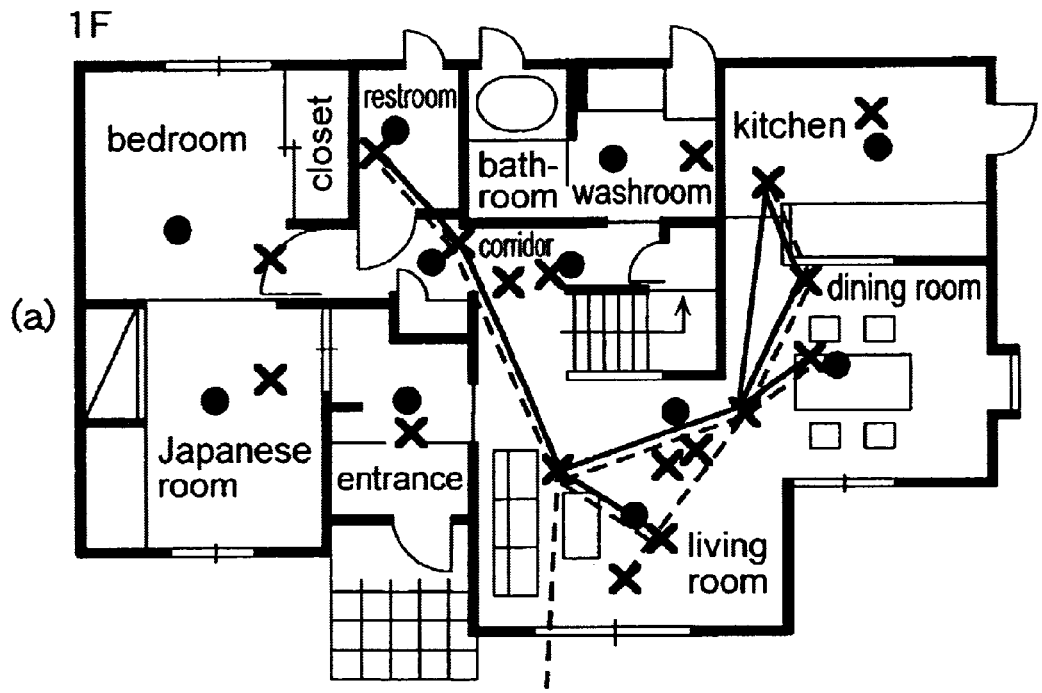
FIG. 21 is a plan view of the intelligent house showing the transition number matrix of a daily activity template in Experiment 1.
Figure 21B:
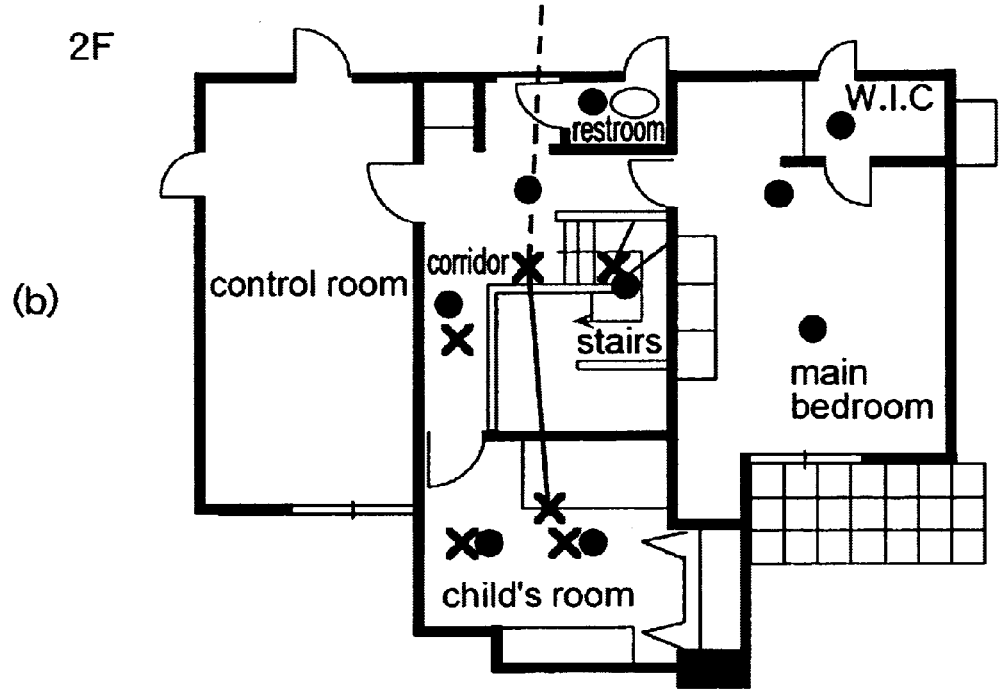
Figure 22A:
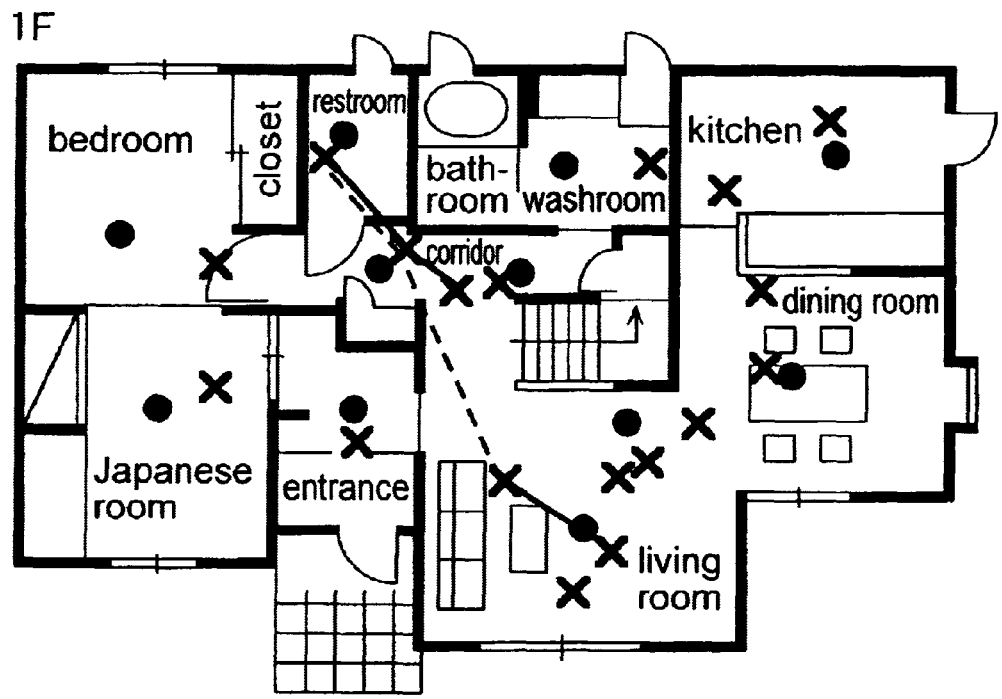
FIG. 22 is a plan view of the intelligent house showing the transition number matrix of an unusual activity in Experiment 1.
Figure 22B:
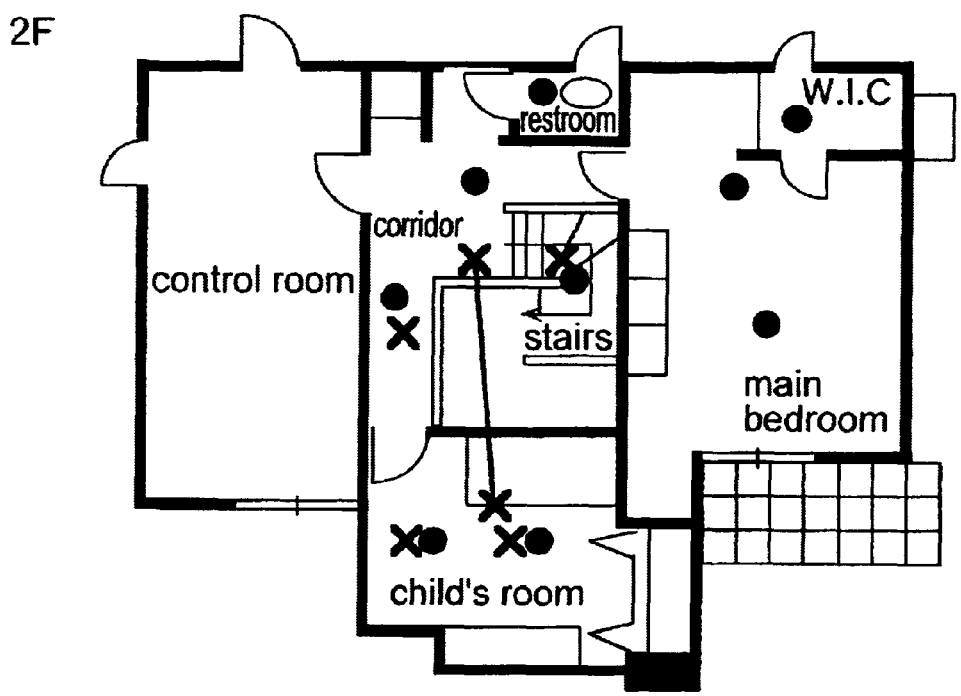

Assuming the activity sequence where a subject person who lives in the intelligent house 20 wakes up in the morning and goes out, the subject conducted the following activities and the sensory data thereof was stored. Samples of the transition number matrixes of Markov chains are shown in FIG. 21 and FIG. 22. FIG. 21 shows the transition number matrix in the daily activity template, and FIG. 22 shows the transition number matrix in the unusual activity. In these figures, full lines and broken lines which connect the clusters (x marks) indicate the activities which made a lot of transitions, that is, the full lines indicate the transitions from the clusters with smaller numbers to those with larger numbers and the broken lines indicate the transition from the clusters with larger numbers to those with smaller numbers.

Example of daily activities:

wake up→wash up→restroom→go out: 6 times wake up→wash up→go out: 6 times

Example of unusual activities:

wake up→go out: 2 times wake up→restroom→go out: 2 times wake up→wash up→restroom→go out: 1 time (different subject)

Figure 23:
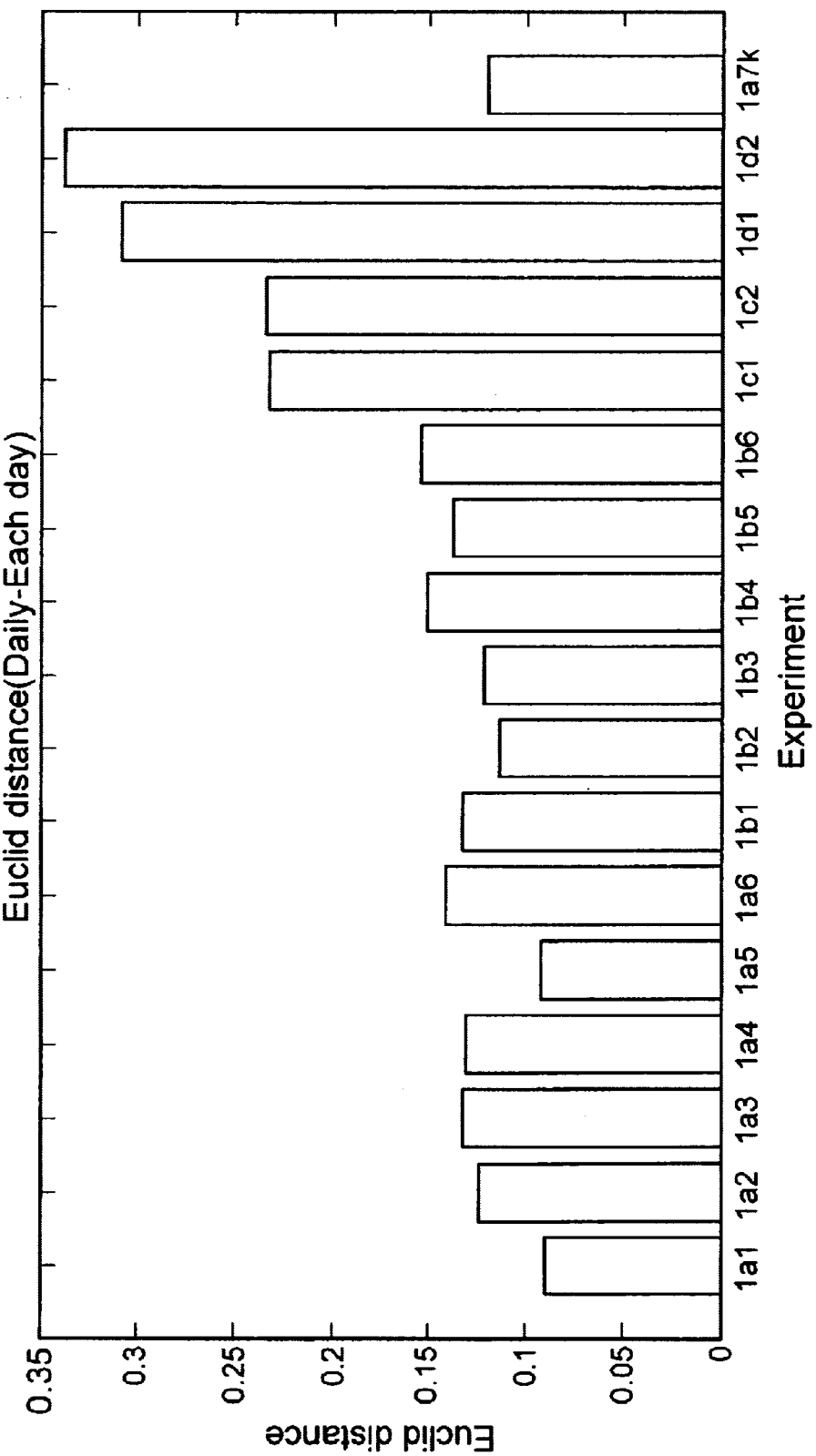
FIG. 23 is a diagram showing the distance of the appearance frequency of the Markov chain for each experiment number (sample) in the Experiment 1.

In this experiment, the transition number matrix of the Markov chain that is obtained by averaging the sensor data stored as daily examples was used as a daily activity template. FIG. 23 shows the comparison results which are made between the daily and unusual patterns and the daily activity template for the daily Markov chains using the distance comparison of the appearance frequency of the Markov chain.

In FIG. 23, the abscissa indicates the numbers of the experiments and the ordinate indicates the Euclid distances. The experiment numbers $1a1$–$1b6$ are daily examples, and the experiment numbers $1c1$–$1a7k$ are unusual patterns. The experiment number $1a7k$ is the unusual pattern of the different subject.

This result apparently shows that the distances of the unusual patterns from the daily activity template are longer and that the distances of the daily examples from the daily activity template are shorter. Therefore, comparison between this distance and a predetermined threshold allows for the detection of the occurrence of an unusual activity.

Experiment 2: Evening scenario

Assuming that a person who lives in the intelligent house 20 comes back home, has dinner, relaxes in the sofa and then goes to bed, a subject person conducted the following activities and the sensor data thereof was stored.

Examples of daily activities:

come in→prepare dinner→dinner→wash dishes→relax in sofa→go to bed: 14 times (Restroom action is added, relaxing timing may be shifted sometimes. For example: come in→restroom→prepare dinner→dinner→wash dishes→relax in sofa→go to bed)

Figure 24:
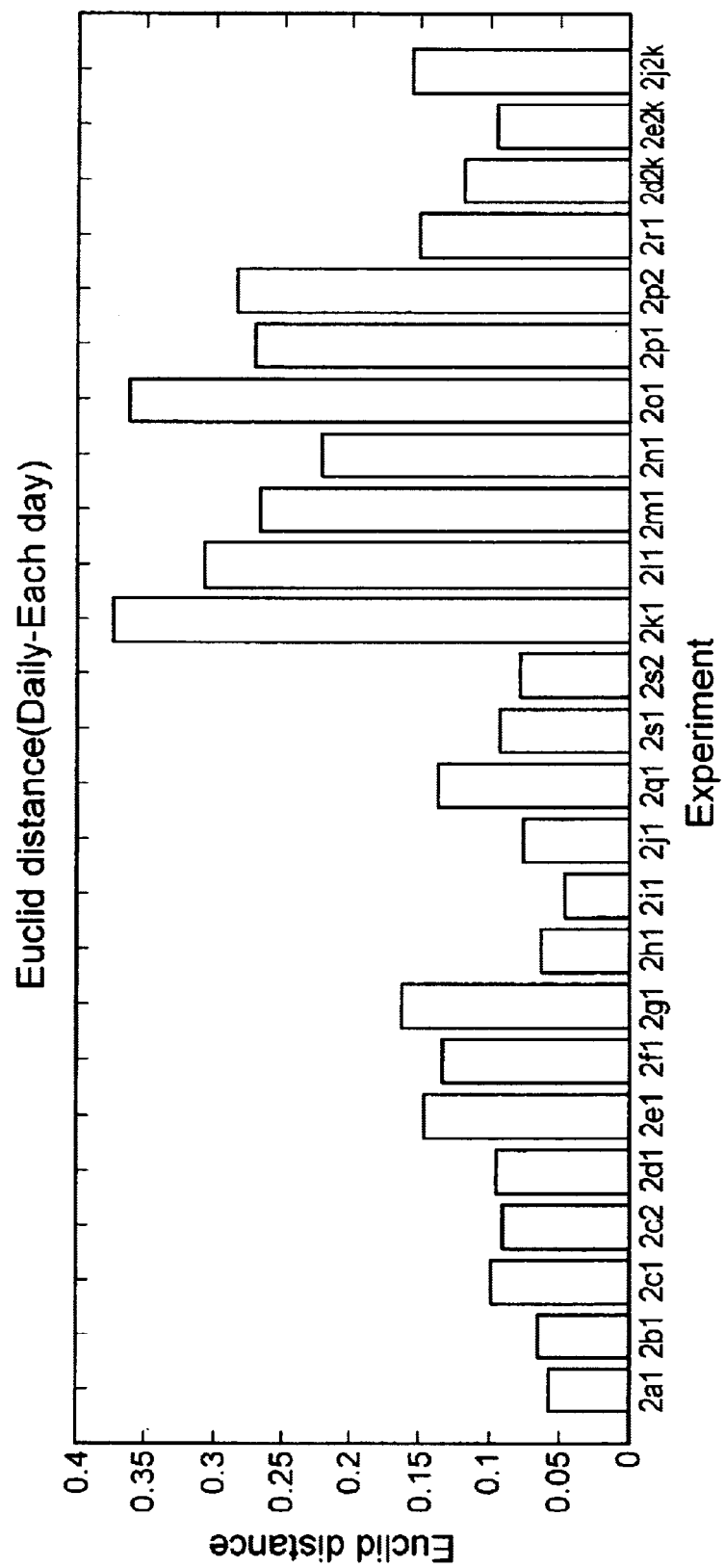
FIG. 24 is a diagram showing the distance of the appearance frequency of the Markov chain for each experiment number (sample) in Experiment 2.

Examples of unusual activities:

come in→go to bed come in→restroom→go to bed come in→wash up→go to bed come in→prepare dinner→go to bed come in→relax in sofa→restroom→go to bed come in→Japanese room→prepare dinner→dinner→wash dishes→go to bed In this experiment, the transition number matrix of the Markov chain that is obtained by averaging the sensor data stored as daily examples was used as a daily activity template. FIG. 24 shows the comparison results which are made between the daily and unusual patterns and the daily activity template for the daily Markov chains using the distance comparison of the appearance frequency of the Markov chain.

In FIG. 24, the experiment numbers $2a1$–$2s2$ are daily examples, and the experiment numbers $2k1$–$2j2k$ are unusual patterns. The experiment number $2j2k$ is the unusual pattern of the different subject.

This result apparently shows that the distances of the unusual patterns from the daily activity template are longer and that the distances of the daily examples from the daily activity template are shorter. Therefore, comparison between this distance and a predetermined threshold allows for the detection of the occurrence of an unusual activity.

Experiment 3: Sudden faint

Assuming that a person who lives in the intelligent house 20 suddenly faints near the stairs or in the living room, the activities which are conducted when a subject person walked around as usual and suddenly fainted near the stairs or in the living room and did not move were used as a sample. The sensor data that is collected in the above experiment ½ was used as a daily activity template.

Figure 25:
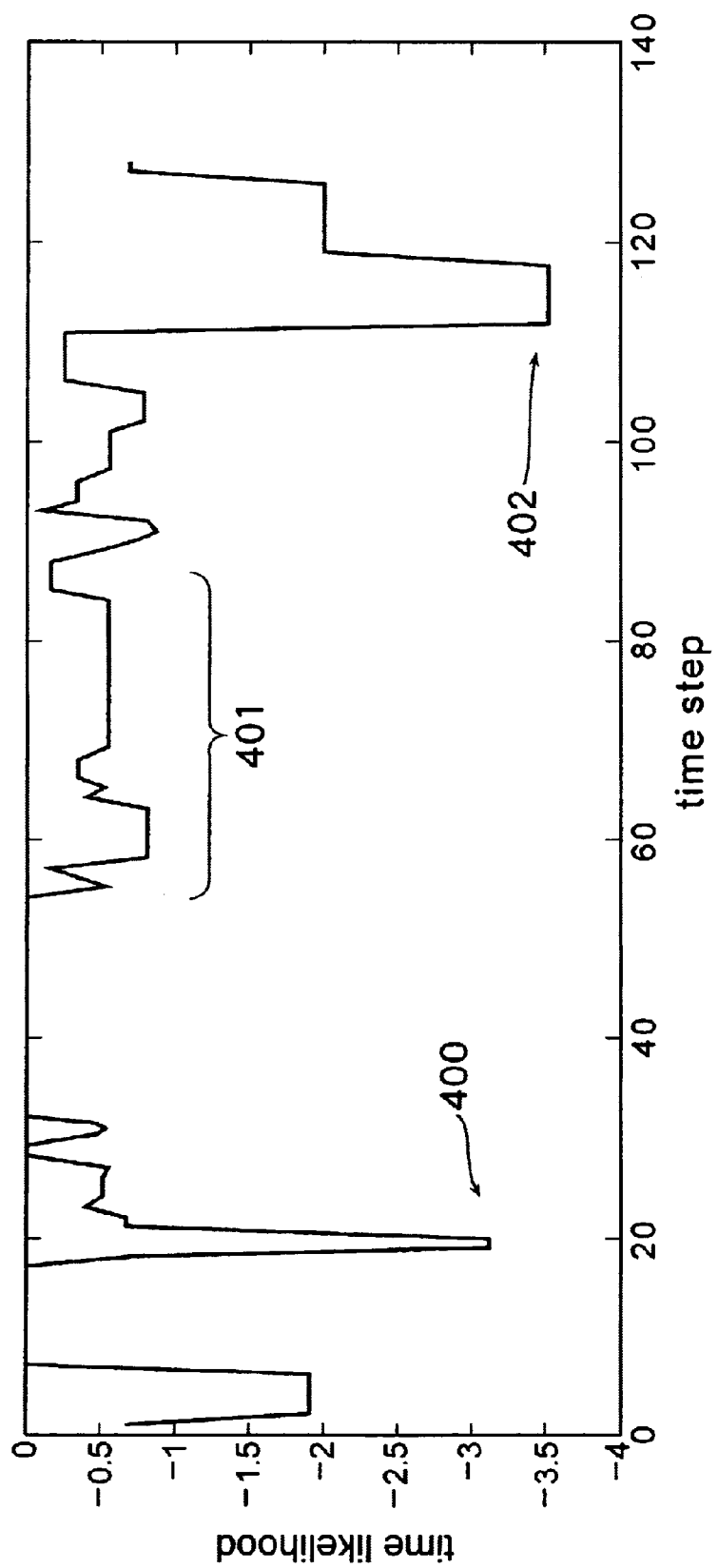
FIG. 25 is a diagram showing the likelihood for the duration time distribution of the Markov chain in Experiment 3.

FIG. 25 shows the comparison results between this sample and the daily Markov chains using the likelihood to the duration time distribution. In FIG. 25, the abscissa indicates the time intervals and the ordinate indicates the likelihood in these time intervals.

In this experiment, when the subject fainted in the living room (graph 400 in FIG. 25) or on the stairs (graph 402 in FIG. 25), the values of the likelihood are low. Therefore, comparison between this likelihood and a predetermined threshold allows for the detection of the occurrence of an unusual activity.

Experiment 4: Apartment style intelligent house

Figure 26:
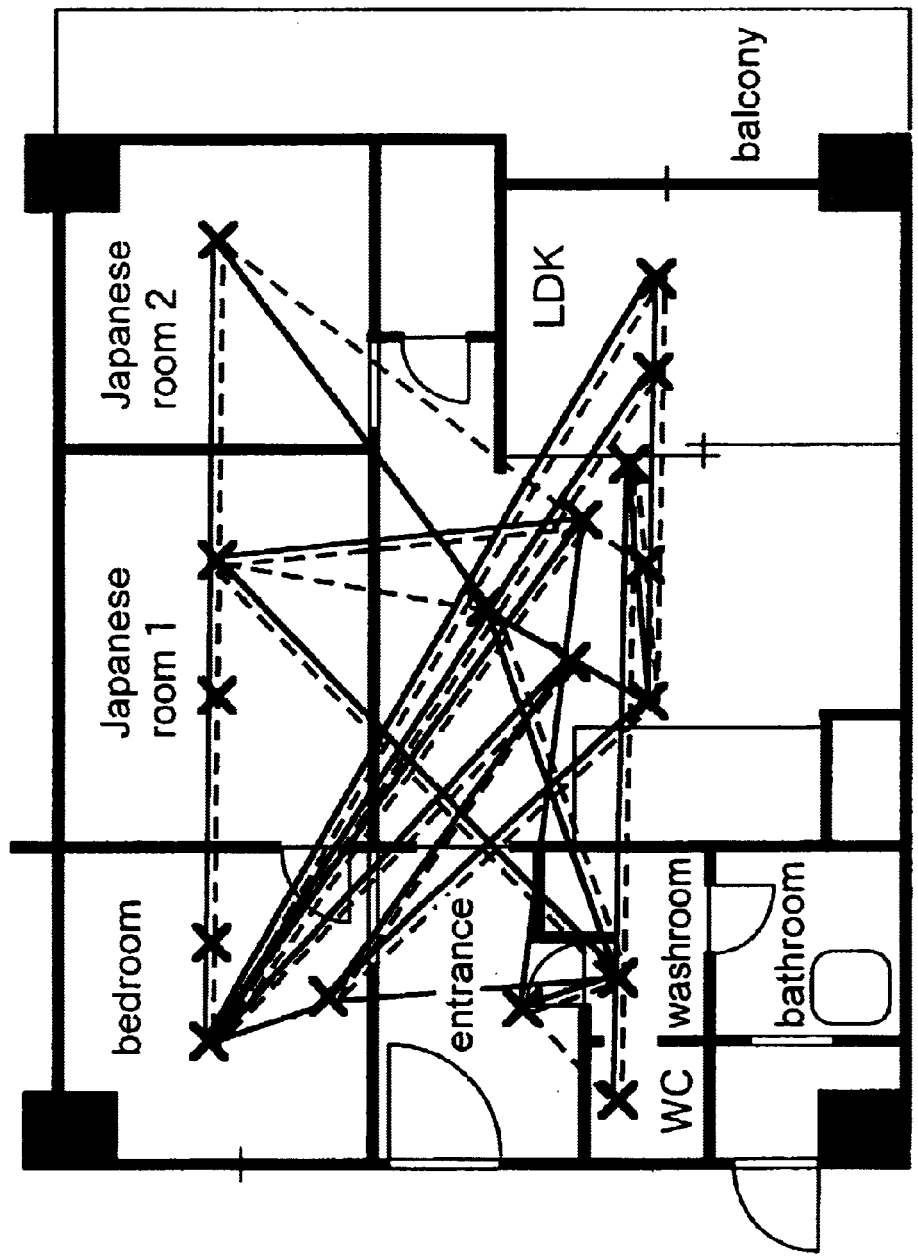
FIG. 26 is a plan view of the apartment style intelligent house showing the transition number matrix of the daily activity template in Experiment 4.

In this experiment, an apartment style intelligent house was used. In this intelligent house, fifteen small motion sensors are placed, differently from the two-story experimental house, and a subject person actually lived there for fourteen days. Assuming that the subject conducts a similar activity at the same time of the day for his life data, the transition number matrix that is obtained by averaging the activity sequences for fourteen days divided into 1-hour time periods (the full lines and broken lines in the plan view of the house in FIG. 26) was used as a daily activity template.

Figure 27:
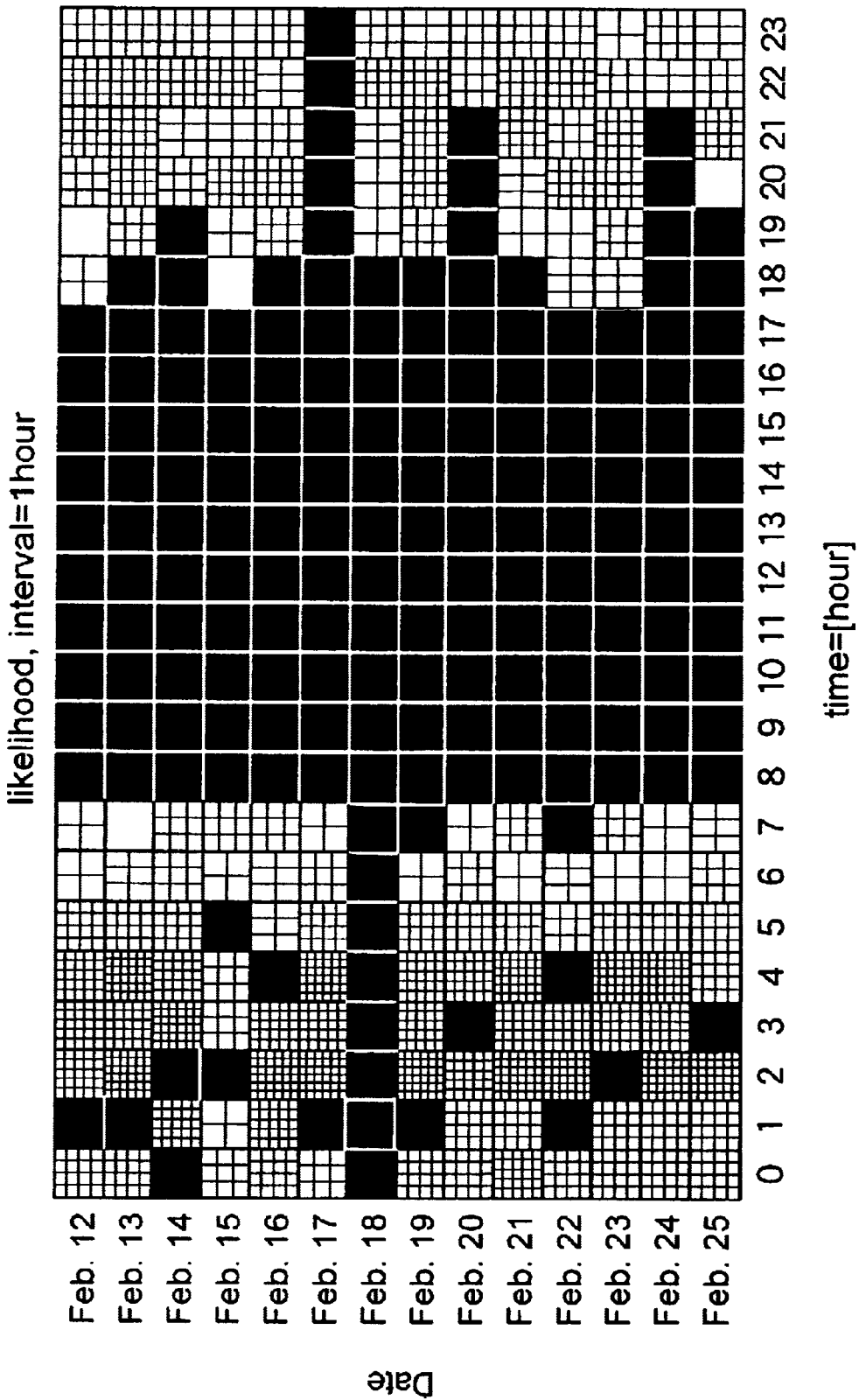
FIG. 27 is a diagram showing the likelihood of the appearance frequency of the Markov chain on every experiment day and time in Experiment 4.

FIG. 27 shows the comparison results between the activity sequences of each day and this daily activity template using the likelihood to the appearance frequency of the Markov chains. In FIG. 27, the abscissa indicates the times of the day and the ordinate indicates the dates. Also, the black squares in FIG. 27 show that there is no, or very little, activity, and the checked and white squares show that the tighter the check is, the higher the likelihood is.

In FIG. 27, let us focus attention on 19–20 o'clock of February 12 where the likelihood is extremely low. Examining the Markov chain in this time period in detail, the subject went to the washroom often. The subject went to a beauty salon in the afternoon of that day according to her report, which is the reason why she is supposed to have went to the washroom often.

Experiment 5: Daily action record

The daily action record is data based on self reports of eleven subject persons for one month regarding their five activities: sleeping, restroom use, having meals, going out and bathing (FIG. 28). FIG. 28 is a table showing the details of their reports, that is, the time periods of each activity, on a time series basis.

The entries of the subjects are acquired via the input unit 31 of the abnormality detection device 30 and operated by the Markov chain operating unit 33, and then the above data is realized. It is considered that this entry data shows that their daily activity is seen from a more temporally macroscopic viewpoint than the data that is obtained by the small motion detection sensors 25a–25c. Since this activity sequence is not the data that is obtained by the small motion detection sensors 25a–25c, the activity sequence is processed not based on vector-quantization, but only based on Markov chains.

Figure 29:
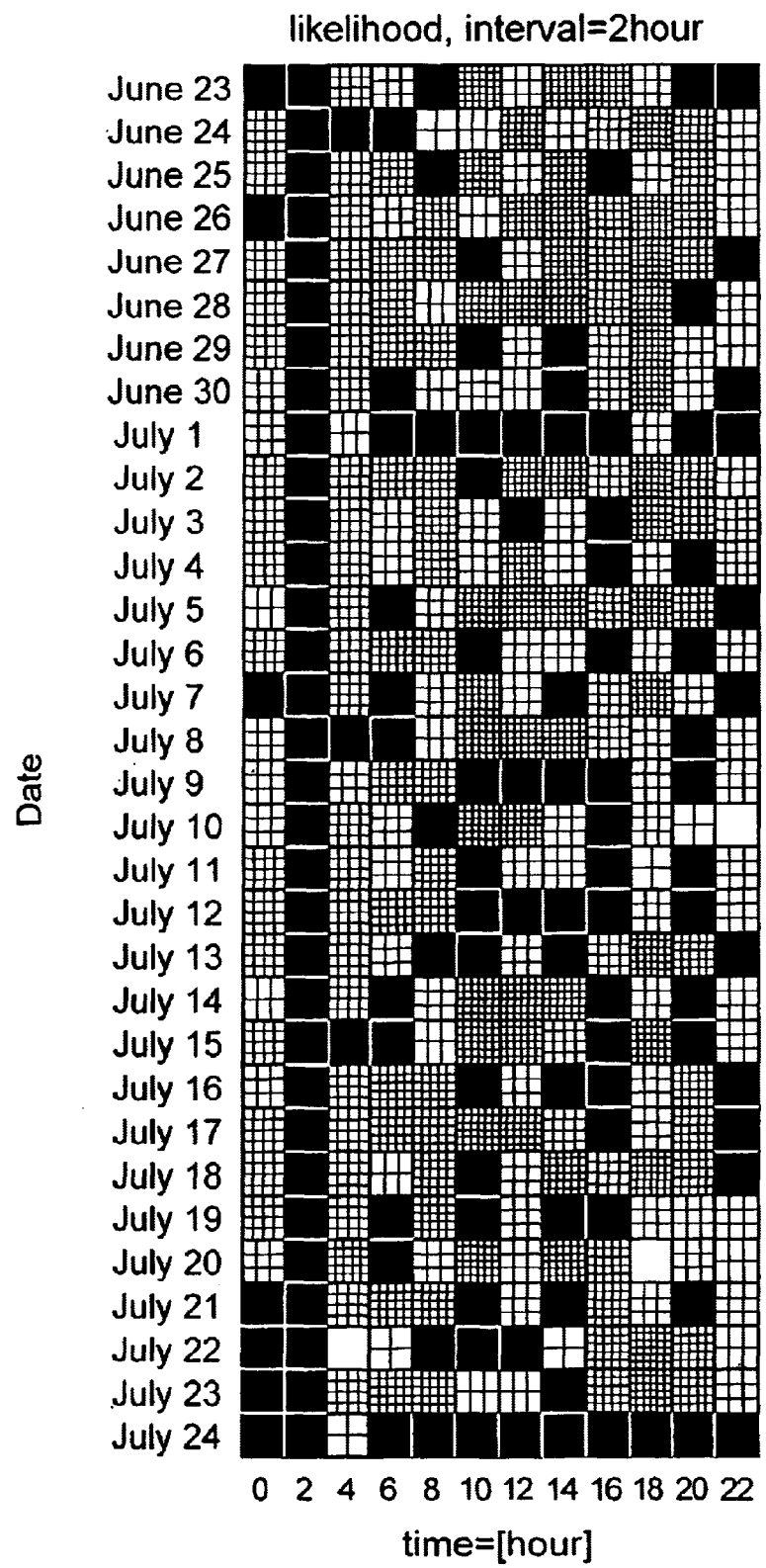
FIG. 29 is a diagram showing the likelihood of the appearance frequency of the Markov chain on every experiment day and time in Experiment 5.

FIG. 29 shows the result of the unusual activity detection for one subject which is performed by using the likelihood comparison between the appearance frequency of the Markov chains and the daily activities. The dates and times in FIG. 29 are the same as those in FIG. 28. The average of the transition matrixes for one month was used as a daily activity template.

As shown in FIG. 29, the result shows that the likelihood in the morning of July 22 is low. The data corresponding to this day (FIG. 28) shows a lot of sleeping time periods. Although the subject usually conducts regular activities, he was in bed through the morning on that day. The subject reported that he was sick with a cold on that day.

As described above, the abnormality detection device 30 describes the individual daily life, and detects an abnormality of his life via the information that is obtained by the sensors which are placed in the intelligent house. The transition number matrix of the Markov chain and the duration time distribution of the Markov chain are used for the calculation of a daily activity template. It is shown that a number of abnormal cases can be detected by comparing the unusual activities and the daily activities by using the likelihood and the distance.

A modification of the present embodiment will now be explained.

In the above-described embodiment, one daily activity template is used as the measure for judging unusual activities. In the modification described below, a plurality of daily activity templates by time interval are created in advance, and the best daily activity template is selected for every time interval from among these templates for comparison with the sample activity so as to be a measure for judging unusual activities. In the following, a global daily activity template in the above-described embodiment is called a "global template", and a daily activity template by time interval which will be explained below is called a "local template".

The significance of introducing the local template is as follows. It cannot be said that the daily life of a person who lives in the intelligent house 20 which is described by using only one global daily activity template represents his daily life accurately, because a plurality of activities are described by using only one template. Human activities can be seen as a collection of many repeatable activities such as walking down the stairs, bathing, restroom use and going from the living room to the bedroom. Accordingly, assuming that human life is made up of a plurality of daily activities and that these activities are triggered according to the situation, the sensor sequence is transformed into discrete repeatable time intervals so as to generate a local daily activity template by time interval (local template).

Using a method of image processing for the automatic sampling of time intervals, the time intervals with high correlation between templates are sampled by matching them by using a time window. Thereby, the daily life representation with temporal hierarchy can be constructed.

The basic structure of the abnormality detection system according to the present modification is the same as that of the abnormality detection system 10 according to the above-described embodiment, but is different in that the Markov chain operating unit includes a processing unit for the local template.

Figure 30:
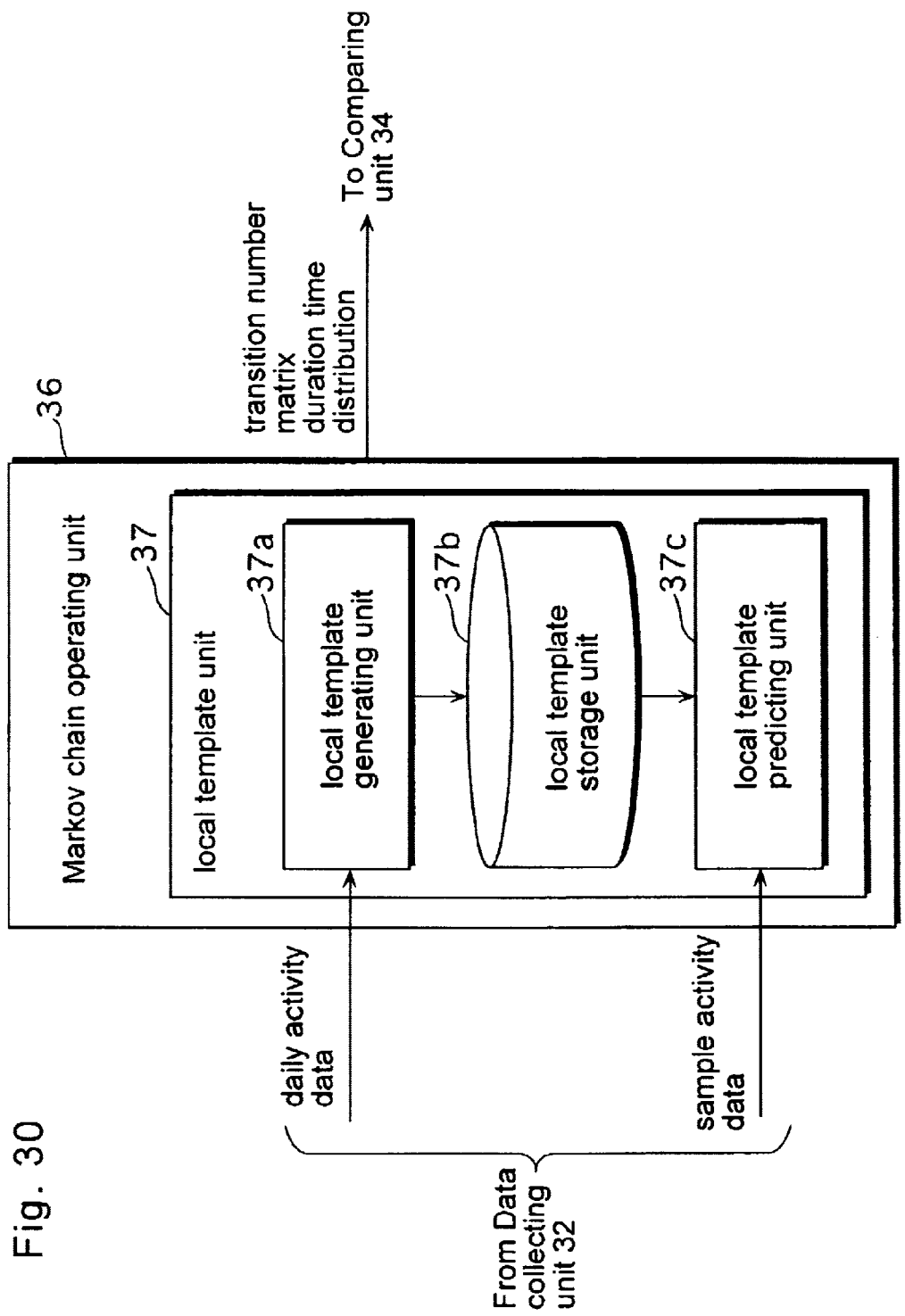
FIG. 30 is a functional block diagram showing a detailed structure of the Markov chain operating unit of the abnormality detection system according to a modification of the present invention.
Figure 32A:
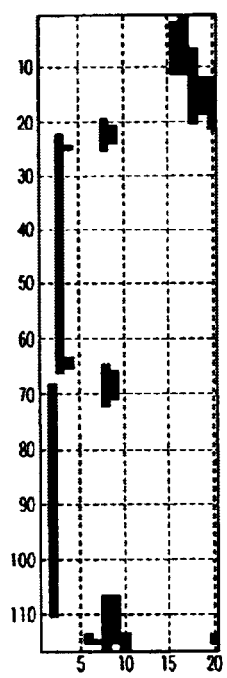
FIGS. 32A–D are diagrams showing small motion sensor sequences for explaining a local template.
Figure 32B:
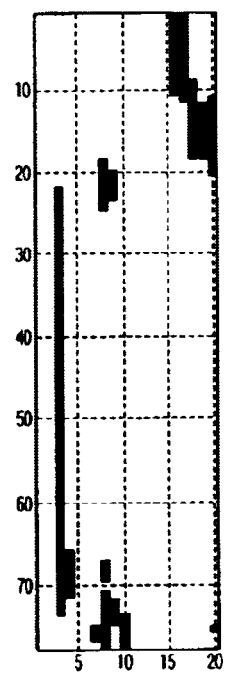
Figure 32C:
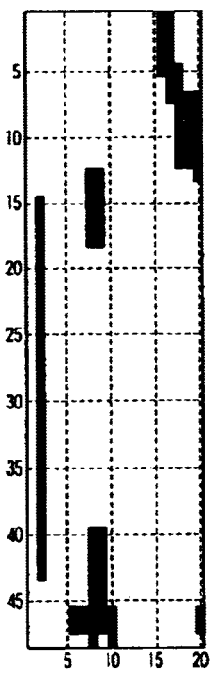
Figure 32D:
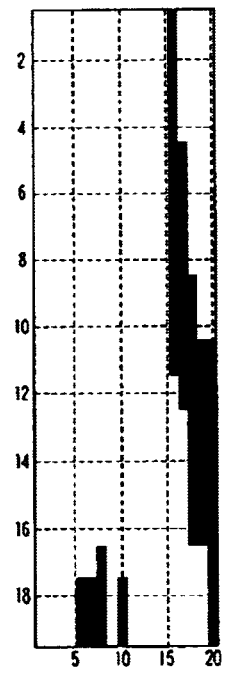
Figure 33A:
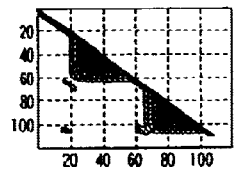
FIGS. 33A–J are diagrams showing the calculation results of the correlation of all the times for four types of the sensor sequences as shown in FIGS. 32A–D.
Figure 33B:
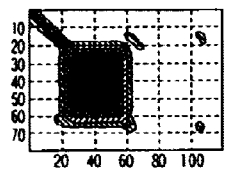
Figure 33C:
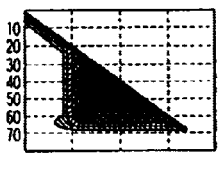
Figure 33D:
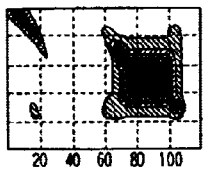
Figure 33E:
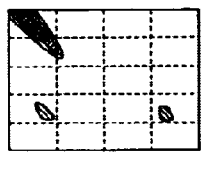
Figure 33F:
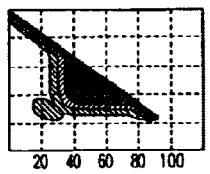
Figure 33G:
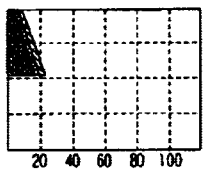
Figure 33H:
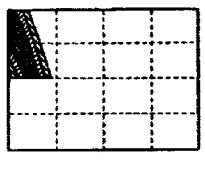
Figure 33I:
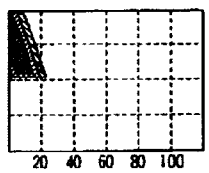
Figure 33J:
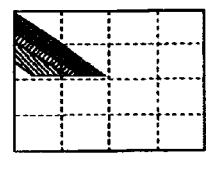
Figure 34A:
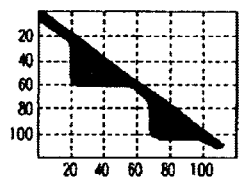
Figure 33B:
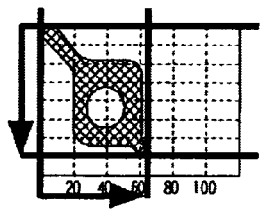
Figure 34C:
Figure 34D:
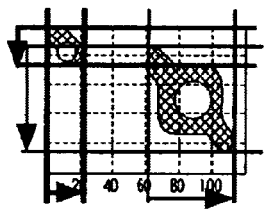
Figure 34E:
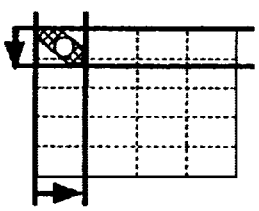
Figure 34F:
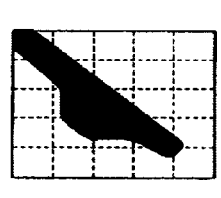
Figure 34G:
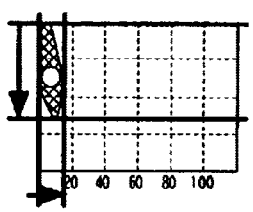
Figure 34H:
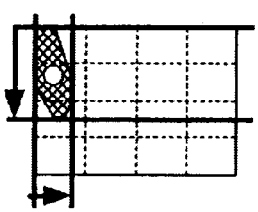
Figure 34I:
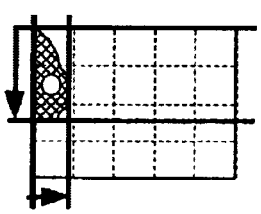
Figure 34J:
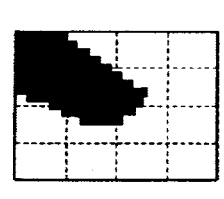
Figures 35A, 35B, 35C, 35D:
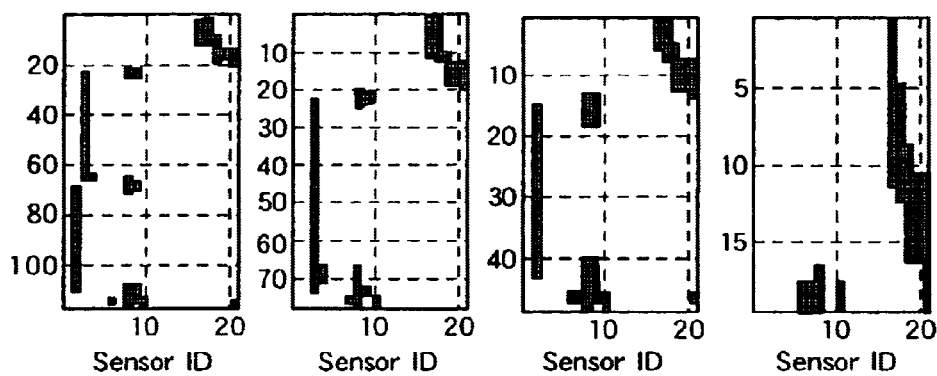
FIGS. 35A–H are diagrams showing examples of the sampling of similar sequence intervals from four types of the sequences for morning scenarios.
Figures 35E, 35F, 35G, 35H:
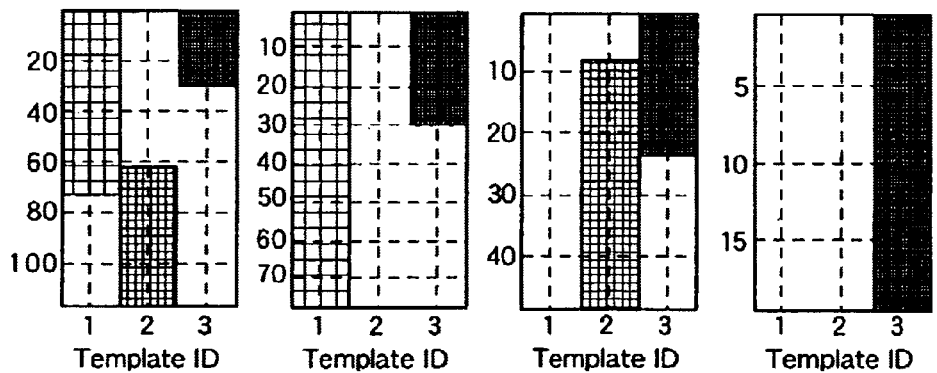

FIG. 30 is a functional block diagram showing a detailed structure of the Markov chain operating unit 36 of the abnormality detection system according to the modification of the present invention. This Markov chain operating unit 36 includes a local template unit 37 that performs processing on a local template in addition to the functions of the Markov chain operating unit 33 of the above-described embodiment.

The local template unit 37 includes a local template generating unit 37a that is activated in the reference data creating mode, a local template storage unit 37b that stores the result generated by the local template generating unit 37a and a local template predicting unit 37c that is activated in the monitoring mode.

The local template generating unit 37a generates a plurality of local templates by a predetermined time interval based on the daily activity data that is sent from the data collecting unit 32, calculates the characteristics thereof (the predicted probability and duration time of the local templates), and stores the local templates and the characteristics thereof in the local template storage unit 37b. The local template predicting unit 37c predicts and selects the best local template for the inputted sample activity data from among a plurality of potential local templates for every time interval based on the predicted probability and duration time of the local templates which are stored in the local template storage unit 37b. The Markov chain operating unit 36 outputs for every time interval the information (the transition number matrix and the duration time distribution) that is the same as that in the above-described embodiment to the comparing unit 34 by using the local template selected by the local template predicting unit 37c as a measure. The comparing unit 34 compares them so as to judge unusual activities.

The detailed processing which is performed by the local template generating unit 37a and the local template predicting unit 37c will now be respectively explained by using the following flowcharts.

FIG. 31 is a flowchart showing the operation of the local template generating unit 37a. The local template generating unit 37a resolves the daily activity data into activity sequences (Step S300).

Here, the local template generating unit 37a resolves into activity sequences by matching templates using a time window, which is an application of an image processing method.

More specifically, the sequence resolution is performed according to the following algorithm. The sensor sequence which is obtained in the intelligent house 20 are the time when the sensor value changes and the sensor pattern at that time. In this case, as shown in the small motion sensor sequences in FIGS. 32A–D, the sensor pattern is transformed into the sensor pattern sequence per second (the maximum resolution of time). FIGS. 32A–D show the sensor sequences that are detected by four small motion detection sensors, which represent a morning scenario.

It is assumed that very similar time intervals are sampled respectively from two small motion sensor sequences, $b_1(t_1, j)$, $b_2(t_2, j)$ and $t_1=(1 \ldots N_1)$, $t_2=(1 \ldots N_2)$, $j=(1, \ldots, J)$. Here, $t_1$ and $t_2$ are times per second, and j is a sensor channel of each of the small motion detection sensors $25a$–$25c$. This sensor sequence is binary, and can be processed as a binary image. Then, template matching is performed by using a time window.

The size W of the time window is defined, and $b_1(t_1 \ldots t_1+W, j)$, and $b_2(t_2 \ldots t_2+W, j)$ are correlated with each other. The correlation is represented by the following expression which is used for the template matching.

$$R(t_1, t_2) = \frac{\sum_{t=1}^{W} \sum_{j=1}^{J} b_1(t_1+t, j) b_2(t_1+t, j)}{R'(t_1, t_2)}$$

$$R'(t_1, t_2) = \left\{ \sum_{t=1}^{W} \sum_{j=1}^{J} b_1(t_1+t, j) b_1(t_1+t, j) \right\}^{\frac{1}{2}} \times \left\{ \sum_{t=1}^{W} \sum_{j=1}^{J} b_2(t_2+t, j) b_2(t_2+t, j) \right\}^{\frac{1}{2}}$$

This is a normalized correlation, and can be used as a distance measure between images. This correlation is calculated in every interval between $t_1=(11, \ldots, N_1-W)$ and $t_2=(1, \ldots, N_2-W)$, and the obtained correlation R is seen as an image of $N_1-W \times N_2-W$, as shown in the correlations in FIGS. 33A–J. FIGS. 33A–J are diagrams showing examples of the correlation $R(t_1, t_2)$, and calculation results of correlation of all of the times for four types of the sensor sequences as shown in FIGS. 32A–D.

The image that is obtained by this correlation is binarized with a threshold a according to the following expression.

$$R_{bin}(t_1, t_2) = \begin{cases} 1 & R(t_1, t_2) > \alpha \\ 0 & R(t_1, t_2) \leq \alpha \end{cases}$$

This binary image $R_{bin}(t_1, t_2)$ is labeled, and the labeled image is represented by $L_v$, (v=1, \ldots, V). The starting time (the minimum value of each axis) $t^v_{1,min}$ and $t^v_{2,min}$ and the ending time (the maximum value) $t^v_{1,max}$ and $t^v_{2,max}$ are sampled for each axis $t_1$ and $t_2$ of $L_v$,(v=1, \ldots, V), and (t'1.min, t'1.max) and (t'2.min, t'2.max) at that time are treated as the same sequences that are similar intervals of the sequence.

FIGS. 34A–J show examples of binarization $R_{bin}(t_1, t_2)$ and labeling $L_v$,(v=1, \ldots, V) of the correlation $R(t_1, t_2)$ and sampling of each time period thereof. The sequence intervals with the same pattern in the interval that is indicated by arrows are the same sequence intervals.

Since this shows the correlation between two intervals only, the similarity in every combination of labeled images V×V needs to be considered. Accordingly, considering (t'1.min,t'1.max) and (t'2.min,t'2.max) as a two-dimensional vector, this interval is compared with the interval that is sampled from the other labeled image so as to regard the similar one as a similar interval. Euclid distance is used as this measure. A threshold u is specified, and it is determined that they are the same intervals when the distance between them is the threshold or less. This is represented by the following expression. As for two labeled images $v_1$ and $v_2$, when $$D(v_1, v_2) = \sqrt{(t_{min}^{v_1} - t_{min}^{v_2}) + (t_{max}^{v_1} - t_{max}^{v_2})} < \mu$$

is effected, it is considered that
$(t_{min}^{v_1}, t_{max}^{v_1})$ and $(t_{min}^{v_2}, t_{max}^{v_2})$
are similar intervals. These same similar intervals are collected as sets and are respectively represented by $u_g$,(g=1, \ldots, G). Note that $u_g$ are disjoint sets to each other because the same similar intervals are treated as one set.

ex.$u_1 = \{ t_{1,min}^{v_2}, t_{1,max}^{v_2} ), (t_{2,min}^{v_2}, t_{2,max}^{v_2}) (t_{1,min}^{v_3}, t_{1,max}^{v_3}), (t_{2,min}^{v_3} t_{2,max}^{v_3}) \}$ FIGS. 35A–H and FIGS. 36A–D show examples of the sampling of similar intervals for a complicated sequence. FIGS. 35A–H show examples of the sampling of similar sequence intervals in four cases of a morning scenario. FIGS. 35A–D respectively indicate the sensor sequences of the case 1 (wake up→wash up→restroom→go out), the case 2 (wake up→wash up→restroom→go out), the case 3 (wake up→restroom→go out) and the case 4 (wake up→go out), and FIGS. 35E–H respectively indicate the examples of the sampling of similar sequence intervals corresponding to the cases 1–4.

Figure 36A:
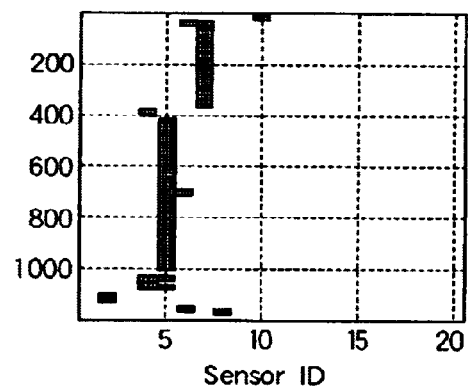
FIGS. 36A–D are diagrams showing examples of the sampling of similar sequence intervals from two types of the sequences for evening scenarios.
Figure 36B:
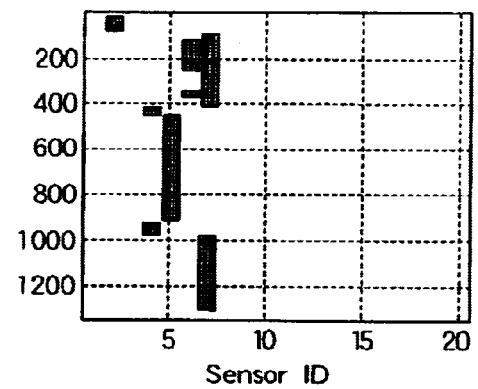
Figure 36C:
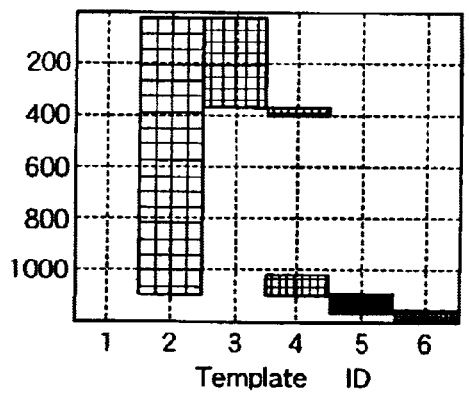
Figure 36D:
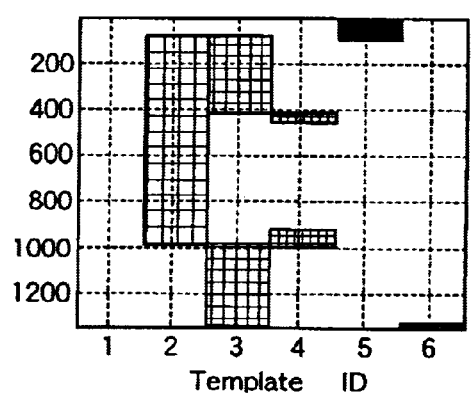

FIGS. 36A–D show examples of the sampling of similar sequence intervals in two cases of evening scenarios. FIGS. 36A and B respectively indicate the sensor sequences of the case 1 (come in→light ON→relax in sofa→prepare dinner→dinner→wash dishes→restroom→light OFF→go to bed) and the case 2 (come in→light ON→restroom→relax in sofa→prepare dinner→dinner→wash dishes→relax in sofa→light OFF→go to bed), and FIGS. 36C and D respectively indicate the examples of sampling of similar sequence intervals corresponding to the cases 1.

Note that the parameters which are used for the above processing are empirically W=10, α=0.7 and μ=10.

Next, the local template generating unit 37a averages the local templates in the similar sequence intervals obtained in the above Step S300 (Step S301 in FIG. 31). In other words, the local template generating unit 37a averages local templates by using the similar interval which is obtained in Step S300 as one local template.

More specifically, the transition number sequence from the state j to the state i in the cluster sequences $S^t_v(v \in u_g)$ that is obtained by clustering each similar interval is defined by the transition number matrix $F^v[f^v_{ij}]$.

Using this, the transition probability based on the Markov chain representing a local template is calculated according to the following expression.

$$M^g = [m^g_{ij}] = \left[ \frac{\sum_{v \in u_g} f^v_{ij}}{\sum_{i,j} \sum_{v \in u_g} f^v_{ij}} \right]$$

Then, the local template generating unit 37a calculates the Markov chain between the local templates which are obtained in Step S301 (Step S302 in FIG. 31).

More specifically, when the local template is obtained in Step S301, the local template generating unit 37a calculates the template transition probability $M^{template}$ where the transition between the templates is regarded as a Markov chain. By transforming the template transition probability into a prior distribution to be a local template prediction distribution, the occurrence probability of the local template which is likely to occur at present can be predicted based on the appearance results of the local templates in the past sequences.

The appearance sequence of the local templates is $z^p$ and the appearance time are $y^p$. P indicates the times when the local templates changed from the current time, and is obtained by transforming the times t into discrete data according to the appearance order. The number of possible states is the number G of all the local templates, and the number of G×G combinations of the state transitions can be defined. Here, the number of transitions from the state j to the state i in $z^p$ is defined by the transition number matrix $F^{template} = [f_{ij}^{template}]$ When transition number matrix is normalized into probability, the following expression is obtained.

$$M^{template} = [m_{ij}^{template}] = \left[ \frac{f_{ij}^{template}}{\sum_{i,j} f_{ij}^{template}} \right]$$

$$\sum_{i,j} m_{ij}^{template} = 1$$

This transition probability $M^{template}$ is transformed into the predicted probability $M_{predict}^{template}$ by normalizing $M^{template}$ when the state j at the time p−1 is fixed. This predicted probability is obtained by the same calculation as the prior probability in the state transition between the local templates.

$$M_{predict}^{template} = [m_{predict,ij}^{template}] = \left[ \frac{m_{ij}^{template}}{\sum_{i} m_{ij}^{template}} \right]$$

Also, for every chain between the local templates, the average duration time thereof $q_{ij}^{template}$ is calculated.

$$q_{ij}^{template} = \frac{1}{f_{ij}^{template}} \sum_{\{p \mid y^{p+1} = i, y^p = j\}} (y^{p+2} - y^p)$$

Note that the ending time of the transition of p, p+1 is the appearance time of p+2.

Finally, the local template generating unit 37a stores the predicted probabilities and the duration times of a plurality of the local templates which are obtained in Step S300 and the local templates which are obtained in Step S302 in the local template storage unit 37 b (Step S303 in FIG. 31).

Figure 37:
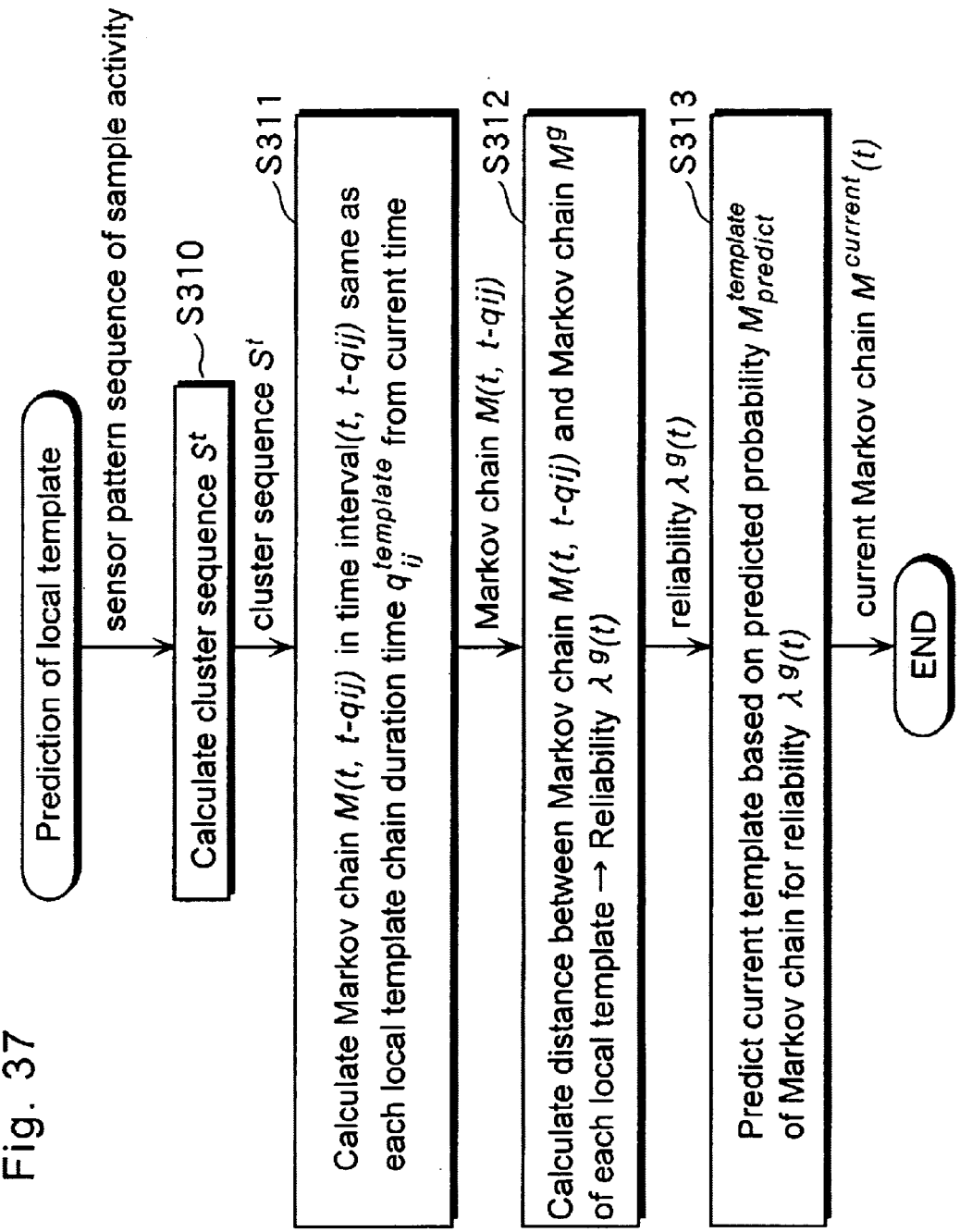
FIG. 37 is a flowchart showing the operation of a local template predicting unit of the abnormality detection device shown in FIG. 30.
Figure 38A:
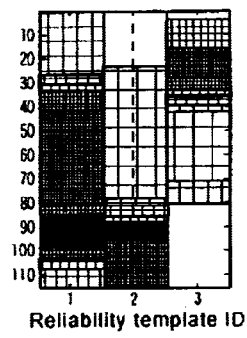
FIGS. 38A–H are diagrams showing reliability and predicted templates.
Figure 38B:
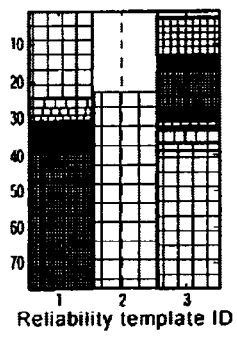
Figure 38C:
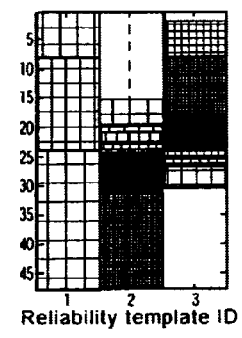
Figure 38D:
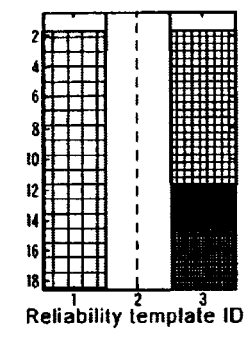
Figure 38E:
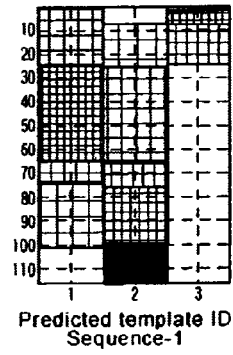
Figure 38F:
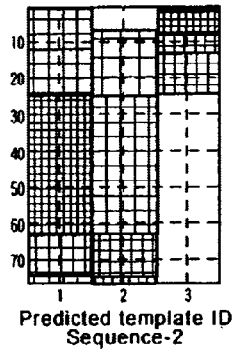
Figure 38G:
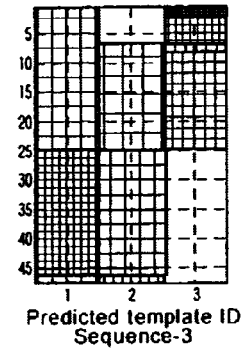
Figure 38H:
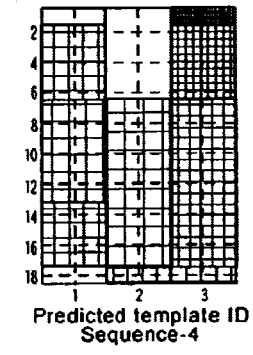
Figure 39A:
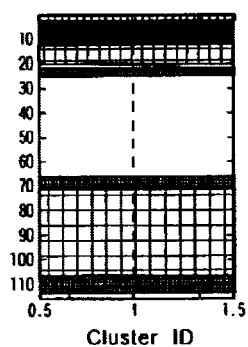
FIGS. 39A–H are diagrams showing input cluster sequences and predicted templates.
Figure 39B:
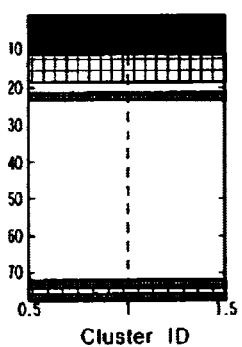
Figure 39C:
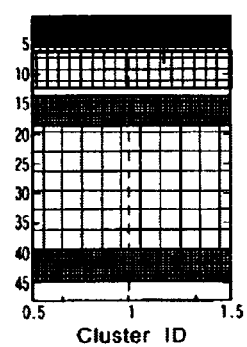
Figure 39D:
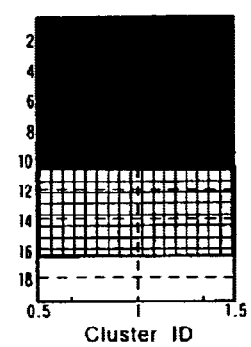
Figure 39E:
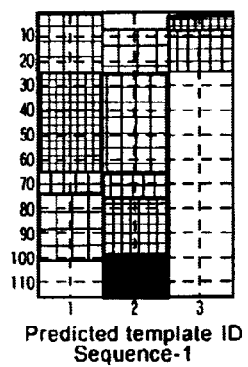
Figure 39F:
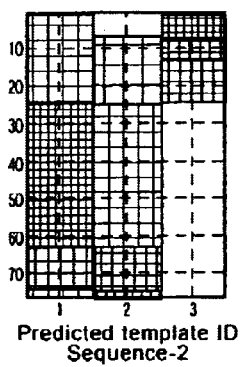
Figure 39G:
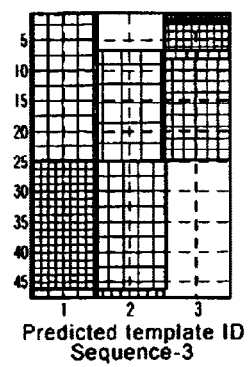
Figure 39H:
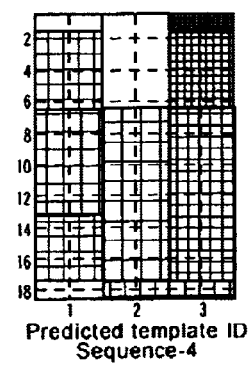

FIG. 37 is a flowchart showing the operation of the local template predicting unit 37c. When the local template storage unit 37b actually uses the local template prediction model according to Markov chains for the sample activities, the local template predicting unit 37c identifies the appearance of the local template j by using the distance between the transition probabilities of Markov chains, and predicts the next template based on the identified reliability.

More specifically, the local template predicting unit 37c first makes the sequence $b^t$ of the inputted sample activity into a cluster in the same manner as Steps S10–S12 in the flowchart in FIG. 5 so as to obtain the cluster sequence $s^t$ (Step S310).

Then, as for the cluster sequence $s^t$ that is obtained by making the inputted sequence $b^t$ into a cluster, the local template predicting unit 37c calculates the Markov chain $M(t, t−q_{ij})$ in the time interval $(t, t−q_{ij})$ of the same length as each local template chain duration time from the current time (Step S311).

Next, the local template predicting unit 37c calculates this Markov chain and the distance (cosine) of the Markov chain Mg of each local template so as to be the reliability $\lambda^g(t)$ of the local template g at the time t (Step S312).

$$\lambda^g(t) = vector(M't(t, t−q_{ij})) \cdot vector(M'g)^t$$

$$M'(t, t−q_{ij}) = \frac{M(t, t−q_{ij})}{\|M(t, t−qij)\|}$$

$$M'^g = \frac{M^g}{\|M^g\|}$$

Note that "vector" represents a function for transforming a matrix into a column vector.

Finally, the local template predicting unit 37c predicts the current template $\phi[]$ G for the reliability that is obtained in the above step from the following predicted probability of the Markov chain.

$M_{predict}^{template}$

Based on the above, the current Markov chain $M^{current}(t)$ is defined as follows.

$$M^{current}(t) = [m_{ij}^{current}(t)] = \left[ \frac{\sum_{g \in G} a^g(t) \cdot m_{ij}^g}{\sum_{i,j} \sum_{g \in G} a^g(t) \cdot m_{ij}^g} \right]$$

$$a^g(t) = \max_{p=1}^{t} \max_{\varphi \in G} \left( \lambda^g(p) \cdot m_{predict,g,\varphi}^{template} \right)$$

Based on the above, the Markov chain operating unit 36 performs sequential calculation of $M^{current}(t)$ when using the local template as a judgment measure.

FIGS. 38A–H and FIGS. 39A–H are diagrams showing examples of various local templates determined as described above. FIGS. 38A–H are diagrams showing examples of reliability $\lambda^g(t)$ and predicted templates $M^{current}(t)$. FIGS. 38A–D respectively show the reliability $\lambda^g(t)$ in the above-mentioned four cases, and FIGS. 38E–H respectively show the local templates $M^{current}(t)$ which are predicted based on the reliability shown in FIGS. 38A–D.

FIGS. 39A–H are diagrams showing examples of inputted cluster sequences $s^t$ and the predicted templates $M^{current}(t)$. FIGS. 39A–D respectively show the cluster sequences $s^t$ in the above-mentioned four cases, and FIGS. 39E–H respectively show the local templates $M^{current}(t)$ which are predicted for the cluster sequences $s^t$ shown in FIGS. 38A–D.

The Markov chain that is used for predicting local templates can be extended as follows by being combined with the prediction of cases.

The transition matrix of the Markov chain between the templates for each sequence $s^t_v (v=1, \ldots, V)$ which was used for generating $M^{template}$ is calculated to be $F_v^{template}$. Then, a weighted average of the predicted value of each case is obtained for this Markov chain.

$$F^{template} = \sum_v \xi^t \cdot F_v^{template}$$

$$\xi^t = \text{vector}(M'(t)) \cdot \text{vector}(M'^g)'$$

$$M'(t) = \frac{M(t)}{\|M(t)\|}$$

$$M'^g = \frac{M^g}{\|M^g\|}$$

Based on the above, the prediction distribution can be generated.

Also, there are the following two measures for deleting unnecessary local templates.

As the first measure, based on the assumption that the local template that is obtained from each sensor sequence appears with a regular frequency, the variance of number of the appearances in the sensor sequence of each local template is calculated. The local template with a larger variance value is deleted. Based on this noise deletion measure, the sequence whose sampled time interval is very short and is considered not to be appropriately related to the human-perceptible activity unit is deleted. However, since a certain level of the dispersion of appearance frequency must be accepted, it is preferable to choose a modest threshold.

As the second measure, a measurer Γ similar to AIC is preset so as to search for the required local template according to the SA method.

Γ=−(average likelihood of all sequences)
+v·(number of templates)

(wherein v is a coefficient and empirically set to be 0.05.)

Figures 40A, 40B, 40C, 40D, 40E, 40F:
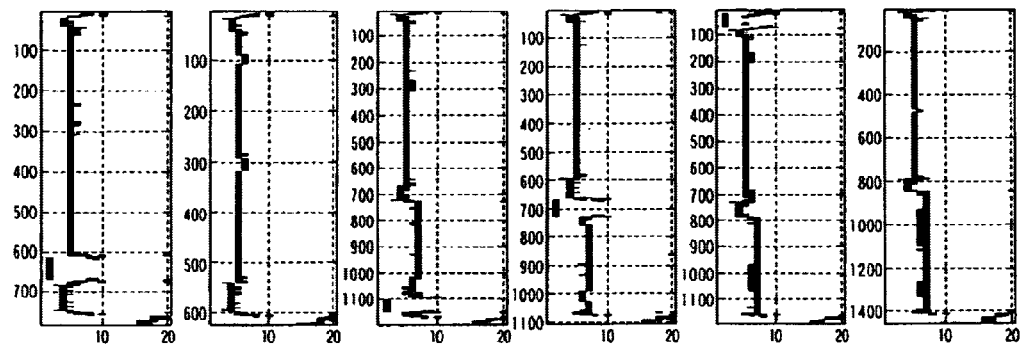
FIGS. 40A–F are diagrams showing the sequences for sampling six types of the local templates.
Figures 40G, 40H, 40I, 40J, 40K, 40L:
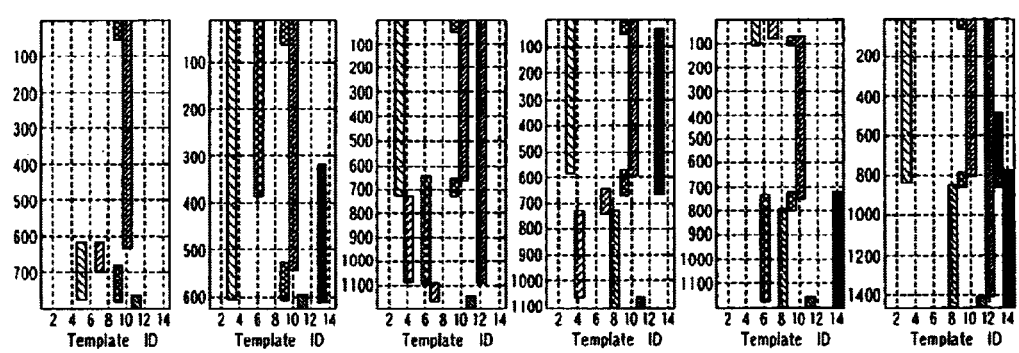
FIGS. 40G–L are diagrams showing local templates before selecting the local templates corresponding to FIGS. 40A–F, and FIGS. 40M–R are diagrams showing local templates after selecting the local templates corresponding to FIGS. 40A–F.
Figures 40M, 40N, 40O, 40P, 40Q, 40R:
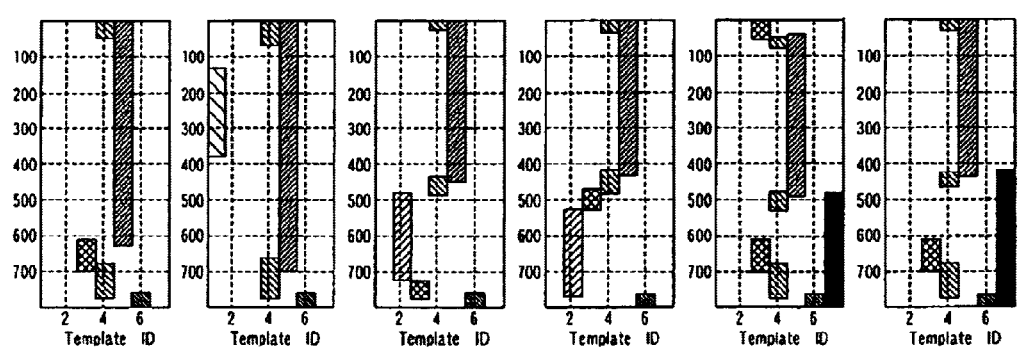

A combination of local templates that minimizes Γ is searched according to the SA method. Based on this noise deletion measure, the templates are chosen so that the entropy is as low as possible and that the sequence is represented with as few templates as possible. FIGS. 40A–F show examples of the templates which are chosen. FIGS. 40A–F show sequences for sampling six types of the local templates, FIGS. 40G–I show local templates before selecting the local templates respectively corresponding to FIGS. 40A–F, and FIGS. 40M–R show local templates after selecting the local templates respectively corresponding to FIGS. 40A–F.

The advantages of using the local template determined as described above as an activity standard will now be explained based on the comparison with the global template, using the following three experiments.

Experiment 1: Morning scenario

This experiment is the same as Experiment 1 (Morning scenario) in the above-described embodiment. Accordingly, the transition matrix of the Markov chain in the daily example which is used for leaning and evaluation is the same as that shown in FIG. 21, while the transition matrix of the Markov chain in the unusual pattern is same as that shown in FIG. 22.

Figure 41:
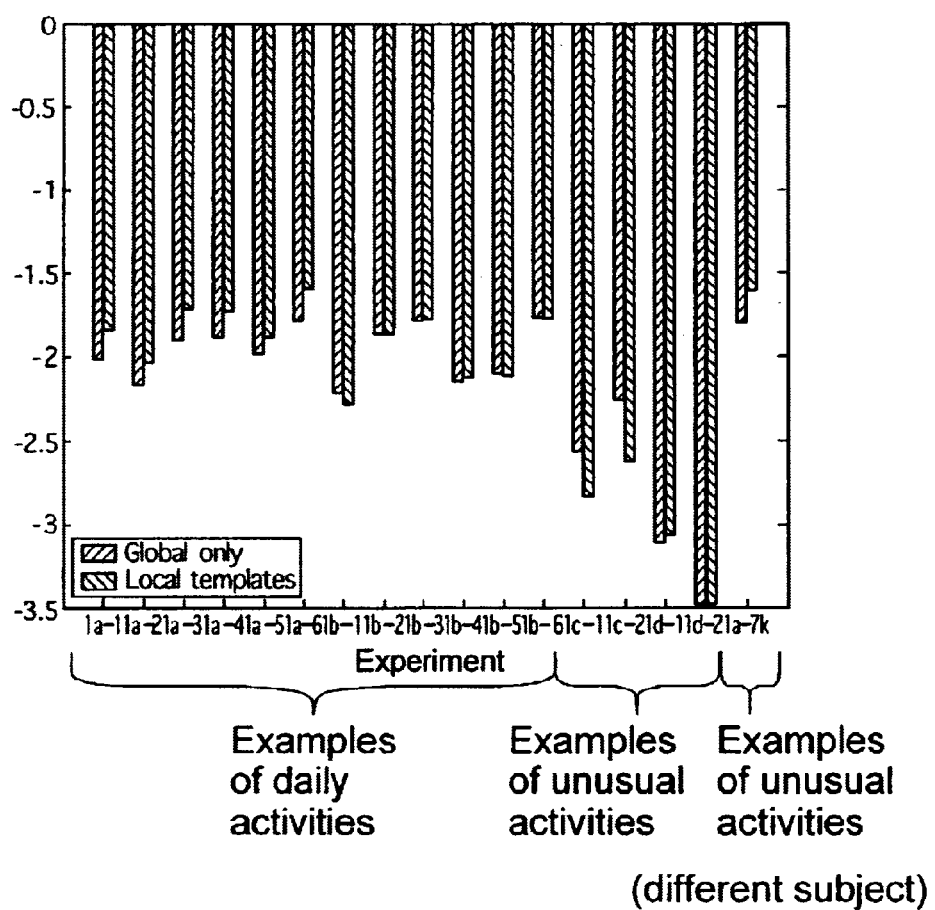
FIG. 41 is a diagram showing a comparison of the average log likelihood between the case where a global template is used and where a local template is used in Experiment 1.

As for the cases when the global template is used for the daily activities and the unusual activities and as for the cases when the local template is used for both activities, when the average log likelihoods $Err^{likelihood}$ of the activity sequences to the transition probability of the daily activity template are compared, the result shown in FIG. 41 was obtained.

In FIG. 41, the abscissa indicates experimental samples and the ordinate indicates the likelihood $Err^{likelihood}$ of each sample to the daily activity template. This result shows that the likelihood becomes lower when using the local template in addition to the global template and that the sensitivity to the unusual activity becomes higher (i.e., the likelihood for the unusual activity is lower than that for the daily activity). In other words, the result shows that the ability of detecting unusual activity is low when using only the global template but that the unusual activity can be detected when using the local template.

Experiment 2: Evening scenario

This experiment is the same as Experiment 2 (Evening scenario) in the above-described embodiment. Assuming the activity sequence where a person who lives in the intelligent house 20 comes back home, has dinner, relaxes and then goes to bed, a subject person conducted activities (fourteen times of daily pattern and one time of six types of unusual patterns, respectively) in Experiment 2 in the above-described embodiment and the sensory data thereof was stored.

Figure 42:
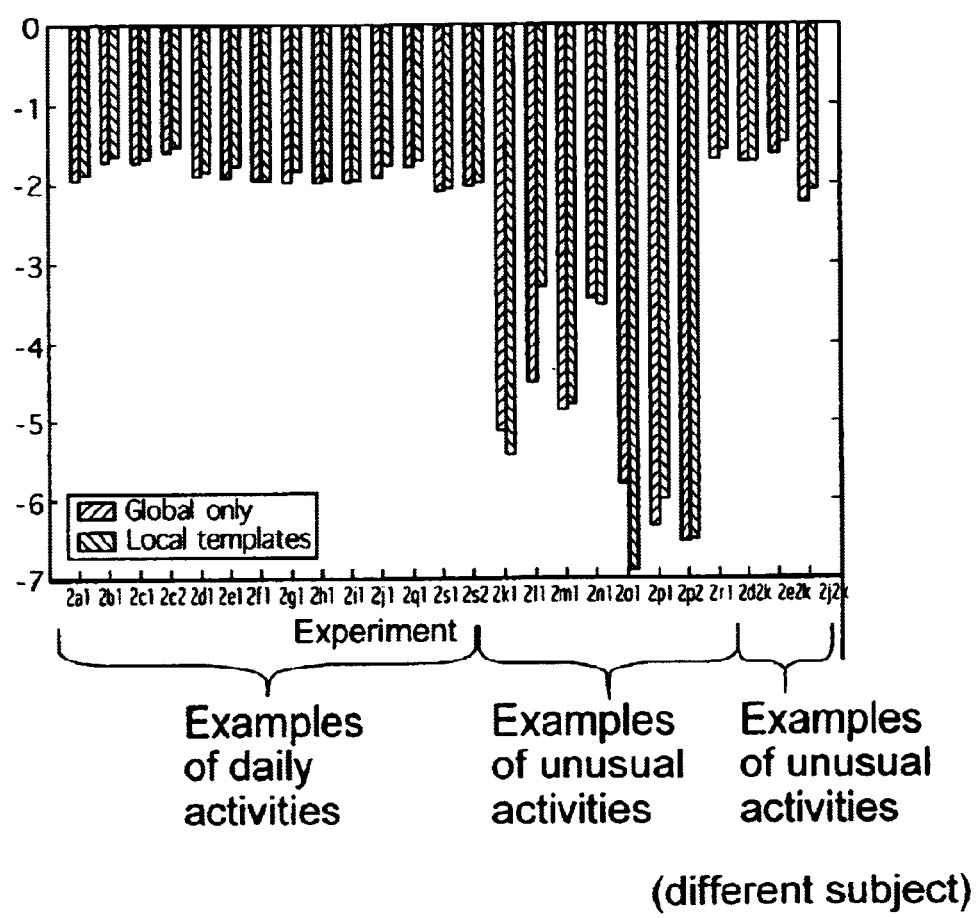
FIG. 42 is a diagram showing a comparison of the average log likelihood between the case where the global template is used and the local template is used in Experiment 2.

As for the cases when the global template is used for the daily activities and the unusual activities and as for the cases when the local template is used for both activities, when the average log likelihoods $Err^{likelihood}$ of the activity sequences to the transition probability of the daily activity template are compared, the result shown in FIG. 42 was obtained.

This result shows that the likelihood becomes lower when using the local template in addition to the global template and that the sensitivity to the unusual activity becomes higher (i.e., the likelihood for the unusual activity is lower than that for the daily activity).

Experiment ½: Morning and evening scenarios

Figure 43:
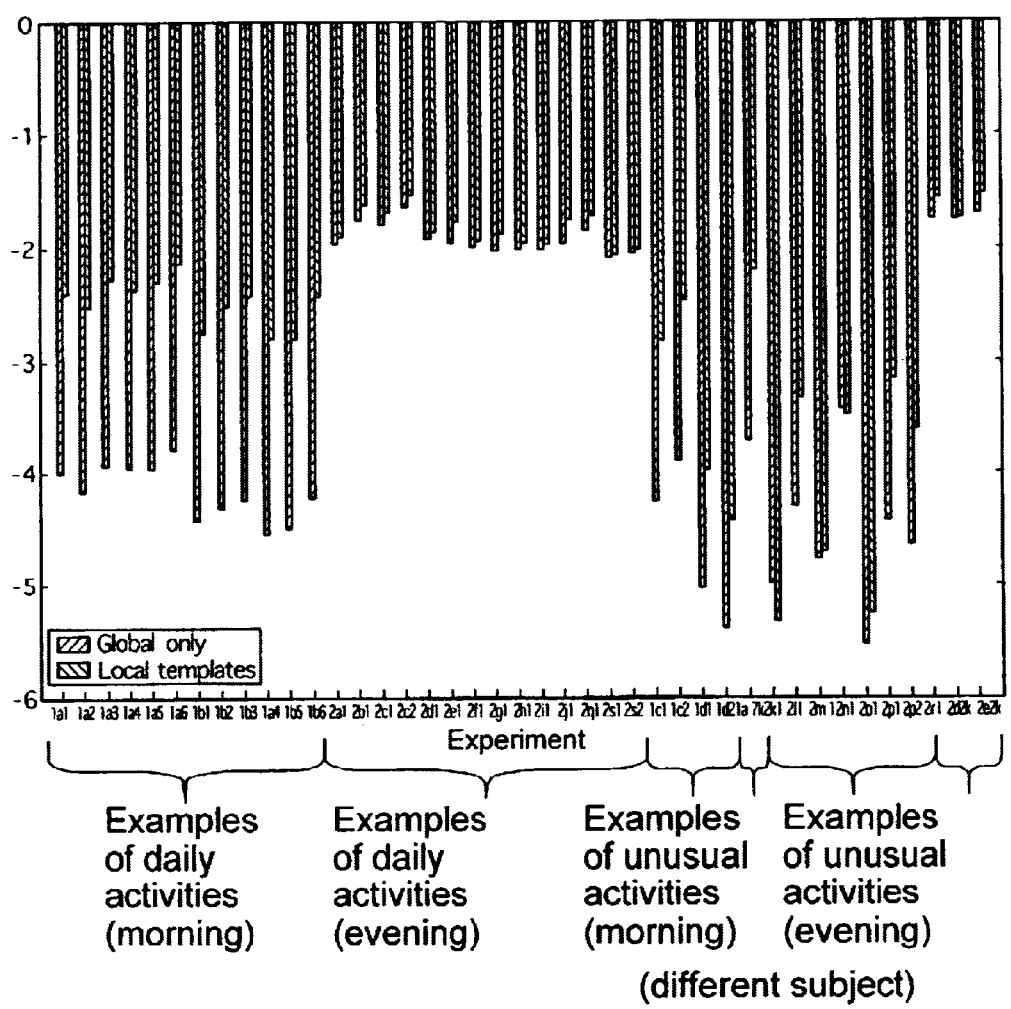
FIG. 43 is a diagram showing a comparison of the average log likelihood between the case where the global template is used and where the local template is used in Experiment ½.

The experiment of the unusual activity detection ($Err^{likelihood}$) was carried out for the scenarios in the above Experiment 1 (Morning scenario) and Experiment 2 (Evening scenario). FIG. 43 shows the result thereof.

When the global daily activity templates are used, the above two cases are mixed and a method such as the distance $Err^{distance}$ between the transition probabilities of Markov chains cannot be used. However, by predicting the local templates for situation dependency, an unusual activity can be detected stably even in the mixed cases.

As described above, in the present embodiment and the modification thereof, a personal daily life is described and unusual activities are detected based on the sensor information in the intelligent house 20. As a characteristic amount for the daily activity template, the transition probability based on a Markov chain model and the duration time distribution of Markov chain events are used. Also, comparisons between the unusual activities and the daily activities using likelihood and distance measures show that some unusual patterns can be detected. As a result, it is suggested that the human living activities in a house like the intelligent house 20 can be represented by a model using probability distribution. Since image processing can be applied to the sampling of local templates, it is also suggested that a lot of existing image processing technologies can be applied thereto.

The local template which is used for describing human activities can be seen as a chunk in cognitive psychology, and a model for triggering the chunk using a prediction between chunks is used as an application. This can also be regarded as a cognitive human activity description model.

In the hierarchical structure of sequences based on the local templates that are used in the modification, the inclusion relation of activities is not clearly shown. As a method for solving the inclusion relation, statistical processing of simultaneous eventual probability between the local templates, starting time, ending time and others may be used, but it probably requires an enormous amount of experimental data.

There are two very significant problems in modeling probability in a housing environment: data specific to a user cannot always be obtained until services are provided, and frequency differences of activities are large. Modeling using a Bayesian approach is desired as a method for solving these problems. A stochastic graph representation like Bayesian-net (Breese, J.S., Construction of belief and decision networks, *Computational Intelligence,* Vol. 8, No. 4, pp. 624–647,1992) seems to be effective because it is very applicable to the introduction of prior knowledge and sequence resolution into an activity unit which is performed in the present embodiment. If a prior template based on a questionnaire about a user's occupation, age, life pattern is generated and used as a prior knowledge, the customizing period of the daily activity template which requires sampling of data that is specific to the user may be shortened. For the construction of Bayesiannet, a method has been proposed such as a search (Suzuki J., Learning Bayesian Belief Networks Based on the Minimum Description Length Principle: Basic Properties. IEICE Trans. Fundamentals, Col. E82-A, No. 9, 1999 and G.F. Cooper and E. Herskovits, A Bayesian Method for Constructing Bayesian Belief Networks from Database, in Uncertainty in Artificial Intelligence'91, UCLA, CA, pp. 86–94, 1991) using a MDL standard (J. Rissanen, Stochastic Complexity and Modeling, The Annals of Statistics, Vol. 14, No. 3, pp. 1080–1100, 1986). Also, as a tool, BAYONET (Motomura and Hara, Stochastic System with Learning Mechanism from Database: BAYONET, The 12th Japanese Society for Artificial Intelligence, 1998) has been proposed. Bayesiannet, which must generally be a non-circular directed graph, may present a problem in representing a person's life. As a solution for this problem, a graph transformation using a clustering algorithm such as JunctionTree is under study. Also, in order to deal with a sequence, DBN (Dynamic Belief Network) for modeling a system having time delay (state transition) has been proposed (Dean, T. and Kanazawa, K., A Model for Reasoning about Persistence and Causation, Computational Intelligence, Vol. 5, No. 3, pp. 142–150, 1989). As mentioned above, the infrastructure for applying Bayesiannet to the intelligent house 20 has been established, so the future development thereof seems to be promising.

Since an applicable abnormality detection method depends upon an abnormality to be detected under the present situation, an algorithm for automatically selecting an abnormality detection module if necessary needs to be developed. There still is a problem of setting a threshold for detection. It would be probably necessary to develop an application for a high-level approach to a resident in the long term. Since it is believed that higher-level understanding of human beings would be necessary in view of this problem, cognitive knowledge that is obtained from the intelligent house 20 and interactivity between living things and study thereof are expected.

The abnormality detection system according to the present invention has been explained above based on the embodiment and the modification thereof, but the present invention is not limited to these embodiment and the modification thereof.

For example, sensor patterns indicating human activities are not limited to the sensor signals which are outputted from the small motion detection sensors 25a–25c. As shown in the abnormality detection system 110 in FIG. 44, sensor signals from a C02 sensor 170a, an open/close sensor 170b, a small motion detection sensor 170c, a passage detection sensor 170d and so on, and signals indicating operational states (power ON/OFF, status/positions of various switches, and so on) from various electrical household appliances such as an air conditioner 180a, a refrigerator 180b, a ventilating fan 180c and a microwave oven 180d may be used.

When a house has a home network 290 to which various sensors 270 and various electrical household appliances 280 are connected as shown in the abnormality detection system 210 in FIG. 45, the house may be configured so that a controller 230 monitors the states of the sensors 270 and the electrical household appliances 280 via the home network 290. The controller 230 may send the information indicating the detection results and operational states thereof to an abnormality announcement device or a home controller in the house via a communication network so as to announce and present the information, or the controller 230 may send the information to the monitoring center and the abnormality detection device placed in the monitoring center which detects the occurrence of an abnormality in the house. In other words, the abnormality detection system of the present invention may be configured for decentralized processing so that the intelligent house collects data and the monitoring center analyzes and judges the occurrence of an abnormality.

Also, as shown in the abnormality detection system 310 in FIG. 46, the present invention may be configured so that an abnormality reporting device 335 is connected to a home network 390 separately and independently from the controller 330 of the home network 390. In other words, the present invention may configured so that the abnormality reporting device 335 that is placed in the house collects the sensor signals from the small motion detecting sensors 325a–325c via the home network 390, performs the same processing as the abnormality detection device 30 of the above-mentioned embodiment, and reports the abnormality to the monitoring center 50 or the cell phone 60 via the communication network 40 when detecting the abnormality.

Furthermore, in the present embodiment, a fixed value such as data that is pre-stored in the daily activity data storage unit 32b and the average value of one-month data is used as a reference value (daily activity template) for judging the occurrence of an unusual activity. However, a method may be used for updating (having it learn) the data based on the report from the resident of the intelligent house 20 (data with a teacher). For example, when a day ends, whether or not the day is usual is indicated in the input unit 31, and the Markov chain operating unit 33 updates the daily activity template regularly based on the report from the input unit 31. For example, when the transition number matrix and the duration time distribution in the latest 100 days which are reported as "daily" are to be operated, the Markov chain operating unit 33 calculates the average value of the days by more heavily weighting the later days and updates it as a new daily activity template. Then, the comparing unit 34 judges the occurrence of an unusual activity by using the updated daily activity template as a reference value. Accordingly, the abnormality detection system which follows the secular changes in the human activity mode is realized.

As is apparent from the above explanation, the abnormality detection device according to the present invention is a device that detects the occurrence of an abnormality in an event under observation. The detection device of the present invention comprises: an input unit operable to acquire a sequence of an input pattern that is data which depends upon the event; a transition analyzing unit operable to analyze a characteristic of a transition in the acquired sequence of the input pattern; a comparing unit operable to compare the analyzed characteristic of the transition with a predetermined reference value, and to judge that an abnormality has occurred in the event when the characteristic and the reference value are not approximate to each other within a predetermined range; and an output unit operable to output the occurrence of the abnormality when the comparing unit judges that the abnormality has occurred.

Accordingly, since the occurrence of an abnormality is detected based on the sequence of the input pattern which depends upon the changes of the events to be monitored, the occurrence of an abnormality can be detected without depending upon the type and number of the event or the space (such as a place and a time period) for monitoring the event. More specifically, when monitoring human activities, unusual activities in various manners can be detected without depending upon the time period or the place, which is different from the detection of an unusual activity based only on the time when the restroom is not used.

The input pattern which is to be the criterion is not determined fixedly and empirically, but the actually measured data in the normal state or the average of the data that is obtained for a certain period may be used. Thereby, an abnormality can be accurately judged by reflecting the individual characteristics (such as the individual differences in the normal state) of the person or the thing to be monitored.

Furthermore, by applying the Markov process to the sequence of the input pattern, the occurrence of an abnormality may be judged based on the distance and the likelihood in the appearance frequency of a Markov chain or the likelihood to the duration time distribution of a Markov chain. Thereby, an abnormality is monitored from multiple viewpoints such as the occurrence frequency (number of occurrence) and duration time of the event, which is different from judging that an abnormality has occurred based only on the- time when the restroom is not used, and various types of an abnormality such as abnormal frequency and abnormal duration time can be detected with a high accuracy.

As described above, the present invention enables an abnormality in the life of an elderly person who lives alone to be detected. Therefore, the practical value thereof is extremely high in the present society in which aging and nuclear families are rapidly becoming the norm.

What is claimed is:

1. An abnormality detection device that detects an occurrence of an abnormality in an event under observation, said abnormality detection device comprising:
    an input unit operable to acquire a sequence of an input pattern that is data depending upon the event;
    a transition analyzing unit operable to analyze a characteristic of a transition in the sequence of the input pattern acquired by said input unit;
    a comparing unit operable to compare the characteristic of the transition analyzed by said transition analyzing unit with a predetermined reference value, and to judge that an abnormality has occurred in the event when the characteristic and the reference value are not approximate to each other within a predetermined range; and
    an output unit operable to output an occurrence of the abnormality when said comparing unit judges that the abnormality has occurred;
    wherein said input unit includes a plurality of small motion detection sensors located in a plurality of places in a house, and said input unit is operable to acquire, as the input pattern, a sensor pattern that is a combination of data indicating whether or not there is a small motion outputted from a plurality of said plurality of small motion detection sensors; and
    wherein said transition analyzing unit is operable to calculate a Markov chain in the sequence of the input pattern and to analyze a characteristic of the calculated Markov chain as the analysis.

2. The abnormality detection device according to claim 1, wherein said transition analyzing unit is operable to calculate an appearance frequency for each type of the transition in the sequence of the input pattern as the analysis, and
    said comparing unit is operable to judge whether or not an abnormality has occurred by comparing the input pattern acquired by said input unit with a reference input pattern for the appearance frequency.

3. The abnormality detection device according to claim 2, wherein said transition analyzing unit is operable to calculate a probability distribution for each type of the transition as the appearance frequency, and
    said comparing unit is operable to calculate a distance between the input pattern acquired by said input unit and a reference input pattern for the probability distribution, and to judge that an abnormality has occurred when the calculated distance exceeds a predetermined value.

4. The abnormality detection device according to claim 2, wherein said transition analyzing unit is operable to calculate probability distribution for each type of the transition as the appearance frequency, and
    said comparing unit is operable to calculate a likelihood of the input pattern acquired by said input unit to the reference input pattern for the probability distribution, and to judge that an abnormality has occurred when the calculated likelihood is a predetermined value or less.

5. The abnormality detection device according to claim 1, wherein said transition analyzing unit calculates a duration time distribution which is a distribution of time that is required for the transition in the sequence of the input pattern as the analysis, and
    said comparing unit is operable to judge whether or not an abnormality has occurred by comparing the input pattern acquired by said input unit with a reference input pattern for the duration time distribution.

6. The abnormality detection device according to claim 5, wherein said comparing unit is operable to calculate a likelihood of the input pattern acquired by said input unit to the reference input pattern for the duration time distribution, and to judge that an abnormality has occurred when the calculated likelihood is a predetermined value or less.

7. The abnormality detection device according to claim 1, further comprising a clustering unit operable to transform the sequence of the input pattern acquired by said input unit into a cluster sequence that is a predetermined representative input pattern,
    wherein said transition analyzing unit is operable to analyze the characteristic in the cluster sequence which is transformed by said clustering unit.

8. The abnormality detection device according to claim 7, wherein said clustering unit is operable to obtain the cluster sequence after averaging and normalizing the sequence of the input pattern acquired by said input unit.

9. The abnormality detection device according to claim 8, wherein said clustering unit is operable to obtain the cluster sequence after specifying all the clusters by vector-quantizing the sequence of the input pattern obtained by the normalization.

10. The abnormality detection device according to claim 1, wherein the reference value is a value, for a reference event, obtained by acquiring the sequence of the input pattern in advance through said input unit and analyzing the characteristic through said transition analyzing unit.

11. The abnormality detection device according to claim 10, wherein the reference value is a value determined based on data given by an operator which is learned with a teacher and the input pattern which is acquired repeatedly by the said input unit.

12. The abnormality detection device according to claim 1, wherein the reference value is a value specified by an operator.

13. The abnormality detection device according to claim 1, wherein said input unit is operable to assume that a new sensor pattern has occurred each time the sensor pattern changes, and to acquire a sequence of an input pattern corresponding to a sequence of the sensor pattern.

14. The abnormality detection device according to claim 13, wherein said input unit is operable to acquire the input pattern by averaging and normalizing the sensor pattern in the time domain.

15. The abnormality detection device according to claim 1, wherein said input unit is operable to acquire the sequence of the input pattern from an operator.

16. The abnormality detection device according to claim 1, wherein said output unit is operable to report to a predetermined destination via a transmission channel that the abnormality has occurred.

17. The abnormality detection device according to claim 1,
wherein said transition analyzing unit is operable to calculate an appearance frequency of the Markov chain as the analysis, and
said comparing unit is operable to judge whether or not an abnormality has occurred by comparing the input pattern acquired by said input unit with a reference input pattern for the appearance frequency.

18. The abnormality detection device according to claim 17,
wherein said comparing unit is operable to calculate an Euclid distance between the input pattern acquired by said input unit and the reference input pattern for the appearance frequency of the Markov chain, and to judge that an abnormality has occurred when the calculated Euclid distance exceeds a predetermined value.

19. The abnormality detection device according to claim 18, wherein said comparing unit is operable to calculate a likelihood of the input pattern acquired by said input unit to the reference input pattern for the appearance frequency of the Markov chain, and to judge that an abnormality has occurred when the calculated likelihood is a predetermined value or less.

20. The abnormality detection device according to claim 1,
wherein said transition analyzing unit is operable to calculate a duration time distribution of the Markov chain as the analysis, and
said comparing unit is operable to judge whether or not an abnormality has occurred by comparing the input pattern acquired by said input unit with the reference input pattern for the duration time distribution.

21. The abnormality detection device according to claim 20, wherein said comparing unit is operable to calculate a likelihood of the input pattern acquired by said input unit to the reference input pattern for the duration time distribution of the Markov chain, and to judge that an abnormality has occurred when the calculated likelihood is a predetermined value or less.

22. The abnormality detection device according to claim 1,
wherein the reference value is a collection of local reference values in each time interval which satisfies a predetermined condition, and
said comparing unit is operable to judge whether or not an abnormality has occurred by comparing the characteristic with the local reference value in each time interval which satisfies the predetermined condition.

23. The abnormality detection device according to claim 22, further comprising:
a local reference value generating unit operable to generate the local reference value in each time interval which satisfies the predetermined condition by acquiring a plurality of the sequences of the input patterns through said input unit, resolving the sequences in each time interval where the acquired input patterns are similar to each other within a predetermined range, and collecting the resolved sequences in each time interval which satisfies the predetermined condition; and
a local reference value selecting unit operable to predict and select an optimum reference value from among all the local reference values belonging to each time interval which satisfies the predetermined condition based on the input patterns for abnormality detection,
wherein said comparing unit is operable to judge whether or not an abnormality has occurred by comparing the characteristic with the local reference value selected by said local reference value selecting unit in each time interval which satisfies the predetermined condition.

24. The abnormality detection device according to claim 23, wherein said local reference value generating unit is operable to sample a time interval with a high correlation according to template matching by using a time window, and to resolve the sequence in the each sampled time interval.

25. The abnormality detection device according to claim 23, wherein said local reference value selecting unit is operable to calculate probability distributions for each transition type in the sequences of the input patterns for abnormality detection and the input patterns of the reference event, respectively, and to predict and select the optimum local reference value based on a distance between the calculated probability distributions.

26. An abnormality detection system comprising:
an abnormality detection device is operable to be located in a place where an event for abnormality detection occurs;
a communication device operable to monitor an occurrence of an abnormality; and
a transmission channel operable to connect said abnormality detection device and said communication device;
wherein said abnormality detection device includes:
an input unit operable to acquire a sequence of an input pattern that is data depending upon the event;
a transition analyzing unit operable to analyze a characteristic of a transition in the sequence of the input pattern acquired by said input unit;
a comparing unit operable to compare the characteristic of the transition analyzed by said transition analyzing unit with a predetermined reference value, and to judge that an abnormality has occurred in the event when the characteristic and the reference value are not approximate to each other within a predetermined range; and
an output unit operable to output an occurrence of an abnormality when said comparing unit judges that the abnormality has occurred;

wherein said input unit includes a plurality of small motion detection sensors located in a plurality of places in a house, and said input unit is operable to acquire, as the input pattern, a sensor pattern that is a combination of data indicating whether or not there is a small motion outputted from a plurality of said plurality of small motion detection sensors;

wherein said transition analyzing unit is operable to calculate a Markov chain in the sequence of the input pattern and to analyze a characteristic of the calculated Markov chain as the analysis; and wherein said communication device includes:
a receiving unit operable to receive a report from said abnormality detection device; and
a showing unit operable to show an operator that the report has been received when said receiving unit receives the report.

27. An abnormality detection system comprising:
an abnormality detection device operable to be located in a place where an event for abnormality detection occurs;
a communication device operable to monitor an occurrence of an abnormality; and
a transmission channel operable to connect said abnormality detection device and said communication device;
wherein said abnormality detection device includes:
an input unit operable to acquire a sequence of an input pattern that is data depending upon the event; and
a sending unit operable to send the input pattern acquired by said input unit to said communication device via said transmission channel;
wherein said input unit includes a plurality of small motion detection sensors located in a plurality of places in a house, and said input unit is operable to acquire, as the input pattern, a sensor pattern that is a combination of data indicating whether or not there is a small motion outputted from a plurality of said plurality of small motion detection sensors; and
wherein said communication device includes:
a receiving unit operable to receive the input pattern sent from said sending unit of said abnormality detection device;
a transition analyzing unit operable to analyze a characteristic of a transition in the sequence of the input pattern received by said receiving unit by calculating a Markov chain in the sequence of the input pattern and analyzing a characteristic of the calculated Markov chain as the analysis;
a comparing unit operable to compare the characteristic of the transition analyzed by said transition analyzing unit with a predetermined reference value, and to judge that an abnormality has occurred in the event when the characteristic and the reference value are not approximate to each other within a predetermined range; and
a showing unit operable to show an operator the occurrence of the abnormality when said comparing unit judges that the abnormality has occurred.

28. The abnormality detection system according to claim 26, wherein said input unit includes an operation state detection sensor operable to detect an operation state of equipment which is located in the place, and to acquire a sensor signal from said operation state detection sensor as the input pattern.

29. The abnormality detection system according to claim 26, wherein:

the place is a house;
said abnormality detection system further comprises:
a home network operable to connect a plurality of electrical household appliances which are located in the house; and
a controller operable to control a plurality of the electrical household appliances via said home network; and
said input unit is operable to detect operation states of a plurality of the electrical household appliances via said home network and to acquire the detected operation states as the input patterns.

30. The abnormality detection system according to claim 26, wherein:
the place is a house;
said abnormality detection system further comprises a home network operable to connect a plurality of electrical household appliances which are located in the house;
said abnormality detection device further includes a controller operable to control a plurality of the electrical household appliances via said home network; and
said input unit is operable to detect operation states of a plurality of the electrical household appliances via said home network and to acquire the detected operation states as the input patterns.

31. An abnormality detection method for detecting an occurrence of an abnormality in an event under observation, said abnormality detection method comprising:
acquiring a sequence of an input pattern that is data depending upon the event;
analyzing a characteristic of a transition in the sequence of the input pattern acquired in said acquiring of the sequence of the input pattern;
comparing the characteristic of the transition analyzed in said analyzing of the characteristic of the transition with a predetermined reference value, and judging that an abnormality has occurred in the event when the characteristic and the reference value are not approximate to each other within a predetermined range; and
outputting an occurrence of the abnormality when said judging that the abnormality has occurred judges that the abnormality has occurred;
wherein in said acquiring of the sequence of the input pattern, a plurality of small motion detection sensors located in a plurality of places in a house are utilized for acquiring the input pattern, and a sensor pattern that is a combination of data indicating whether or not there is a small motion outputted from a plurality of the small motion detection sensors is acquired as the input pattern; and
wherein in said analyzing of the characteristic of the transition, a Markov chain in the sequence of the input pattern is calculated, and a characteristic of the calculated Markov chain is analyzed as the analysis.

32. The abnormality detection method according to claim 31, wherein:
in said analyzing of the characteristic of the transition, an appearance frequency for each type of the transition in the sequence of the input pattern is calculated as the analysis; and
in said comparing of the characteristic of the transition, whether or not an abnormality has occurred is judged by comparing the input pattern acquired in said acquiring of the sequence of the input pattern with a reference input pattern for the appearance frequency.

33. The abnormality detection method according to claim 31, wherein:
said analyzing of the characteristic of the transition, a duration time distribution that is a distribution of time which is required for the transition in the sequence of the input pattern is calculated as the analysis; and
in said comparing of the characteristic of the transition, whether or not an abnormality has occurred is judged by comparing the input pattern acquired in said acquiring of the sequence of the input pattern with a reference input pattern for the duration time distribution.

34. The abnormality detection method according to claim 31, further comprising transforming the sequence of the input pattern acquired in said acquiring of the sequence of the input pattern into a cluster sequence that is a predetermined representative input pattern;
wherein in said analyzing of the characteristic of the transition, the characteristic in the cluster sequence which is transformed in said transforming of the sequence of the input pattern is analyzed.

35. The abnormality detection method according to claim 31, wherein the reference value is a value, for a reference event, which is obtained by
acquiring the sequence of the input pattern in advance in said acquiring of the of the sequence of the input pattern, and
analyzing the characteristic in said analyzing of the characteristic of the transition.

36. The abnormality detection method according to claim 31, wherein the reference value is a value specified by an operator.

37. The abnormality detection method according to claim 31, wherein in said acquiring of the sequence of the input pattern, the sequence of the input pattern is acquired from an operator.

38. The abnormality detection method according to claim 31, wherein said outputting of the occurrence of the abnormality reports that the abnormality has occurred, to a predetermined destination via a transmission channel.

39. The abnormality detection method according to claim 31, wherein:
the reference value is a collection of local reference values in each time interval which satisfies a predetermined condition; and
in said judging that an abnormality has occurred, whether or not an abnormality has occurred is judged by comparing the characteristic with the local reference value in each time interval which satisfies the predetermined condition.

40. A program for detecting that an abnormality has occurred in an event under observation, said program causing a computer to execute:
acquiring a sequence of an input pattern that is data depending upon the event;
analyzing a characteristic of a transition in the sequence of the input pattern acquired in said acquiring of the sequence of the input pattern;
comparing the characteristic of the transition analyzed in said analyzing of the characteristic of the transition with a predetermined reference value, and judging that an abnormality has occurred in the event when the characteristic and the reference value are not approximate to each other within a predetermined range; and
outputting an occurrence of the abnormality when said judging that the abnormality has occurred judges that the abnormality has occurred;
wherein in said acquiring of the sequence of the input pattern, a plurality of small motion detection sensors located in a plurality of places in a house are utilized for acquiring the input pattern, and a sensor pattern that is a combination of data indicating whether or not there is a small motion outputted from a plurality of the small motion detection sensors is acquired as the input pattern; and
wherein in said analyzing of the characteristic of the transition, a Markov chain in the sequence of the input pattern is calculated, and a characteristic of the calculated Markov chain is analyzed as the analysis.

41. The abnormality detection system according to claim 27, wherein said input unit includes an operation state detection sensor operable to detect an operation state of equipment which is located in the place, and to acquire a sensor signal from said operation state detection sensor as the input pattern.

42. The abnormality detection system according to claim 27, wherein:
the place is a house;
said abnormality detection system further comprises:
a home network operable to connect a plurality of electrical household appliances which are located in the house; and
a controller operable to control a plurality of the electrical household appliances via said home network; and
said input unit is operable to detect operation states of a plurality of the electrical household appliances via said home network and to acquire the detected operation states as the input patterns.

43. The abnormality detection system according to claim 27, wherein:
the place is a house;
said abnormality detection system further comprises a home network operable to connect a plurality of electrical household appliances which are located in the house;
said abnormality detection device further includes a controller operable to control a plurality of the electrical household appliances via said home network; and
said input unit is operable to detect operation states of a plurality of the electrical household appliances via said home network and to acquire the detected operation states as the input patterns.

* * * * *